US012495363B2

(12) United States Patent
Xin et al.

(10) Patent No.: US 12,495,363 B2
(45) Date of Patent: Dec. 9, 2025

(54) STREAM CLASSIFICATION SERVICE (SCS) WITH RESTRICTED TARGET WAIT TIME (R-TWT) SETUP

(71) Applicants: SONY GROUP CORPORATION, Tokyo (JP); SONY CORPORATION OF AMERICA, New York, NY (US)

(72) Inventors: Liangxiao Xin, San Jose, CA (US); Mohamed Abouelseoud, Burlingame, CA (US); Li-Hsiang Sun, San Jose, CA (US); Qing Xia, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 674 days.

(21) Appl. No.: 17/814,166

(22) Filed: Jul. 21, 2022

(65) Prior Publication Data
US 2023/0058871 A1    Feb. 23, 2023

Related U.S. Application Data

(60) Provisional application No. 63/267,397, filed on Feb. 1, 2022, provisional application No. 63/263,862, filed (Continued)

(51) Int. Cl.
*H04W 52/02* (2009.01)
*H04W 72/54* (2023.01)
*H04W 74/0816* (2024.01)

(52) U.S. Cl.
CPC ....... *H04W 52/0258* (2013.01); *H04W 72/54* (2023.01); *H04W 74/0816* (2013.01)

(58) Field of Classification Search
None
See application file for complete search history.

(56) References Cited

U.S. PATENT DOCUMENTS 10,827,425 B2    11/2020   Asterjadhi
12,004,015 B2 *   6/2024   Canpolat ............... H04W 76/22
(Continued)

FOREIGN PATENT DOCUMENTS

EP         3731571        10/2020
JP      2018520575 A       7/2018

OTHER PUBLICATIONS

Dave Cavalcanti (Intel Corporation): "Enhancements for QoS and low latency in 802.11be R1", IEEE Draft; 11-20-1350-07-00BE-Enhancements-For-QOS-And-Low-Latency-In-802-11 BE-R1, IEEE-SA Mentor, Piscataway, NJ USA, vol. 802.11 EHT; 802.11be, No. 7, Oct. 12, 2020, pp. 1-15, XP068175738.
(Continued)

*Primary Examiner* — Saumit Shah
(74) *Attorney, Agent, or Firm* — O'BANION & RITCHEY LLP; John P. O'Banion

(57) ABSTRACT

An IEEE 802.11 protocol in which the necessity and issues surrounding separately setting up SCS and reserving target wait time (R-TWT) are eliminated. In the present disclosure new data structures and processes are performed in which a station (STA) can request scheduling R-TWT for the traffic transmission of a stream classification service (SCS) during the setup procedure of that SCS. In using the teachings of the present disclosure, a STA can exchange a TWT setup frame on one link to schedule R-TWT on multiple links.

12 Claims, 30 Drawing Sheets

Related U.S. Application Data on Nov. 10, 2021, provisional application No. 63/260,173, filed on Aug. 11, 2021.

(56) References Cited

U.S. PATENT DOCUMENTS

| | | | |
|---|---|---|---|
| 2018/0115950 A1* | 4/2018 | Asterjadhi | H04W 76/28 |
| 2019/0141631 A1 | 5/2019 | Patil | |
| 2021/0022154 A1 | 1/2021 | Cavalcanti | |
| 2021/0068008 A1 | 3/2021 | Asterjadhi | |
| 2021/0144637 A1 | 5/2021 | Kwon | |
| 2021/0329500 A1* | 10/2021 | Cariou | H04W 74/002 |
| 2023/0379749 A1* | 11/2023 | Canpolat | H04W 28/0263 |
| 2024/0057187 A1* | 2/2024 | Gan | H04W 52/0229 |
| 2024/0129249 A1* | 4/2024 | Lu | H04W 28/02 |

OTHER PUBLICATIONS

Dibakar Das (Intel): "SCS Procedure for EHT", IEEE Draft; 11-21-0340-05-00BE-CR-FOR-CID-1977, IEEE-SA Mentor, Piscataway, NJ USA, vol. 802.11 EHT; 802.11be, No. 5, Feb. 27, 2021, pp. 1-8, XP068180120.

Sunhee Baek (LGE) : "TGbe D0.3 Comment Resolutions for Restricted TWT SP", IEEE Draft; 11-21-0672-02-00BE-CR-For-Restricted-TWT-SP, IEEE-SA Mentor, Piscataway, NJ USA, vol. 802.11 EHT; 802.11be, No. 2, Apr. 15, 2021, pp. 1-4, XP068182496.

* cited by examiner

**FIG. 1
(Prior Art)**

| Element ID | Length | TS Info | Nominal MSDU Size | Maximum MSDU Size | Minimum Service Interval | Maximum Service Interval | Inactivity Interval | Suspension Interval |

| Service Start Time | Minimum Data Rate | Mean Data Rate | Peak Data Rate | Burst Size | Delay Bound | Minimum PHY Rate | Surplus Bandwidth Allowance | Medium Time | DMG Attributes |

**FIG. 2
(Prior Art)**

| Traffic Type | TSID | Direction | Access Policy | Aggregation | APSD | User Priority | TSInfo Ack Policy | Schedule | Reserved |

**FIG. 3
(Prior Art)**

| Element ID | Length | User Priority | Frame Classifier |

**FIG. 4
(Prior Art)**

| Element ID | Length | Processing |

| Element ID | Length | Control | TWT parameter Information |
|---|---|---|---|

**FIG. 5
(Prior Art)**

| NDP Paging Indicator | Responder PM Mode | Negotiation Type | TWT Information Frame Disabled | Wake Duration Unit | Reserved |
|---|---|---|---|---|---|

**FIG. 6
(Prior Art)**

| Request Type | Target Wake Time | Nominal Minimum TWT Wake Duration | TWT Wake Interval Mantissa | Broadcast TWT Info |
|---|---|---|---|---|

**FIG. 7
(Prior Art)**

| TWT Request | TWT Setup Command | Trigger | Last Broadcast Parameter Set | Flow Type | Broadcast TWT Recommendation | TWT Wake Interval Exponent | Reserved |
|---|---|---|---|---|---|---|---|

| Frame Control | Duration | Address 1 | Address 2 | Address 3 | Sequence Control | Action | FCS |

| Category | Robust Action | Dialog token | SCS Descriptor List |

FIG. 12 (Prior Art)

| Element ID | Length | SCSID | Request Type | Intra-Access Category Priority | TCLAS | TCLAS Processing (optional) | TSPEC | Optional Subelements |

FIG. 13 (Prior Art)

| Frame Control | Duration | Address 1 | Address 2 | Address 3 | Sequence Control | Action | FCS |

| Category | Robust Action | Dialog token | SCS Status List |

FIG. 14 (Prior Art)

| SCSID | Status |

| Element ID | Length | SCSID | Request Type | Intra-Access Category Priority | TCLAS | TCLAS Processing (optional) | RTA-TSPEC | Modified TWT element | Optional Subelements |

| TSPEC | RTA Attributes |

| Nominal Service Interval | Reliability | Jitter | MSDU Lifetime | Deterministic Service |

| Traffic Type | TSID | Direction | Access Policy | Aggregation | APSD | User Priority | TSInfo Ack Policy | Schedule | Default use case | R-TWT request | Reserved |

| Element ID | Length | TS Info |

| Element ID | Length | SCSID | Status | Intra-Access Category Priority | TCLAS | TCLAS Processing (optional) | RTA-TSPEC | Modified TWT element | Optional Subelements |

STREAM CLASSIFICATION SERVICE (SCS) WITH RESTRICTED TARGET WAIT TIME (R-TWT) SETUP

CROSS-REFERENCE TO RELATED APPLICATIONS

This application claims priority to, and the benefit of, U.S. provisional patent application Ser. No. 63/267,397 filed on Feb. 1, 2022, incorporated herein by reference in its entirety. This application claims priority to, and the benefit of, U.S. provisional patent application Ser. No. 63/263,862 filed on Nov. 10, 2021, incorporated herein by reference in its entirety. This application claims priority to, and the benefit of, U.S. provisional patent application Ser. No. 63/260,173 filed on Aug. 11, 2021, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless local area networks operating under 802.11, and more particularly to a CSMA/CA protocol allowing request scheduling of Restricted Target Wait Time (R-TWT) for traffic transmission of a Stream Classification Service (SCS) during SCS setup.

2. Background Discussion

Current wireless technologies, such as IEEE 802.11be, using CSMA/CA, focus on high throughput performance of the network but do not provide high levels of low latency (low delay) performance. However, numerous applications, such as real time applications (RTA), require low latency capabilities, and thus a technology gap exists.

Real Time Applications (RTAs) require low latency communications and rely on best effort communication. The data generated from the RTA is called RTA traffic and will be packetized as RTA packets at the transmitter STA. Also, the data generated from the non-time sensitive application is called non-RTA traffic and will be packetized as non-RTA packets at the transmitter STA.

The RTA packet requires low latency due to its high timeliness requirement on packet delivery. The RTA packet is valid when it is delivered within a certain period of time.

Accordingly, a need exists for enhanced CSMA/CA WLAN protocols which can provide low-latency for RTA packets, and high throughput for non-RTA packet traffic. The present disclosure fulfills that need and provides additional benefits.

BRIEF SUMMARY

The protocol of the present disclosure for a CSMA/CA WLAN allows a station (STA) to request scheduling a Restricted Target Wait Time (R-TWT) for traffic transmission of a Stream Classification Service (SCS) during the setup procedure of that SCS. A STA is thus able to exchange a TWT setup frame on one link to schedule an R-TWT on multiple links.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 1 is a data field diagram of a conventional TSPEC element as defined in IEEE 802.11.

FIG. 2 is a data field diagram of the TS Info field of the TSPEC element of FIG. 1.

FIG. 3 is a data field diagram of the TCLAS element which is defined in IEEE 802.11.

FIG. 4 is a data field diagram of the TCLAS Process element as defined in IEEE 802.11.

FIG. 5 is a data field diagram of the TWT element as defined in IEEE 802.11.

FIG. 6 is a data field diagram of the Control field of the TWT element of FIG. 5.

FIG. 7 is a data field diagram of the Broadcast TWT parameter Information field of FIG. 5.

FIG. 8 is a data field diagram of the Request type field in the Broadcast TWT parameter Information field shown in FIG. 7.

FIG. 11 is a data field diagram of the SCS request frame.

FIG. 12 is a data field diagram of SCS Descriptor element format.

FIG. 13 is a data field diagram of SCS response frame.

FIG. 14 is a data field diagram of SCS status field.

FIG. 23 is a data field diagram of a modified SCS Descriptor element including R-TWT setup request according to at least one embodiment of the present disclosure.

FIG. 24 is a data field diagram of an RTA-TSPEC element according to at least one embodiment of the present disclosure.

FIG. 25 is a data field diagram of a modified TS Info field format in RTA-TSPEC element according to at least one embodiment of the present disclosure.

FIG. 26 is a data field diagram of an example RTA-TSPEC element format when setting default use case according to at least one embodiment of the present disclosure.

FIG. 27 is a data field diagram of a modified SCS Status according to at least one embodiment of the present disclosure.

DETAILED DESCRIPTION

Figure 9:
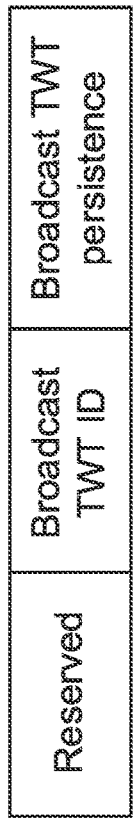
FIG. 9 is a data field diagram of the Broadcast TWT Info field in the Broadcast TWT parameter Information field shown in FIG. 7.

1. Introduction of IEEE 802.11 Data Elements 1.1. Traffic Specification (TSPEC) Element FIG. 1 shows the content in the TSPEC element, which is defined in IEEE 802.11, having the following fields. An Element ID field indicates the type of element, such as in this case a TSPEC element. A Length field indicates the length of the TSPEC element. A TS Information (info) field provides traffic stream information as is discussed below in FIG. 2.

A Nominal MSDU Size field indicates the nominal size of MSDUs or A-MSDUs belonging to the TS under this TSPEC. A Maximum MSDU Size field indicates the maximum size of MSDUs or A-MSDUs belonging to the TS under this TSPEC. A Minimum Service Interval field indicates the minimum time between the start time of two successive service periods (SPs). A Maximum Service Interval field indicates the maximum time between the start time of two successive SPs. An Inactivity Interval field indicates the maximum time interval before transmission arrival of a MSDU belonging to the TS before that TS is deleted. A Suspension Interval field indicates a maximum interval of time without either arrivals or transmissions of a MSDU belonging to the TS before the generation of successive QoS(+)CF-Poll is stopped for this TS.

A Service Start Time field indicates the start time of the first SP. A Minimum Data Rate field indicates the lowest data rate specified by MAC SAP for transmitting MSDUs or A-MSDUs belonging to the TS under this TSPEC. A Mean Data Rate field indicates the average data rate specified by MAC SAP for transmitting MSDUs or A-MSDUs belonging to the TS under this TSPEC. A Peak Data Rate field indicates the maximum data rate specified by MAC SAP for transmitting MSDUs or A-MSDUs belonging to the TS under this TSPEC. A Burst Size field indicates the maximum burst of MSDUs or A-MSDUs belonging to the TS under this TSPEC at the peak data rate. A Delay Bound field is the maximum time that is allowed to transmit a MSDU or A-MSDU belonging to the TS under this TSPEC.

A Minimum PHY Rate field indicates the lowest PHY rate for transmitting MSDUs or A-MSDUs belonging to the TS under this TSPEC. A Surplus Bandwidth Allowance field indicates the ratio of the bandwidth used for transmitting a MSDU or A-MSDU belonging to the TS under this TSPEC and its retransmissions to the bandwidth used for a transmitting that MSDU or A-MSDU once at the minimum PHY rate. A Medium Time field (time per second) indicates the time that is allowed for accessing the medium. A DMG Attributes field is presented when the TSPEC is applied to a directional multi-gigabit (DMG) BSS.

FIG. 2 shows the contents in the TS Info field of the TSPEC element of FIG. 1 as defined in IEEE 802.11. This element has the following subfields. A Traffic Type subfield specifies whether the traffic is periodic or not. A TSID indicates an ID number for identifying the TS. A Direction subfield specifies the direction of data transmission. An Access Policy subfield specifies the method for gaining channel access. An Aggregation subfield specifies whether the aggregation schedule is required. An APSD subfield indicates whether the automatic PS delivery is used. A User Priority subfield indicates the user priority of the MSDU or A-MSDU belonging to the TS. A TSInfo Ack Policy subfield indicates whether the Acknowledgement (ACK) is required, and which form of ACK is to be used. A Schedule subfield indicates the type of schedule.

1.2. Traffic Classification (TCLAS) Element

FIG. 3 depicts the contents of the TCLAS element, which is defined in IEEE 802.11 and has the following fields. An Element ID field indicates the type of element; which in this case indicates this as a TCLAS element. A Length field indicates the length of the TCLAS element. A User Priority field indicates user priority from the upper layer. A Frame Classifier field indicates the method to classify the frames from the upper layer.

1.3. Traffic Classification (TCLAS) Processing Element

FIG. 4 depicts the contents in the TCLAS Processing element, which is defined in IEEE 802.11 and has the following fields. An Element ID field indicates the type of element; which in this case is a TCLAS Processing element. A Length field indicates the length of the TCLAS Processing element. A Processing field indicates the method of classifying the traffic from the upper layer when multiple TCLAS elements exist.

1.4. TWT Element

FIG. 5 depicts the format of the TWT element defined in IEEE 802.11ax and has the following fields. The element ID and length serve the same purpose as previously described. The control field provides control information. When a negotiation type field in the control field in the TWT element is set to a value of "2" or "3", the TWT parameter information field in the TWT element carries the broadcast TWT parameter Information field as shown in FIG. 7.

It should be noted that there is an update in IEEE 802.11be (Draft P802.11be_D1.01) which is pertinent to this element. When the broadcast TWT recommendation field in the Request type field in Broadcast TWT parameter Information field is set to a value of "4", this represents that the broadcast TWT (B-TWT) indicated in the Broadcast TWT parameter Information field is a restricted TWT (R-TWT).

FIG. 6 depicts a Control field of the TWT element, having subfields of NDP Paging Indicator, Responder PM Mode, Negotiation Type, TWT Information Frame Disabled, Wake Duration Unit, and a reserved field.

FIG. 7 depicts a Broadcast TWT parameter Information field (TWT parameter Information field in TWT element when Negotiation Type is 2 or 3). The subfields include Request Type, Target Wake Time, Nominal Minimum TWT Wake Duration, TWT Wake Interval Mantissa and Broadcast TWT Information.

FIG. 8 depicts a Request type field in the Broadcast TWT parameter Information field shown in FIG. 7. The subfields include TWT Request, TWT Setup Command, Trigger, Last Broadcast Parameter Set, Flow Type, Broadcast TWT Recommendation, TWT Wake Interval Exponent. and a Reserved subfield.

FIG. 9 depicts a Broadcast TWT Info subfield in a Broadcast TWT parameter Information field shown in FIG. 7. The subfields include a Reserved subfield, as well as Broadcast TWT ID subfield and a Broadcast TWT Persistence subfield.

1.5. Stream Classification Service (SCS) Signaling

Figure 10:
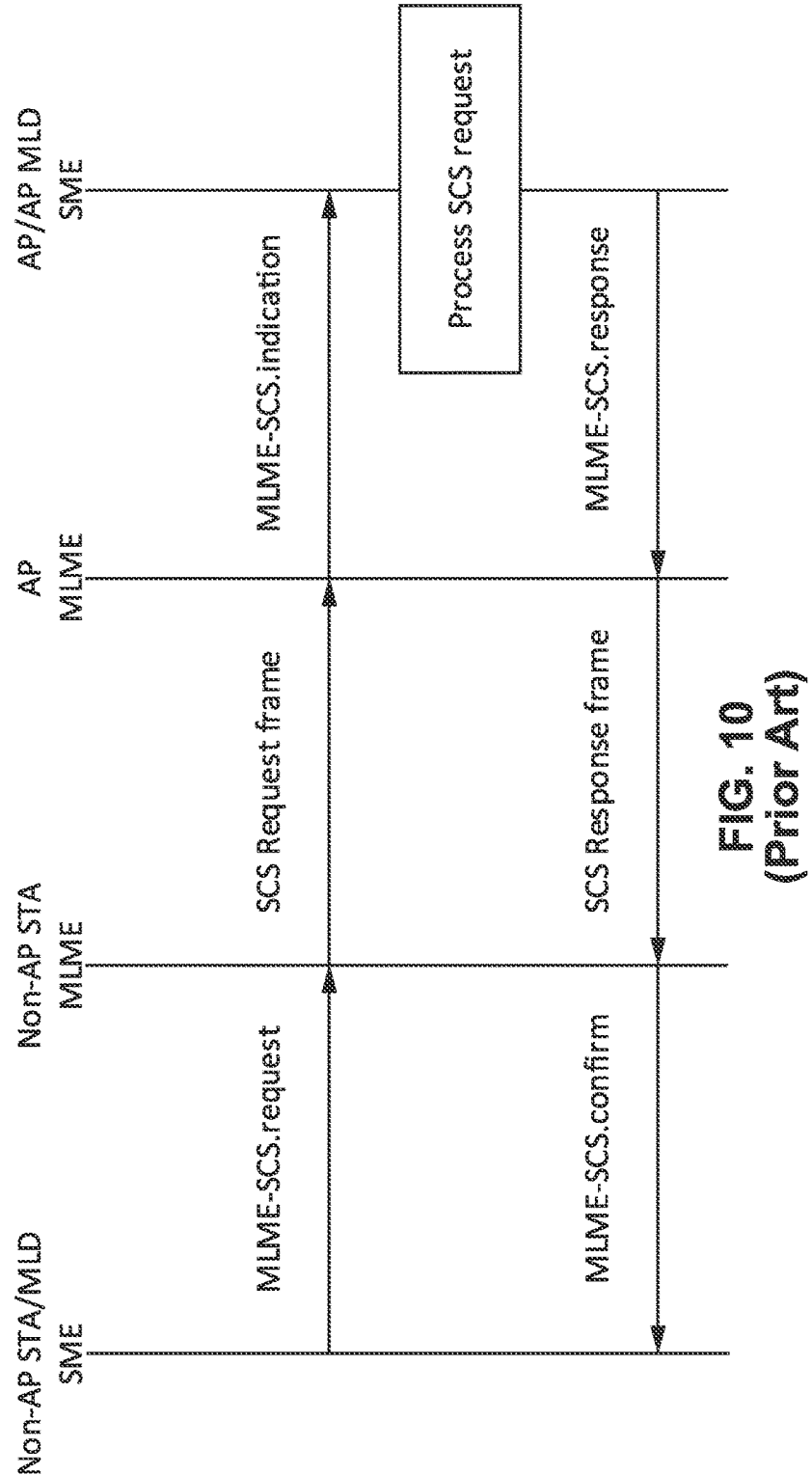
FIG. 10 is an interlevel communications diagram of SCS setup procedure as defined in IEEE 802.11be.

FIG. 10 depicts an example of a Stream Classification Service (SCS) setup defined in IEEE 802.11be (Draft P802.11be_D1.01). The interworking model of the STAs can be the same as defined in the IEEE 802.11 standard.

The non-AP STA decides to initiate a SCS setup procedure for the AP. The Station Management Entity (SME) of the non-AP STA sends a MLME-SCS.request message to its MAC Sublayer Management Entity (MLME). When the MLME of the non-AP STA receives the MLME-SCS.request message, it collects the information in the MLME-SCS.request message and sends a SCS request frame to the AP. The MLME of the AP receives the frame and generates a MLME-SCS.indication message to its SME which processes the request.

Then, the SME of the AP sends an MLME-SCS.response message containing SCS setup result to its MLME. Then, the MLME of the AP sends a SCS response frame to the non-AP STA. The MLME of the non-AP STA receives the frame and sends an MLME-SCS.confirm message to its SME. Then, at this point the non-AP can recognize whether the SCS setup has been successful or not.

FIG. 11 through FIG. 14 describe the SCS request frame and related data.

In FIG. 11 is shown an SCS request frame having the following fields of Frame Control, Address Fields (1-3), Sequence Control, Action, and a Frame Check Sequence (FCS). The action field is shown containing the following subfields: Category, Robust Action, Dialog token, and SCS Descriptor List, each of which contains the fields shown in FIG. 12. It should be appreciated that the SCS descriptor list field can carry multiple SCS descriptor elements.

In FIG. 12 each descriptor element is depicted having fields of Element ID, Length, SCSID, Request Type, Intra-Access Category Priority, TCLAS, TCLAS Processing (optional), TSPEC, and Optional Subelements.

In FIG. 13 is depicted an SCS response frame having subfields of Frame Control Duration, Address (1-3), Sequence Control, Action, and FCS. The Action subfield is shown having subfields of Category, Robust Action Dialog token and SCS Status List. The SCS status list subfield can carry multiple SCS status subfields as shown in FIG. 14.

In FIG. 14 is depicted an SCS status field, containing SCSID and the Status subfield. The status represents the SCS setup result (e.g., accept, reject, reject with reasons, terminate, and so on.) of the SCS indicated in the SCSID field.

1.6. TWT Signaling

Figures 15, 16:
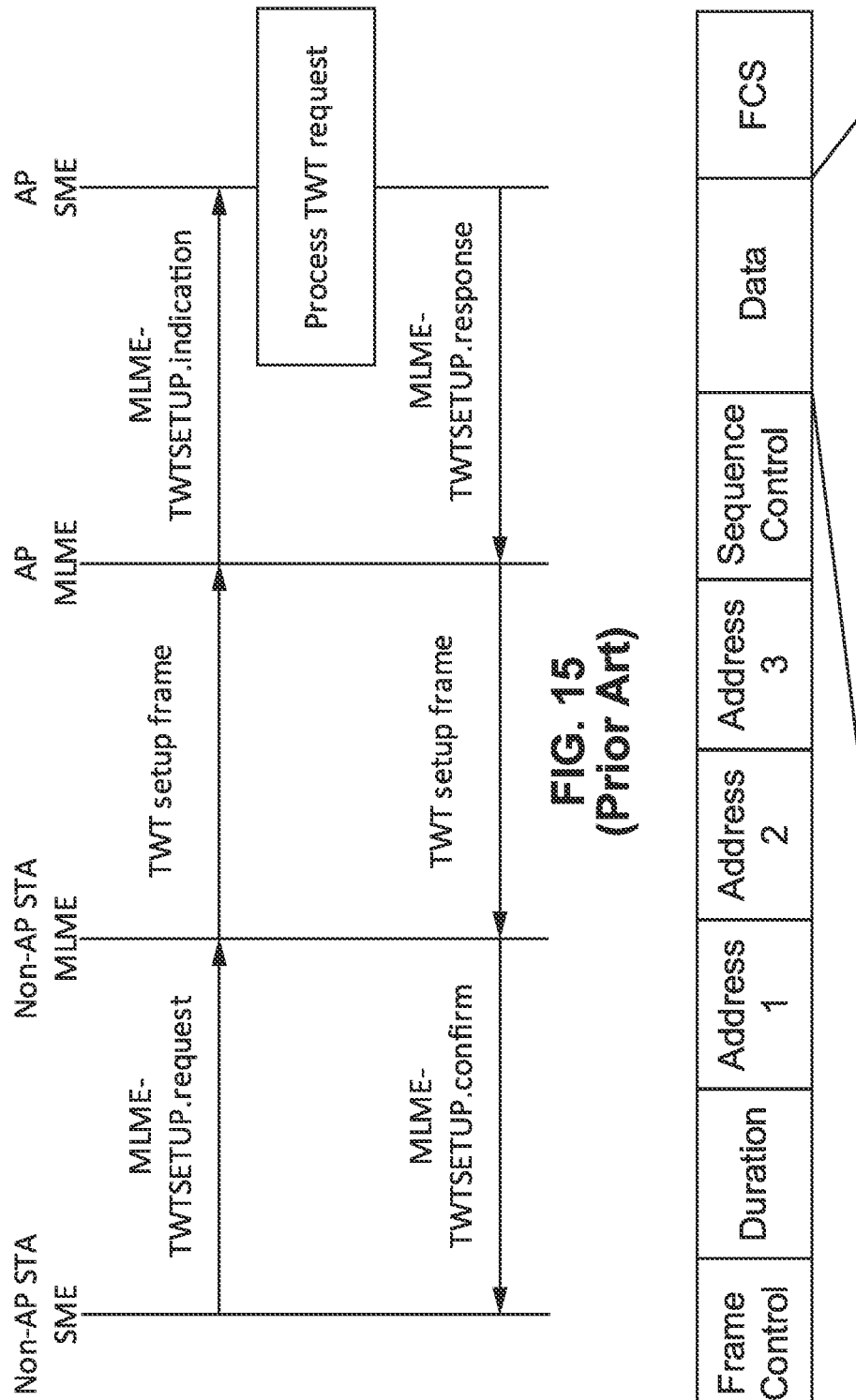
FIG. 15 is an interlevel communications diagram of TWT setup signaling.
FIG. 16 is a data field diagram of TWT Setup frame carrying a TWT element as seen in FIG. 5.

FIG. 15 depicts an example of TWT setup signaling defined in IEEE 802.11ax. The interworking model of the STAs could be the same as defined in the IEEE 802.11 standard.

The non-AP STA determines to initiate a TWT setup procedure with the AP. The Station Management Entity (SME) of the non-AP STA sends a MLME-TWTSETUP.request message to its MAC Sublayer Management Entity (MLME). When the MLME of the non-AP STA receives the MLME-TWTSETUP.request message, it collects the information in the MLME-TWTSETUP.request message and sends a TWT setup frame (i.e., TWT request frame) to the AP. The MLME of the AP receives the frame and generates a MLME-TWTSETUP.indication message to its SME which processes the request.

Then, the SME of the AP sends an MLME-TWTSETUP.response message containing TWT setup result to its MLME. Then, the MLME of the AP sends a TWT setup frame (i.e., TWT response frame) to the non-AP STA. The MLME of the non-AP STA receives the frame and sends an MLME-TWTSETUP.confirm message to its SME. Then, the non-AP STA can recognize (determine) whether the TWT setup has been successful or not.

FIG. 16 depicts a TWT setup frame which is carrying a TWT element in the frame as was shown in FIG. 5. The subfields of TWT setup are Frame Control, Duration, Address (1-3), Sequence Control, Data, and FCS. The Data field is then shown with subfields of Category, Action, Dialog token, and TWT element.

2. Problem Statement and Contribution of the Present Disclosure

The current IEEE 802.11 protocol supports SCS setup and R-TWT setup separately. However, this can cause problems, such as when a SCS is set up successfully, but the R-TWT cannot be scheduled for the traffic transmission of that SCS; whereby the QoS requirement of the SCS may not be satisfied.

Tradeoffs are often required between either high throughput performance or low latency performance, as these may not be able to be simultaneously achieved across all traffic. In order to satisfy the different requirements of Real Time Application (RTA) packet traffic and non-RTA packet traffic, the network can can use some features to improve its low latency performance when transmitting RTA packets while utilizing some other features to maximize throughput when transmitting non-RTA packets.

Therefore, toward this end, the RTA traffic and non-RTA traffic should be identified by the transmitter STA; while at times the receiver STA also obtains benefits from distinguishing between RTA packets and non-RTA packets. The network can then choose to use different features to satisfy the requirements of RTA and non-RTA traffic separately.

Often, RTA traffic is generated periodically, in the manner of connection-oriented communication. RTA connection-oriented communication established by an application between STAs is called an RTA session. It some instances a STA can have multiple RTA sessions in the network, which the STA must be able to manage.

To manage those RTA sessions in WLAN networks, the present disclosure is configured to regard an RTA session as a Stream Classification Service (SCS) traffic stream in IEEE 802.11. Then, the RTA traffic of an SCS traffic stream can be differentiated from other traffic. Meanwhile, the Restricted Target Wait Time (R-TWT) can be used to schedule and reserve channel resources for the transmission of RTA traffic. The present disclosure includes the R-TWT setup inside the SCS setup procedure. If an SCS traffic stream is established for an RTA session, then the channel resource is also reserved to guarantee the QoS quality, such as latency, jitter, and packet loss, of the RTA traffic stream via R-TWT.

The present disclosure provides a protocol in which a STA is able to request scheduling R-TWT for the traffic transmission of a SCS during the setup procedure of that SCS. By utilizing this configuration, a STA is able to exchange a TWT setup frame on one link to schedule R-TWT on multiple links.

3. Embodiment of the Disclosure

3.1. Communication Station (STA and MLD) Hardware

Figure 17:
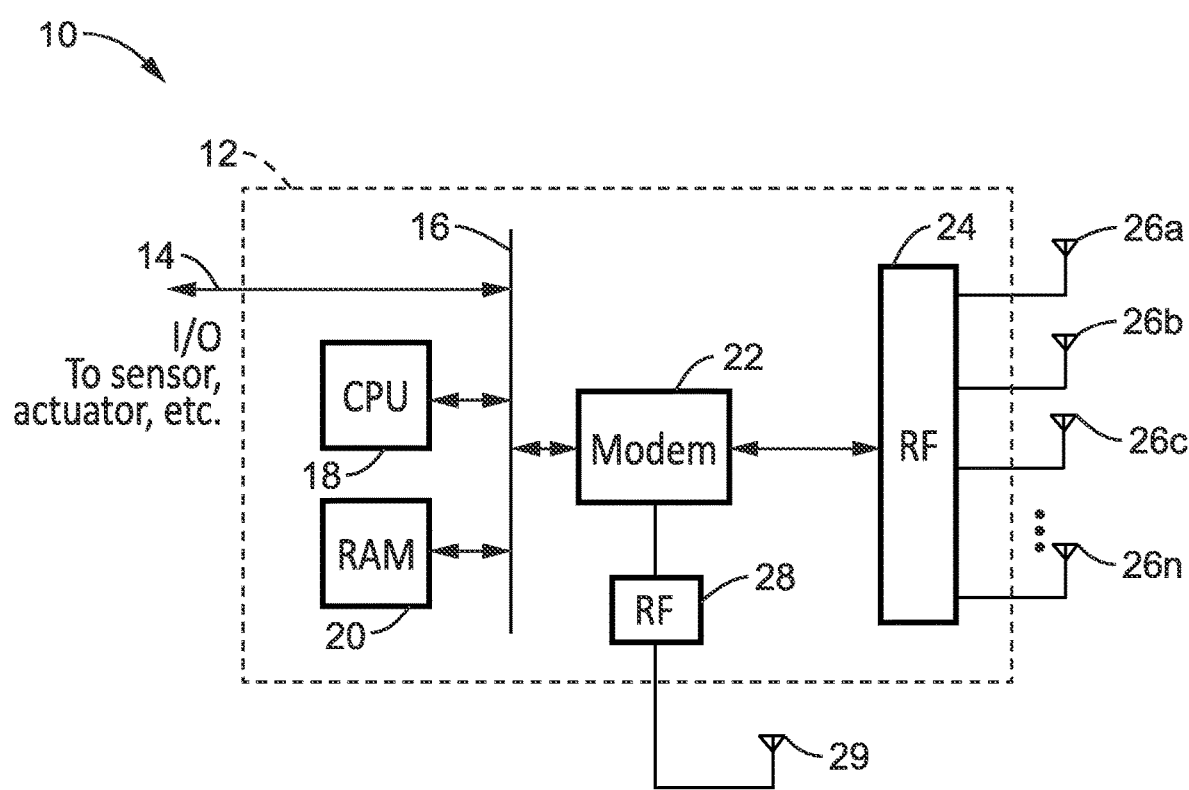
FIG. 17 is a hardware block diagram of wireless station (STA) hardware according to at least one embodiment of the present disclosure.

FIG. 17 illustrates an example embodiment 10 of STA hardware configured for executing the protocol of the present disclosure. An external I/O connection 14 preferably couples to an internal bus 16 of circuitry 12 upon which are connected a CPU 18 and memory (e.g., RAM) 20 for executing a program(s) which implement the communication protocol. The host machine accommodates at least one modem 22 to support communications coupled to at least one RF module 24, 28 each connected to one or multiple antennas 29, 26a, 26b, 26c through 26n. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with other AP, coordinator, coordinatee, AP in an OBSS, STA in an OBSS, and so forth), depending on what role it is performing in the current communication context.

Thus, the STA HW is shown configured with at least one modem, and associated RF circuitry for providing communication on at least one band. The present disclosure is primarily directed at the sub 6 GHz band.

It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware as shown in the figure, can be combined into a multi-link device (MLD), which typically will have a processor and memory for coordinating the activity, while there is not always a need for a separate CPU and memory for each STA within the MLD.

Figure 18:
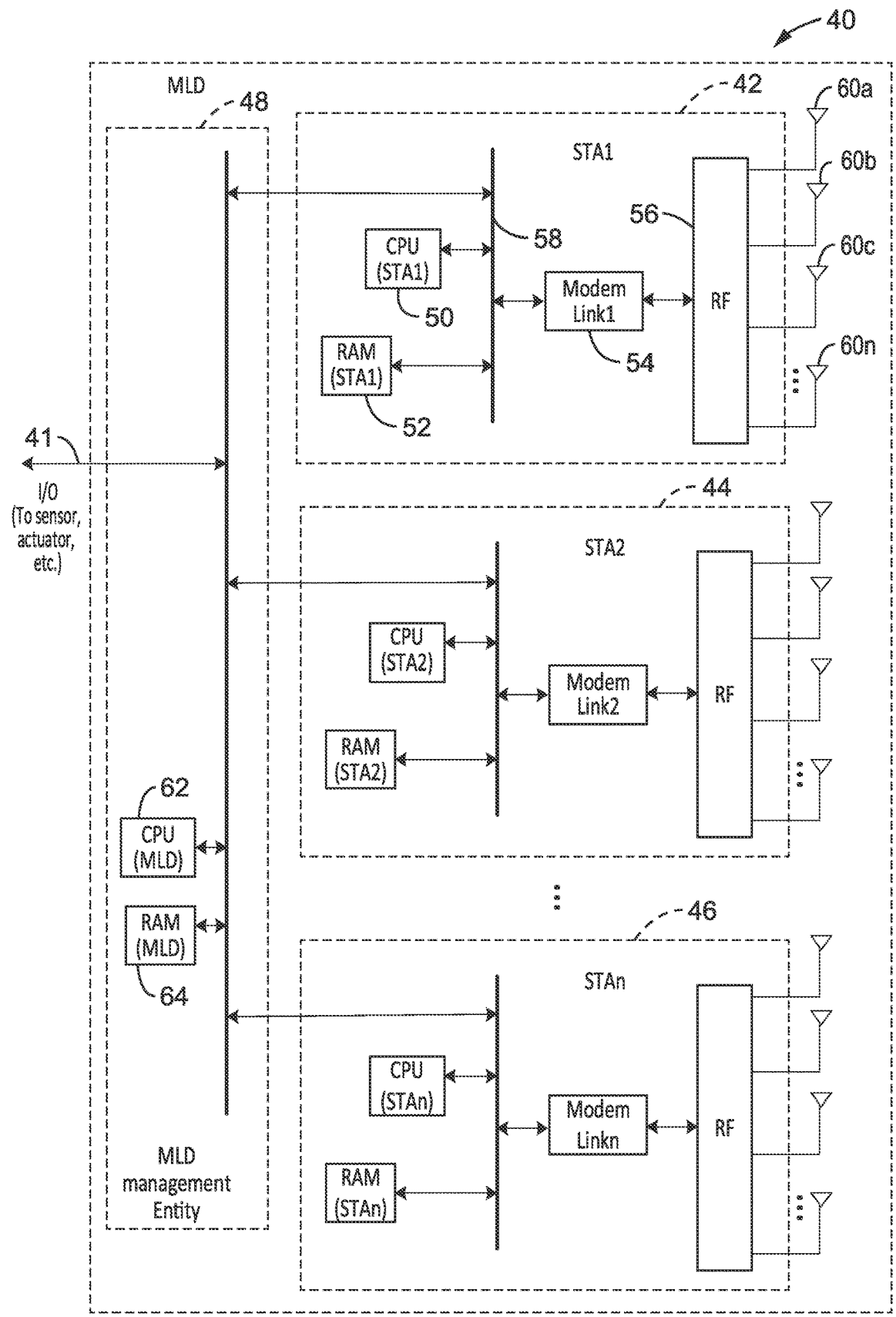
FIG. 18 is a hardware block diagram of a station configuration, such as contained in Multi-Link Device (MLD) hardware, according to at least one embodiment of the present disclosure.

FIG. 18 shows the multi-link device (MLD) hardware configuration.

illustrates an example embodiment 40 of a Multi-Link Device (MLD) hardware configuration. Soft AP MLD is a MLD that consists of one or more affiliated STAs, which are operated as APs. Soft AP MLD should support multiple radio operation on 2.4 GHz, 5 GHz and 6 GHz. Among multiple radios, basic link sets are the link pairs that satisfy simultaneous transmission and reception (STR) mode, e.g., basic link set (2.4 GHz and 5 GHz), basic link set (2.4 GHz and 6 GHz).

The conditional link is a link that forms a non-simultaneous transmission and reception (NSTR) link pair with some basic link(s). For example, these link pairs may comprise a 6 GHz link as the conditional link corresponding to 5 GHz link when 5 GHz is a basic link; 5 GHz link is the conditional link corresponding to 6 GHz link when 6 GHz is a basic link. The soft AP is used in different scenarios including Wi-Fi hotspots and tethering.

Multiple STAs are affiliated with an MLD, with each STA operating on a link of a different frequency. The MLD has external I/O access to applications, this access connects to a MLD management entity 48 having a CPU 62 and memory (e.g., RAM) 64 to allow executing a program(s) that implement communication protocols at the MLD level. The MLD can distribute tasks to, and collect information from, each affiliated station to which it is connected, exemplified here as STA 1 42, STA 2 44 through to STA N 46 and the sharing of information between affiliated STAs.

In at least one embodiment, each STA of the MLD has its own CPU 50 and memory (RAM) 52, which are coupled through a bus 58 to at least one modem 54 which is connected to at least one RF circuit 56 which has one or more antennas. In the present example the RF circuit has multiple antennas 60a, 60b, 60c through 60n, such as in an antenna array. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

3.2. Network Topology for Consideration

Figure 19:
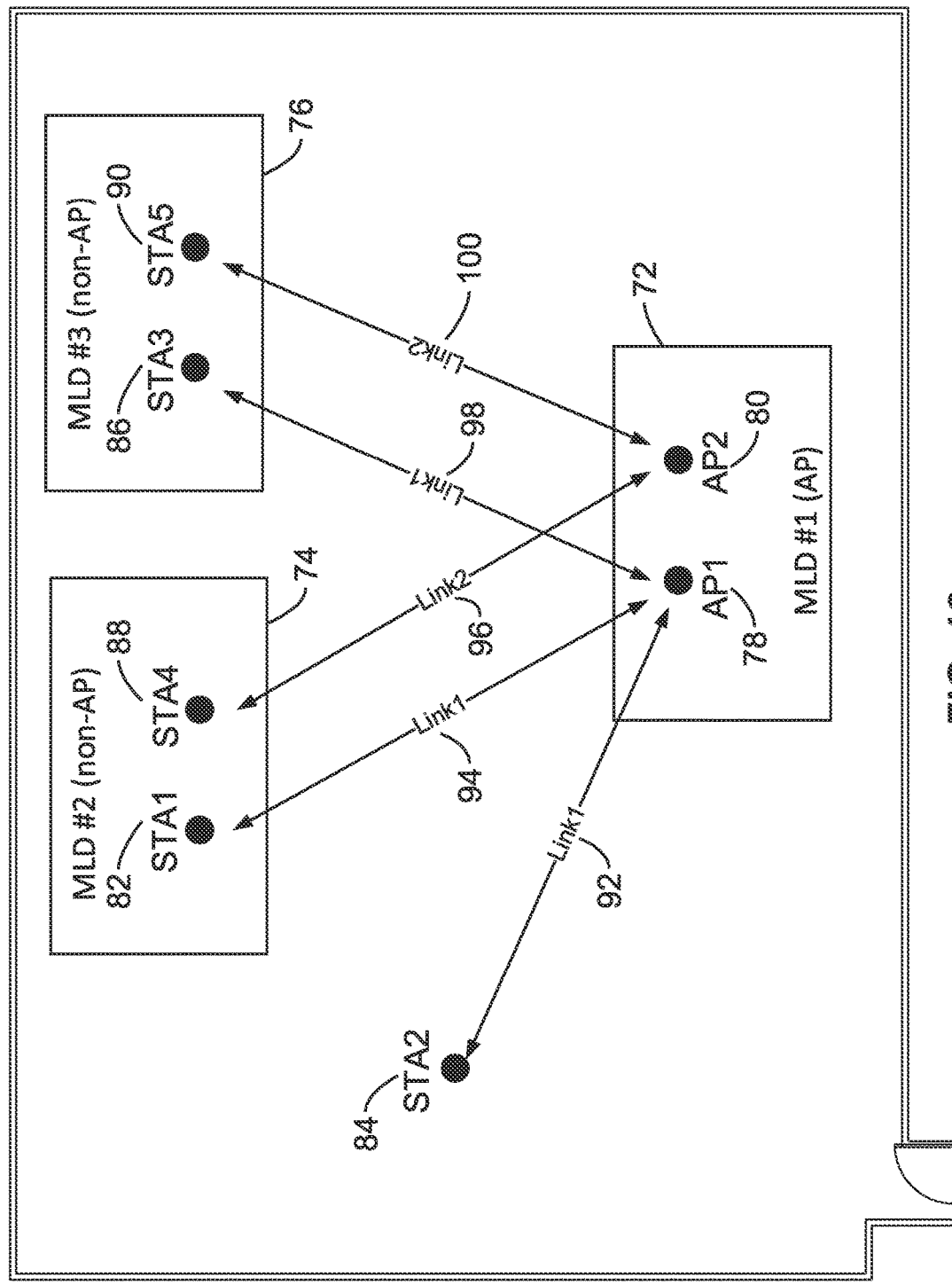
FIG. 19 is a station topology for consideration according to at least one embodiment of the present disclosure.

FIG. 19 illustrates an example STA topology for consideration in the examples of the present disclosure. The figure is provided to aid in the discussions of the techniques involved and toward engendering an improved understanding of the proposed technology. It should be appreciated that the present disclosure is in no way limited to the topology of this example, as the protocol may be utilized on communications between WLAN STAs and MLDs of any desired topology.

A MLD is a device that has more than one affiliated STA and has one MAC service access point (SAP) to logical link control (LLC), which includes one MAC data service.

An MLD is an AP MLD if APs are affiliated with that MLD. An MLD is a non-AP MLD if non-AP STAs are affiliated with that MLD.

As shown in FIG. 19 the scenario is exemplified as having 7 total stations, 6 of which are within MLDs 72, 74 and 76 in a meeting room. AP1 78 and AP2 80 are affiliated with multi-link device 72 (MLD) #1, STA1 82 and STA4 88 affiliated with MLD #2 74, and STA3 86 and STA5 90 are affiliated with MLD #3 76. STA2 84 may comprise a non-AP STA operating on Link1 92, or a single link MLD (i.e., a special MLD which only has one STA and operates on one link). STA1, STA2, and STA3 are associated with AP1 over Link1 94, 98 and STA4 and STA5 are associated with AP2 over Link2 96 and 100. All STAs use EDCA for random channel access on all the links.

3.3. SCS Setup Procedure w/R-TWT Membership Exchange

An SCS setup process is described in this section including a R-TWT membership exchange for the traffic of that SCS. The purpose of adding R-TWT membership exchange in a SCS setup procedure is to schedule R-TWT SPs to transmit the traffic of the SCS and satisfy its QoS requirement, such as throughput, latency, jitter, and packet loss, after which SCS is established. If R-TWT Service Periods (SPs) cannot be scheduled to transmit the traffic of the SCS, then the SCS setup request may be declined.

It will be noted that the SCS setup procedure and R-TWT setup procedure can be separated, if desired, and the R-TWT SPs are scheduled to satisfy the QoS requirement of the SCS traffic stream.

In the present disclosure the following is performed when a non-AP STA and its associated AP start a SCS setup procedure. (a) The R-TWT membership request can be included in the SCS description element of a SCS, denoted by SCSx, in the TWT element of a SCS request frame sent by the non-AP STA. In this case, the R-TWT membership request indicates the R-TWT parameter request for the traffic transmission of SCSx.

(b) The R-TWT membership response can be included in the SCS status element of SCSx in the TWT element of the corresponding SCS response frame sent by the AP. In this case, the R-TWT membership response indicates one of the following responses.

(b)(i) The R-TWT membership request is accepted, and the non-AP STA follows the accepted R-TWT scheduling to transmit the traffic of SCSx. The traffic of SCSx will be scheduled to transmit during the accepted R-TWT SPs. For example, if it is a trigger-based R-TWT, then the AP will schedule trigger-based transmissions for that SCSx traffic stream. The non-AP STA becomes a member STA of the accepted R-TWTs. SCSx is denoted as a member SCS of the accepted R-TWTs. In at least one embodiment/mode/case the traffic that does not belong to a member SCS of a R-TWT is either not allowed to transmit during the SPs of that R-TWT, or is given lower priority than the traffic of the member SCSs of that R-TWT to transmit during the SPs of that R-TWT. In at least one embodiment/mode/case if there are frames that have the same TID as the member SCS of the R-TWT, and that need to be retransmitted but do not belong to any member SCS of the R-TWT, then the AP can transmit those frames during the SP of that R-TWT. The AP should transmit those frames earlier than the frames of the member SCSs of the R-TWT with the same TID during the SP of that R-TWT when block acknowledgement is used for that TID. This is because the sequence numbers of those frames have been assigned and these are smaller than the frames of the member SCSs of that R-TWT with the same TID.

(b)(ii) The R-TWT membership request is not accepted, but the suggested R-TWT parameters are given by the AP. The non-AP STA can re-request membership based on the suggested R-TWT parameters. In certain instances, the suggested R-TWT parameters may not be related to the R-TWTs of which the non-AP STA is a member, or that the suggested R-TWT parameters related to a R-TWT of which the non-AP STA is a member does not affect the non-AP STA's membership of that R-TWT.

(b)(iii) The R-TWT membership request is rejected, and the non-AP should not re-request membership in that R-TWT.

In this section, the proposed technologies consider the R-TWT scheduling for a SCS during the setup procedure of that SCS. It is also allowable that the other types of TWT, such as individual TWT and broadcast TWT, can be set up during the SCS setup procedure. The setup signaling exchange of the other types of TWT can be the same as the R-TWT membership exchange in the SCS setup procedure since all types of TWT setup signaling information is carried by the TWT element. The TWT setup procedure of the other types of TWTs during the SCS procedure could be the same as shown in Section 1.6.

It should be noted that the SCS setup procedure can be the same as shown in FIG. 10, except that the format of the SCS request frame and SCS response frame are modified to add the TWT membership request/response. The change of the frames will be explained later.

3.3.1. Non-AP Sending SCS Request Frame w/R-TWT Membership Request Information

This section illustrates the setup procedure for an SCS including the R-TWT setup request at the non-AP STA side. This section explains details on the following operations.

(a) The process by which the non-AP STA sends a SCS setup request carrying R-TWT setup request for that SCS is as follows. In at least one embodiment, the SCS request including R-TWT setup request can be carried in a modified SCS descriptor element as shown in FIG. 23. The non-AP STA can send a SCS request frame as shown in FIG. 12 whereby the SCS descriptor List field can carry one or more modified SCS descriptor elements to the AP. Each modified SCS descriptor element represents a SCS setup request for one SCS indicated in the SCS ID field.

(b) The process by which the AP responds to an SCS setup carrying R-TWT setup request for that SCS is as follows. In at least one embodiment, the response to the SCS setup, including the R-TWT scheduling for that SCS, can be carried in a modified SCS status element as shown in FIG. 27. The AP sends a SCS response frame as shown in FIG. 25 whereby the SCS status list can carry one or more modified SCS status elements as shown in FIG. 27. It should be noted that each modified SCS status element represents a setup response for one SCS indicated in the SCS ID field.

Figure 20:
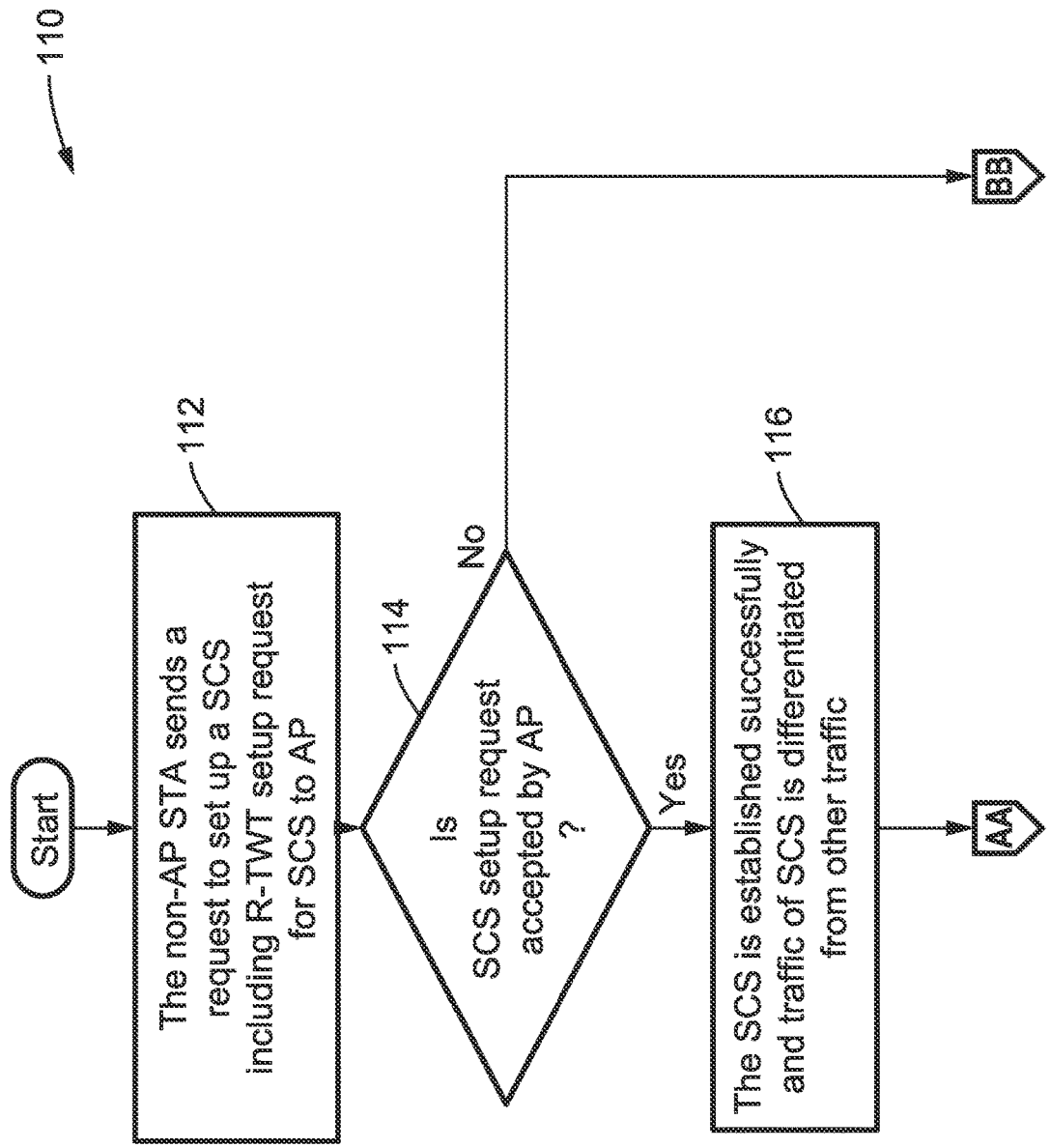
FIG. 20 and FIG. 21 is a flow diagram of a non-AP sending a SCS request frame including R-TWT membership request information according to at least one embodiment of the present disclosure.
Figure 21:
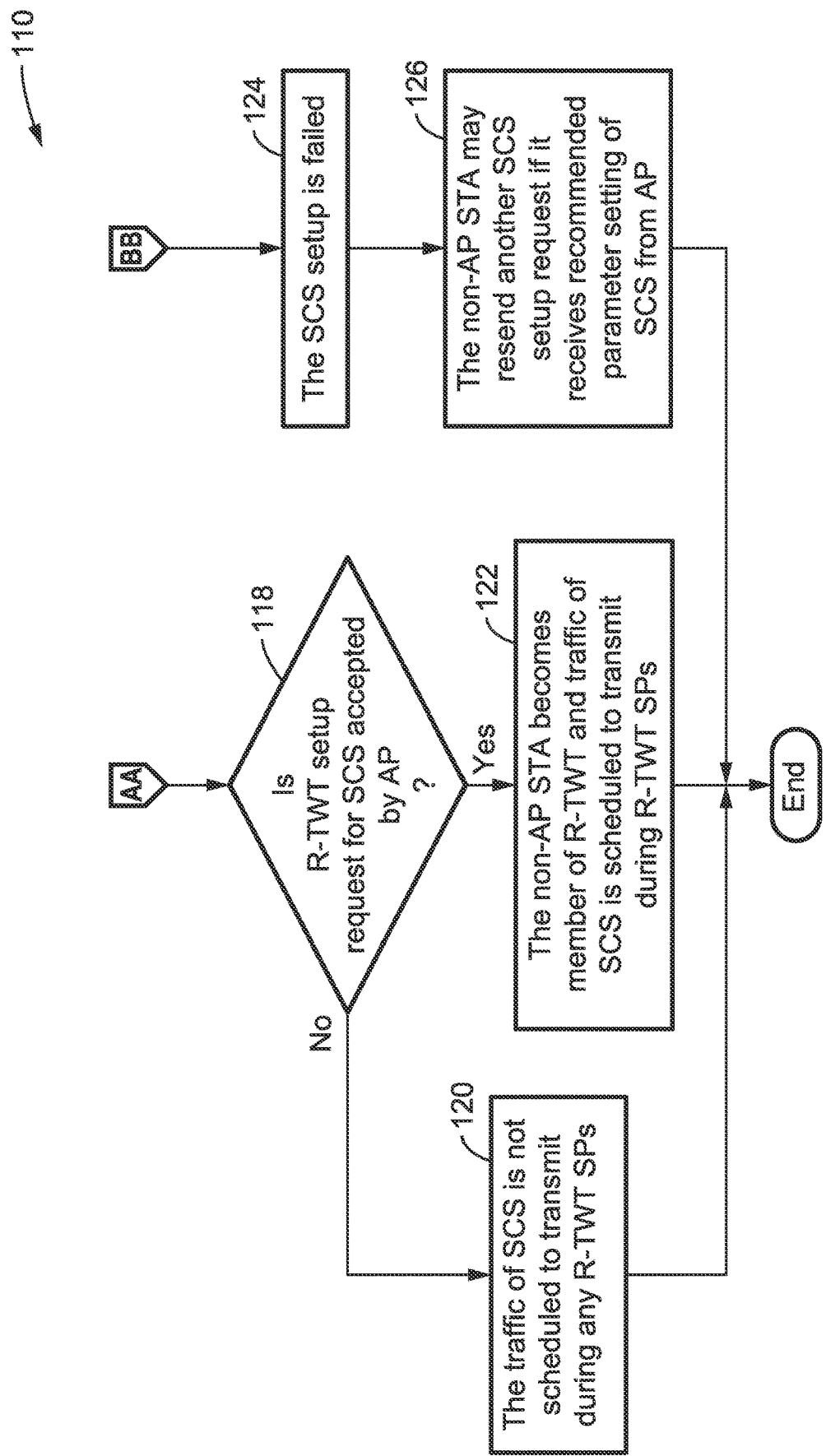

FIG. 20 and FIG. 21 illustrate an example embodiment 110 of a non-AP sending a SCS request frame including R-TWT setup request to its associated AP to request SCS setup including R-TWT membership request information.

The non-AP sends a SCS request frame 112 to the AP to establish a SCS, denoted by SCSx. The non-AP STA can indicate its R-TWT setup request for the traffic transmission of SCSx during SCSx. For example, inside the SCS descriptor element of SCSx in the SCS request frame, the non-AP STA can set the R-TWT request field to "required" or "optional" in the TS Info field format in RTA-TSPEC element (or the control Info field in the QoS characteristics element defined in IEEE 802.11be) to indicate that non-AP STA requests R-TWT scheduling for the traffic transmission of SCSx.

Then, a TWT element can be included in the SCS descriptor element of SCSx to indicate its R-TWT scheduling requirement for SCSx. The negotiation type field in the control field of the TWT element should be set to "3" to indicate the TWT element is for membership exchange. Let us assume the non-AP is requesting membership of R-TWTx for the traffic transmission of SCSx. Then, the TWT element includes a broadcast TWT Parameter Set field of R-TWTx. The TWT request field and the Broadcast TWT recommendation field in the request type field of the broadcast TWT Parameter Set field of R-TWTx should be set to "1" and "4", respectively, to indicate the TWT element is for R-TWT membership request. The Broadcast TWT recommendation field in the request type field of the broadcast TWT Parameter Set field of R-TWTx can be set to a value "4" or other values that indicate the R-TWTx is R-TWT. It will be noted that the non-AP can have multiple broadcast TWT Parameter Set fields in one or more TWT elements in one SCS descriptor element to request membership of different R-TWTs.

In at least one embodiment/mode/case the non-AP STA may set the R-TWT request field to "required" or "optional" in the TS Info field format in RTA-TSPEC element, while not adding a TWT element in the SCS descriptor element of SCSx. Then, in accord with at least one embodiment, the AP can send unsolicited R-TWT scheduling for SCSx if it accepts the SCS setup request.

The non-AP can set the R-TWT request field to "not required" and the SCS request frame is only for SCS setup as it is defined in IEEE 802.11. No TWT element is carried by the SCS descriptor element in the SCS request frame. This provides backward compatibility with the existing protocol. Then, the non-AP STA receives the SCS response frame to indicate the setup results of SCSx.

If at block 114, it is determined that the AP rejected the SCS setup request, then SCS setup has failed 124 in FIG. 21 as well as the associated R-TWT setup request.

Execution moves to block 126, wherein the AP may include the suggested parameter setting. The non-AP can re-send another SCS request frame using the suggested parameter settings to again request SCS setup. In at least one embodiment/mode/case when SCSx setup is rejected, the AP does not include the TWT element in the corresponding SCS status element in the SCS response frame.

If at block 114 in FIG. 20 non-AP receives a SCS response frame from the AP in which AP accepts the SCSx setup. Then the SCSx setup is successful and at block 116 the non-AP can differentiate the traffic of the SCS from other traffic. If the SCSx is established successfully, the non-AP STA then checks 118 in FIG. 21 if the R-TWT setup request for the SCS is accepted by the AP or not.

If the R-TWT setup request is accepted at block 118, then at block 122 the non-AP STA becomes a member of the R-TWT(s) indicated in the TWT element in the status element of SCSx in the SCS response frame. The traffic of the SCS becomes the member SCS of those R-TWT(s).

If the R-TWT setup request is not accepted at block 118, then at block 120 it does not change the non-AP STA's membership of the R-TWTs announced by the AP.

If the SCS is requested to change an existing SCS, the TWT element could not be added in the SCS descriptor element of that SCS.

If a SCS setup request is accepted, but the R-TWT setup request for that SCS is rejected, then the non-AP STA can send a TWT setup frame to request the membership of R-TWT.

Figure 22:
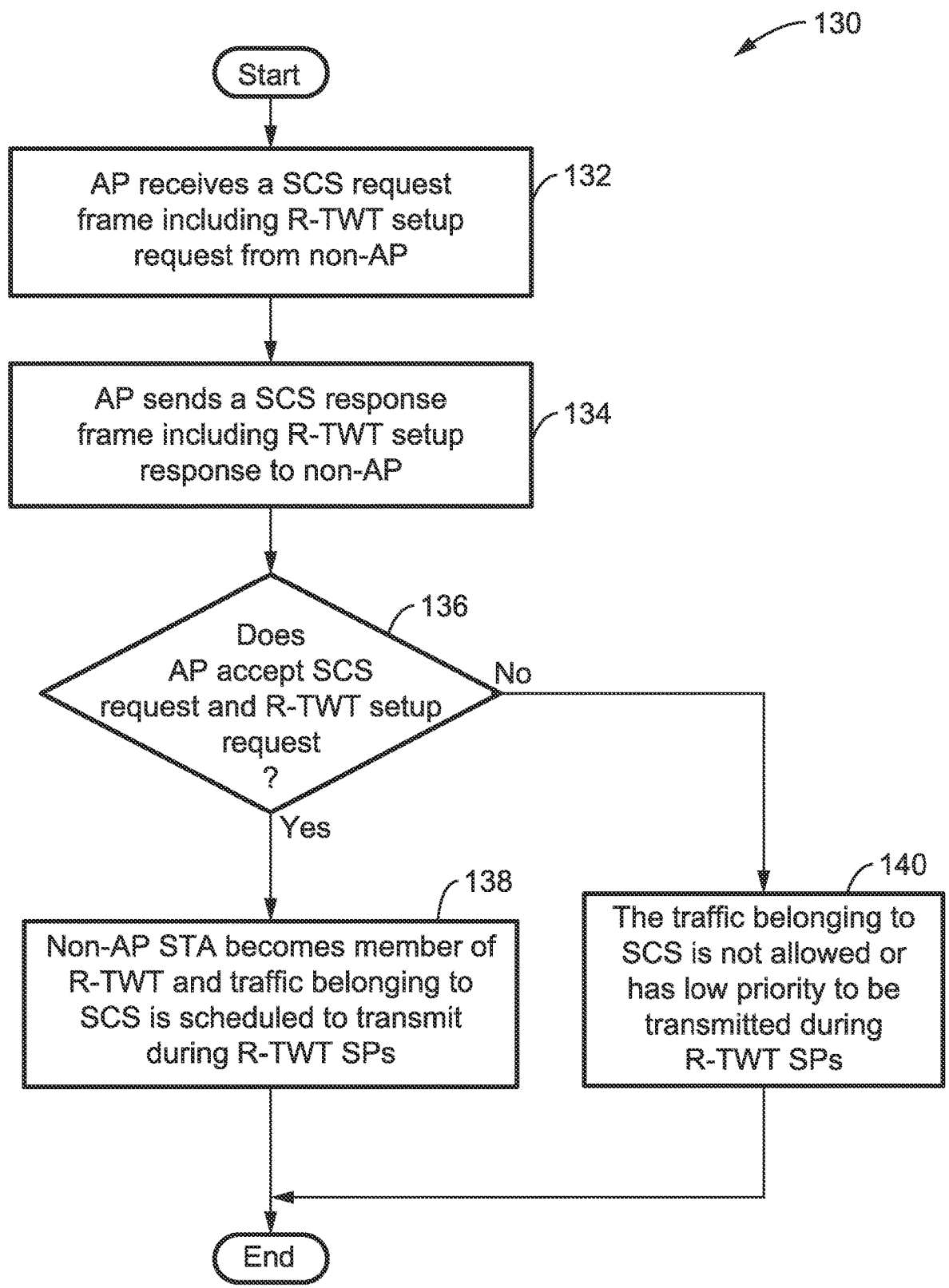
FIG. 22 is a flow diagram of an AP responding to an SCS response frame including R-TWT membership response according to at least one embodiment of the present disclosure.

FIG. 22 illustrates an example embodiment 130 of the AP responding to a SCS response frame including R-TWT setup response for a SCS.

When the AP receives 132 a SCS request frame including R-TWT setup request from the non-AP STA to establish a SCS, denoted by SCSx, and schedules R-TWT SPs to transmit the traffic belonging to SCSx, it sends 134 a SCS response frame including R-TWT setup response to the non-AP STA.

It is determined in block 136 if the AP accepts the SCS request and the R-TWT setup request. An SCSx setup made by the AP can be indicated in SCS status element of SCSx in the SCS response frame. Inside the SCS status element of SCSx, the response to the R-TWT setup for SCSx can also be included. It should be appreciated that in at least one embodiment/mode/case the AP does not include any TWT elements in the SCS status element of SCSx to indicate the rejection of R-TWT setup.

If the SCS and R-TWT are accepted, then at block 138 the non-AP STA becomes a member of the R-TWT and traffic belonging to the SCS is scheduled to transmit during R-TWT SPs. Otherwise, if the request is not accepted at block 136, then at block 140 the traffic belonging to the SCS is not allowed, or is given a lower priority than that transmitted during R-TWT SPs.

More specifically, in at least one embodiment the AP has the following options to respond to the non-AP.

(a) The AP accepts the SCSx setup and the R-TWT setup request for SCSx. In this case, SCSx is established successfully and the traffic of SCSx can be differentiated from other traffic. The AP also allocates R-TWT(s) to transmit the traffic of SCSx. The AP adds a TWT element in the modified SCS status field of SCSx to indicate R-TWT scheduling for the traffic transmission of SCSx. More particularly, when the R-TWT SP is trigger-based, the AP shall schedule transmission of the traffic belonging to the SCS during the SPs of that R-TWT.

(b) The AP accepts the SCSx setup request, but rejects the R-TWT setup request for SCSx. It is noted that this case may only arise when the AP receives the SCS request frame in which the R-TWT request field in the TS Info field format in RTA-TSPEC element in the SCS descriptor element of SCSx is set to "optional". In this case, SCSx is established successfully, but no R-TWTs are scheduled for the traffic transmission of SCSx. To reject the R-TWT setup request for SCSx, the AP can either: (1) not include a TWT element in the SCS status element for SCSx, or (2) add a TWT element with the TWT Setup Command field indicating "reject TWT" in the SCS status element for SCSx to indicate the rejection of the R-TWT setup request for that SCS, or (3) add a TWT element with the TWT Setup Command field indicating "Alternate TWT" or "Dictate TWT" in the SCS status element for the SCS to indicate the suggested parameter for the R-TWT setup for the SCS when rejecting the R-TWT setup request.

(c) Otherwise, the AP rejects the SCSx setup request and rejects the R-TWT setup request for SCSx. In this case, SCSx setup has failed, but no R-TWTs are scheduled for the traffic transmission of SCSx. To reject the R-TWT setup request for SCSx, the AP can either: (1) not include a TWT element in the SCS status element for SCSx, or (2) add a TWT element with the TWT Setup Command field indicating "reject TWT" in the SCS status element for SCSx to indicate the rejection of the R-TWT setup request for that SCS, or (3) add a TWT element with the TWT Setup Command field indicating "Alternate TWT" or "Dictate TWT" in the SCS status element for the SCS to indicate the suggested parameter for the R-TWT setup for the SCS when rejecting the R-TWT setup request.

3.3.2. Communication Frame Formats

FIG. 23 illustrates an example embodiment 150 of the modified SCS Descriptor element of an SCS which is indicated in the SCS ID field. The modified SCS descriptor element can carry an R-TWT setup request for the traffic transmission of the SCS indicated in the SCS. The modifications of this modified SCS Descriptor element compared with the SCS Descriptor element as shown in FIG. 13 are explained as below. For those fields without any explanations below, they can be either identical to those in FIG. 13 or reserved.

A Request Type field is set to indicate the request type of the SCS descriptor element. When the non-AP STA sets the request type field to "Add", then the non-AP STA requests to add a new SCS. The AP then responds whether the request is accepted or not. The AP should also accept the R-TWT setup request for the new SCS if it accepts the SCS request with the R-TWT request field in the TS info field in the RTA-TSPEC element is set to "required". If the R-TWT request field in the TS info field in the RTA-TSPEC element is set to "optional", then the AP may decline the R-TWT membership request. It should be noted that the RTA-TSPEC can be replaced by QoS characteristics element defined in IEEE 802.11be.

When the non-AP STA sets the Request Type field to "Change", then the non-AP STA is requesting to change the type of an existing SCS. When the AP receives this field, it can find the SCS using the tuple <SCSID, the non-AP STA MAC address>. Then, the AP either accepts to change the parameters of that SCS, or rejects it. If the AP declines a request to change a previously accepted SCS, the previously accepted classification and R-TWT scheduling (if it exists) is used for this SCS and continues to operate.

When the non-AP STA sets the request type to "Remove", then the non-AP STA requests to remove an existing SCS. When the AP receives this field, it can identify the SCS by the tuple <SCSID, the non-AP MLD MAC address (note that if non-AP is a STA, then it is non-AP STA MAC address)> and remove that SCS. The R-TWT SPs that are scheduled for this SCS can be changed or removed. For example, if the R-TWT SPs are scheduled for this SCS, the duration of R-TWT SPs should be reduced by the amount of time that is required to transmit the traffic belonging to this SCS when this SCS is removed. If the R-TWT SPs are scheduled for this SCS only, the R-TWT SPs should be canceled. The AP can add a TWT element to indicate the change of R-TWT scheduling.

RTA-TSPEC is set by the non-AP STA to indicate the specification and the QoS requirement of the traffic of the SCS. When the AP receives this field, the AP can use the information in this field to decide whether to accept or reject the SCS request. If AP accepts the SCS request which also requires R-TWT setup, the AP should also schedule the R-TWT SPs to transmit the traffic of the SCS and satisfy its QoS requirement.

Figure 28:
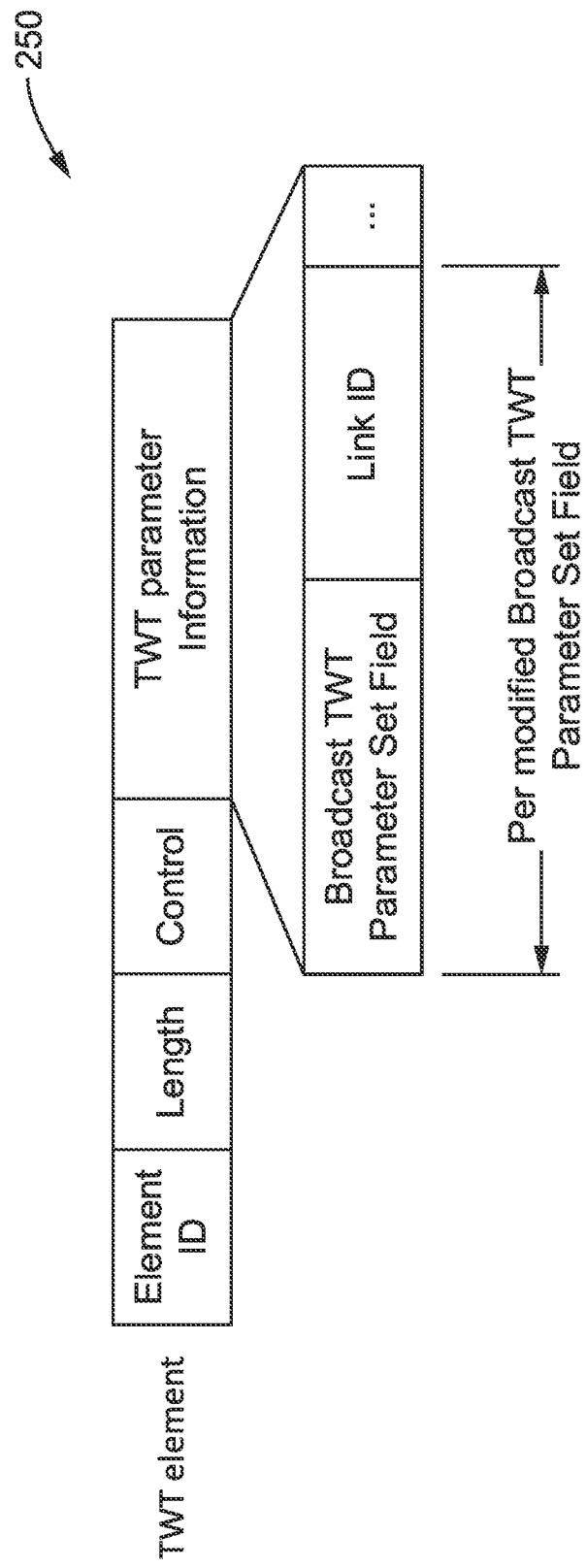
FIG. 28 is a data field diagram of a modified TWT element according to at least one embodiment of the present disclosure.

Modified TWT element field has a format shown in FIG. 28, which the non-AP STA sets to indicate the R-TWT setup request for the traffic transmission of the SCS. When the AP receives this field, it schedules R-TWT for the traffic transmission of the SCS indicated in the SCS descriptor element (i.e., SCSID) according to the requirement indicated in the TWT element. The parameter setting and function of this element can be identical to that in a TWT signaling to request the membership of a R-TWT.

The non-AP STA can decide whether to add one or more TWT elements in one SCS descriptor element when the R-TWT request subfield in the modified TS Info field is set to "required" or "optional". The TWT element should not be added in the SCS descriptor element if the R-TWT request subfield in the modified TS Info field is set to "not required". If the non-AP STA sets the R-TWT request subfield in the modified TS Info field is set to "required" or "optional", but does not add the TWT element in the SCS descriptor element, then the AP still schedules R-TWTs for the traffic transmission of the SCS indicated in the SCS descriptor element. The R-TWT scheduling can be carried in the corresponding SCS status field in the SCS response frame.

The Negotiation Type subfield of the TWT element is "3" to indicate that the non-AP STA is for a R-TWT membership.

When the request type in the SCS descriptor element is set to "Add", the TWT Setup Command field in the request type field in the Broadcast TWT Parameter Set Field(s) in the TWT element has to be set to "Request TWT", "Suggest TWT", or "Demand TWT". The TWT request subfield in the Request type field in the broadcast parameter set field(s) in the TWT element is set to "1" to indicate a R-TWT membership request.

In at least one embodiment/mode/case the request type in the SCS descriptor element is set to "Change", but it will not be possible for the TWT element to be added in the SCS descriptor element.

When the request type in the SCS descriptor element is set to "Remove", the TWT Setup Command field in the TWT element can be set to "Reject TWT" if the traffic of the SCS is the only traffic stream of the non-AP STA that is scheduled to transmit by some R-TWTs. Then, the non-AP STA is no longer a member of those R-TWTs.

In at least one embodiment/mode/case multiple TWT elements can be carried in one modified SCS Descriptor field to indicate a single value or a range of values, such as the Target Wake Time (TWT) field, Nominal Minimum TWT Wake Duration field, and for the TWT wake interval parameter for a same R-TWT. To indicate a single value for a parameter, the STA sets the value of that parameter to be the same in each TWT element for the same R-TWT on the same link. A range of values can also be expressed. For example, in at least one embodiment, a range of values for a parameter is indicated by the STA setting the value of that parameter differently in each TWT element for the same R-TWT on the same link. The range indicated for a parameter is the range that starts with the lower value and includes all values up to the higher value, irrespective of their order in the TWT elements, except for the TWT Wake Interval Mantissa and the TWT Wake Interval Exponent fields. The range indicated for the TWT wake interval begins with the lower value of the two TWT wake interval values and ends with the higher value of the two TWT wake interval values, where the TWT wake interval is determined from the TWT Wake Interval Mantissa and TWT Wake Interval Exponent fields. (copied from Draft P802.11ax D8.0).

FIG. 24 illustrates an example embodiment 170 of an RTA-TSPEC element which can incorporate two parts, the original TSPEC as well as the RTA attributes of the present disclosure, which is exemplified with subfields of Nominal Service Interval, Reliability, Jitter, MSDU Lifetime and Deterministic Service. It should be appreciated that a subset or superset of the above subfields may be utilized without departing from the teachings of the present disclosure.

FIG. 25 illustrates an example embodiment 190 of a modified TS Information field in the RTA-TSPEC element. TSPEC can be identical to that shown in FIG. 1 except that The TS info field is as shown in FIG. 25 instead of FIG. 2.

The value of the TSID field in the TS info field of TSPEC can be set to values 0 to 15 instead of from 8 to 15 as it was in FIG. 1.

The User priority in the TS info field of TSPEC (or the control info field of QoS characteristics element) can be reserved when there is at least one TCLAS element or intra AC priority element in the same SCS descriptor element. When no TCLAS element is present in the same SCS descriptor element, the user priority (or TID) can be set to indicate the user priority (or TID, respectively) of the traffic. If the SCS setup is successful, the traffic of that user priority (or TID, respectively) will belong to that SCS. For example, if this user priority (or TID, respectively) is set to "6", i.e., UP6 (or TID6, respectively), for an SCS setup, then all the traffic of UP6 (or TID6, respective) belongs to that SCS. If TID is between 0 and 7, the UP has to be the same value as TID.

A Default use case field can be added to the TS Info field (or the control info field of QoS characteristics element). This field can be set to indicate several classical use cases of the traffic, such as AR/VR, online gaming, robotics, and so on. When the default use case is set to "0", then it indicates the use case is unspecified, and that the parameters in the RTA-TSPEC element should be set manually. If the default use case field is set to a specific use case, e.g., AR/VR, then some parameters in the RTA-SPEC element can be set by default. In at least one embodiment/mode/case the default use case can control the format of RTA-TSPEC. Some fields with default parameter settings for the specific use case in the RTA-TSPEC element can be removed from the RTA-TSPEC and some additional fields can be added.

An R-TWT request field is set to indicate whether the AP needs to schedule R-TWT SPs for the traffic transmission of the SCS traffic stream.

If this field is set to "required", then the AP has to schedule R-TWTs for the traffic transmission of the SCS. The AP has to decline the SCS setup request from the non-AP STA if it can't schedule R-TWTs for the traffic transmission of the SCS.

If this field is set to "optional", then the AP attempts to schedule R-TWTs for the traffic transmission of the SCS. The AP can accept the SCS membership request from the non-AP even if it is unable to schedule R-TWT SPs for the traffic transmission of SCS.

If this field is set to "not required", then the AP does not need to consider R-TWT scheduling for the SCS during the SCS setup procedure. The TWT element is not included in the same modified SCS Descriptor element or the same modified SCS status field of the RTA-TSPEC element.

When this field is set to "required" or "optional", the non-AP STA can include a TWT element in the same modified SCS Descriptor element of the RTA-TSPEC element to indicate its TWT setup request.

When this field is set to "required" or "optional", then in at least one embodiment/mode/case the non-AP STA does not include any TWT element in the same modified SCS Descriptor element of the RTA-TSPEC element. Then, the AP can still send a TWT element in its response frame to schedule R-TWT SPs for the traffic transmission of the SCS.

Returning to FIG. 24 an RTA Attributes field indicates the additional QoS requirement for latency sensitive traffic under this RTA-TSPEC. In at least one embodiment/mode/case this field only appears with/in TSPEC element when RTA-TSPEC is implemented on both the non-AP STA and the AP.

A Reliability field is set by the non-AP STA to indicate the packet loss requirement of the latency sensitive traffic under this RTA-TSPEC. When the AP receives this field, it should estimate the resource distribution for the transmission of the traffic under this RTA-TSPEC to ensure that the packet loss of the traffic under this RTA-TSPEC is less than the packet loss indicated in the Reliability field. The packet loss can be the ratio of packets under this RTA-TSPEC which is not delivered within the bounded latency (or the MSDU lifetime). It should be noted that this field can also represent the ratio of packets under this RTA-TSPEC which is delivered within the bounded latency (or the MSDU lifetime).

A Jitter field is set by the non-AP STA to indicate the jitter requirement of the traffic under this RTA-TSPEC. When the AP receives this field, it preferably performs an estimation of the resource distribution for the transmission of the traffic under this RTA-TSPEC to ensure that the jitter requirement of the traffic under this RTA-TSPEC can be satisfied.

A MSDU Lifetime field represents the time that the MSDU can be stored in the queue. The non-AP STA sets this field to indicate the MSDU or A-MSDU lifetime of the traffic under this RTA-TSPEC when the Deterministic Service field is set to a first state (e.g., "1"). When the non-AP STA receives this field and the Deterministic Service field is set to this first state, then the MSDU or A-MSDU will be dropped when the MSDU or A-MSDU is not transmitted successfully within its lifetime. When the Deterministic Service field is set to a second state (e.g., "0"), this field is reserved. It should be noted that this field may be replaced by the Delay Bound field in TSPEC element.

A Deterministic Service field is set by the non-AP STA to indicate whether the MSDU of the traffic under this RTA-TSPEC will be dropped when its lifetime expires. If the non-AP STA sets this field to a first state (e.g., "1"), then the MSDU or the A-MSDU of the traffic under this RTA-TSPEC will be dropped when its lifetime expires. Otherwise, the non-AP STA sets this field to a second state (e.g., "0"). When the AP receives this field with value "1", then the MSDU of the traffic under this RTA-TSPEC will be dropped when its lifetime expires. When the AP receives this field which is set to "0", there is no lifetime for the MSDU of the traffic under this RTA-TSPEC. It will be noted that this field is not needed if a value of MSDU lifetime field, e.g., "0", represents that the MSDU lifetime is not specified and the MSDU of the traffic under this RTA-TSPEC will not be dropped due to the expiration of MSDU lifetime.

FIG. 27 illustrates an example embodiment 230 of the modified SCS Status field of SCS as indicated in the SCS ID field. The modified SCS status field can carry a R-TWT setup response for the traffic transmission of the SCS indicated in the SCS. The modifications of the modified SCS status field compared with that shown in FIG. 14 are explained below. For those fields without any explanations below, they are either identical to those in FIG. 1 or reserved. The fields of SCS status are as follows.

An Element ID field indicates this is a modified SCS status element. A Length field indicates the length of the modified SCS status element.

The TCLAS field, the TCLAS Processing field, and the RTA-TSPEC field are set to indicate the suggested parameters in those fields when the AP rejects the SCS setup request by the non-AP STA. The non-AP STA can use the suggested parameters to re-send the SCS setup request. If the AP accepts the SCS setup, the AP can duplicate the parameters from those fields received from the SCS setup request, or can determine not to include those fields in the SCS status field.

A Modified TWT element field can be configured as shown in FIG. 28. The AP sets this field to indicate the R-TWT setup response for the traffic transmission of the SCS. When the non-AP STA receives this field, it can then determine whether some R-TWTs are scheduled for the traffic transmission of the SCS. The parameter setting and function of this element can be identical to that in TWT signaling to respond to the membership request of a R-TWT.

If the TWT request is accepted, the non-AP STA should follow the R-TWT scheduling as indicated in the TWT element for the traffic transmission of the SCS.

If the TWT request is not accepted, the information in the TWT element indicates the suggested parameter setting in the TWT element to request R-TWT membership for the SCS traffic stream. The non-AP STA can send a separate TWT request frame to request R-TWT membership. The Negotiation Type subfield (as shown in FIG. 6) of the TWT element is "3".

In at least one embodiment/mode/case the AP adds more than one Modified TWT element in one modified SCS status element to schedule multiple R-TWTs for the traffic transmission of the SCS traffic stream. In at least one embodiment/mode/case if one Modified TWT element is set to accept the TWT setup, then the other Modified TWT elements in the same SCS status element must be set to accept the TWT setup as well.

It should be noted that the result of the SCS setup (e.g., accept or reject a SCS setup) is reported in the Status field in the modified SCS status as that in FIG. 14.

FIG. 28 illustrates an example embodiment 250 of modified TWT element. All the fields in the modified TWT element can be identical to those in the TWT element as shown in FIG. 5 except that a Link ID field is added in each (modified) broadcast TWT parameter set field. It will be noted that the modified broadcast TWT parameter set field can be used in TWT signaling as shown in FIG. 15.

A Link ID field is set to indicate the link on which the TWT information indicated in the corresponding broadcast TWT parameter set field will take effect. For example, when the link ID in the modified broadcast TWT parameter set field is set to Link2, then the modified broadcast TWT parameter set field will take effect on Link2.

When setting the parameters in the broadcast TWT parameter set field, the parameter setting can be based on the time reference of the link indicated in the Link ID field. For example, when the link ID in the modified broadcast TWT parameter set field is set to Link2 and the modified broadcast TWT parameter set field is sent over Link1, then its target wake time field can be set to the Timing synchronization function (TSF) time of the non-AP STA (or the AP) on Link2 at which time the non-AP STA on Link2 is directed to wake up.

A TWT parameter information field can have multiple modified broadcast TWT parameter set fields. It some instances broadcast TWT parameter set fields can have different TWT IDs. Then, each broadcast TWT parameter set field represents the TWT setup commands for an independent TWT.

It is also allowable that several broadcast TWT parameter set fields can share the same TWT ID, but using different link IDs. This can be used to indicate a TWT whose SPs are scheduled during the same periods of time (i.e., the TWT SPs on different links start and end at the same time) on different links. In this case, the TWT ID can be managed by the AP at MLD level. That is, if there is a TWT created by an AP MLD whose TWT ID is 3 on Link1 only, there should not be another TWT whose TWT ID is 3 on the other links of the same AP MLD. It should be noted that TWT ID 0 could be an exception.

It should also be recognized that the trigger field in the Request type field in the Broadcast TWT parameter Information field as shown in FIG. 8 can be different when it is in a modified broadcast TWT parameter set field. When this field is set to a first state (e.g., "1") in a modified broadcast TWT parameter set field of a R-TWT, it indicates that the R-TWT SPs are trigger-enabled R-TWT SPs. During the trigger-enabled R-TWT SPs scheduled in the modified broadcast TWT parameter set field, when non-AP STAs which are not member STAs of the R-TWT SP receive this field, they are not allowed to contend for the channel during that R-TWT SP if that field specifies that only DL transmission and trigger-based UL transmissions are allowed between the AP and its associated non-AP STAs which are the members of the R-TWT during the R-TWT SPs. Thus, only the AP is allowed to contend for the channel during the R-TWT SPs and the members of the R-TWT are not allowed. It will be noted that a non-AP STA which does not support R-TWT operation is not constrained to follow this rule. Otherwise, this field is set to a second state (e.g., "0") and any members of the R-TWT can contend for the channel to start a UL transmission during the R-TWT SPs. It should be noted that this field may comprise a new field instead of reusing the trigger field in the Request type field.

It at least one embodiment the AP or AP MLD can allocate a distinct TWT ID to its broadcast TWTs and R-TWTs. That is, if the AP creates a broadcast TWT with TWT ID 1, then the AP should not allocate TWT ID 1 to another R-TWT and vice versa.

It should be appreciated that the broadcast TWT parameter set field can be replaced by any type of TWT parameter set field, such as Individual TWT parameter set fields for individual TWT signaling. Then, a (modified) Individual TWT parameter set field attached with a link ID field represents the individual TWT parameter set for the link indicated in the link ID field. The time setting, such as target wake time, in the Individual TWT parameter set field is set based on the TSF time on the link indicated in the link ID field.

3.3.3. Examples of Setting up R-TWT SPs during SCS Setup

This section illustrates several examples of setting up R-TWT SPs during SCS setup procedure.

Table 1 provides details on three SCS traffic streams (SCS1, SCS2 and SCS3) at a R-TWT scheduling AP for the examples shown in FIG. 29 through FIG. 32.

In SCS1 the SCSID is set to a first state (e.g., "1") and this SCS is established between STA2 and AP1 (or MLD1). The direction of this SCS traffic stream is uplink. The Traffic Identifier (TID) of this SCS is "8" and user priority value is "5". Two TWTs (i.e., TWTID 1 and 3) are scheduled to transmit this SCS traffic stream. Both TWTs are scheduled on Link1.

In SCS2 the SCSID is set to "2" and this SCS is established between MLD2 and MLD1. The direction of this SCS traffic stream is downlink. The TID of this SCS is "9" and user priority is "6". One TWT (i.e., TWTID 1) is scheduled to transmit this SCS traffic stream on Link1.

In SCS3 the SCSID is set to "3" and this SCS is established between MLD3 and MLD1. The direction of this SCS traffic stream is downlink. The TID of this SCS is "10" and user priority is "3". One TWT (i.e., TWTID 2) is scheduled to transmit this SCS traffic stream on Link2.

It should be appreciated that the SCSID can be mapped to a TID that is linked to a TWT. Also, it should be noted that TID 0 through TID 7 can be the same as UP 0 through UP 7.

Figure 33:
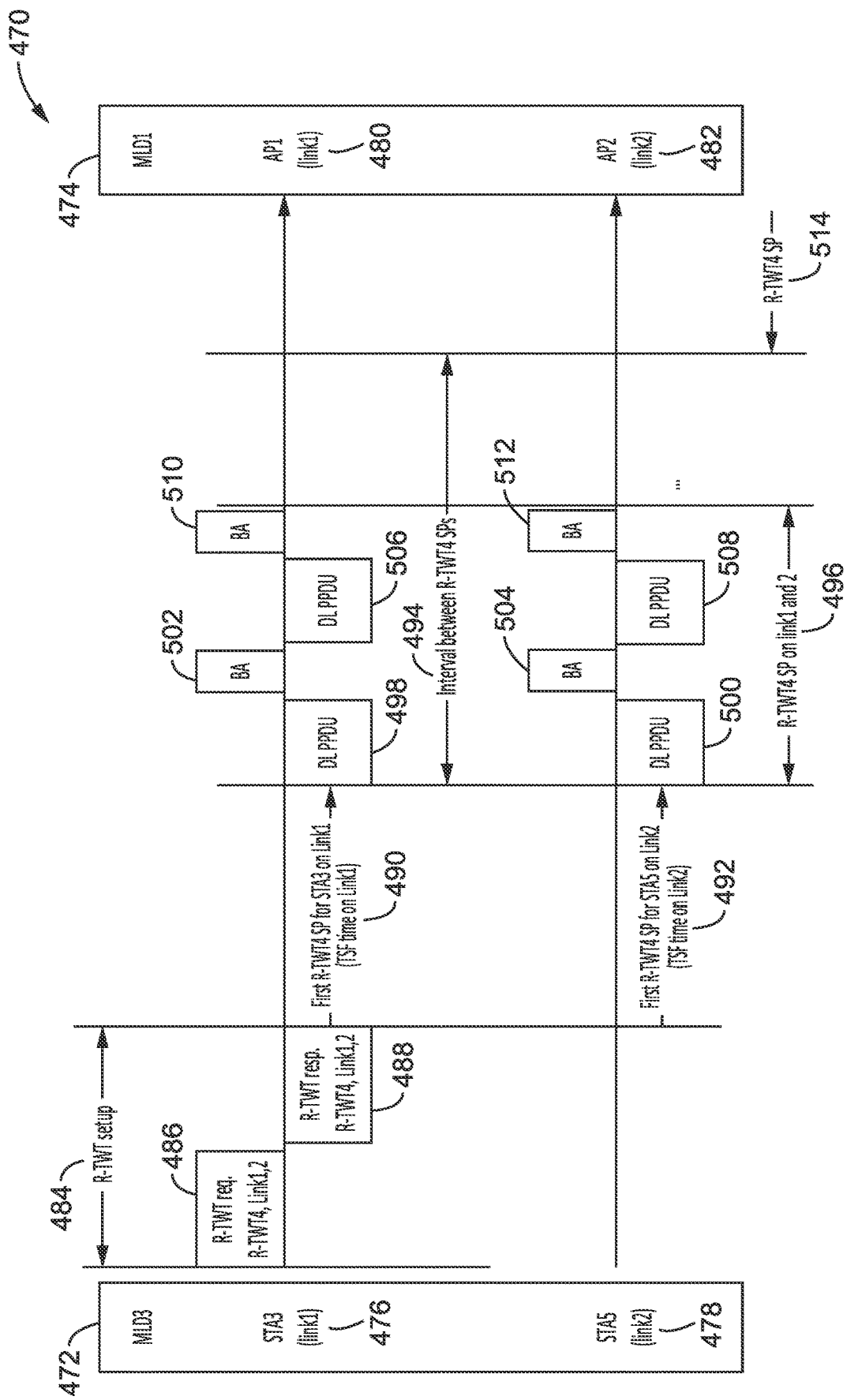
FIG. 33 is a communications diagram of R-TWT setup using modified TWT element according to at least one embodiment of the present disclosure.

Table 2 provides details on other scheduled TWTs by AP MLD1, with MLD3 being a member of those TWTs. The SPs of those TWTs are scheduled on Link1 and Link2. The examples of those TWTs are shown in FIG. 33 through to FIG. 36. The exemplified target wait times are R-TWT4 which is a restricted TWT whose TWT ID is "4"; B-TWT5 as a broadcast TWT whose TWT ID is "5"; and an I-TWT6 with an individual TWT whose TWT ID is "6".

Figure 29:
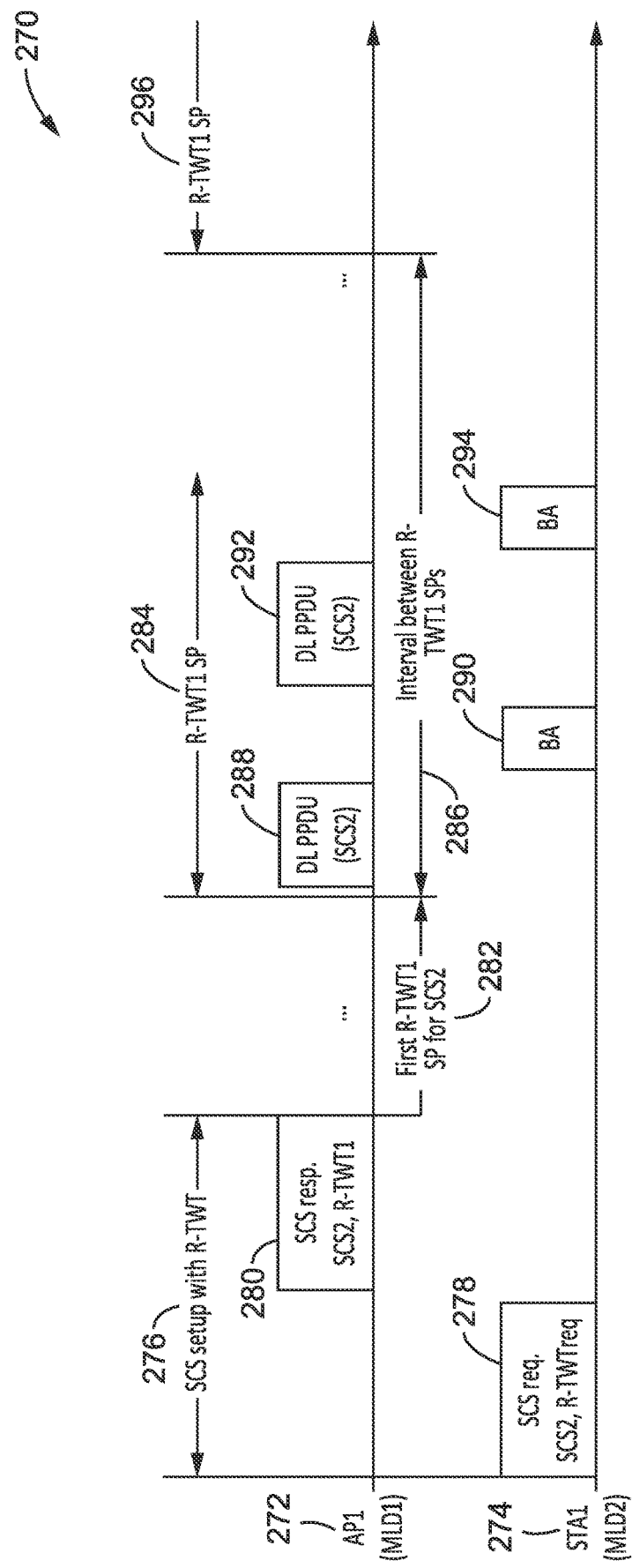
FIG. 29 is a communications diagram of SCS setup with R-TWT according to at least one embodiment of the present disclosure.

FIG. 29 illustrates an example embodiment 270 of scheduling R-TWT for a SCS traffic stream during the setup procedure of that SCS. The figure depicts communications between AP1 272 of MLD1 and STA1 274 of MLD2.

As shown in the figure, an SCS setup with R-TWT 276 commences with STA1 sending a SCS request frame 278 to AP1 to establish SCS2. The format of the SCS request frame can be similar to that shown in FIG. 12 whereby the SCS Descriptor List field in the SCS request frame can carry the modified SCS Descriptor element (shown in FIG. 23) of SCS2.

STA1 can set the R-TWT request field to "required" or "optional" in the TS Info field of the RTA-TSPEC element of the modified SCS Descriptor element of SCS2. Then, STA1 can include a modified TWT element in the modified SCS Descriptor element of SCS2 to indicate its R-TWT membership request for R-TWT1. It is also allowable that STA1 does not include a modified TWT element in the SCS Descriptor element of SCS2. If a modified TWT element is included, an example of the parameter setting in the modified TWT element such as described below.

The Negotiation Type subfield in the Control field of the modified TWT element is set to "3" to indicate it is for providing membership management. A modified broadcast parameter set field can be used in the TWT element whereby the broadcast TWT ID field in the broadcast TWT info field in the modified broadcast parameter set field is set to the TWT ID of R-TWT1 to indicate that the modified broadcast parameter set field is for R-TWT1.

The request subfield in the Request type field in the modified broadcast parameter set field of R-TWT1 is set to a first state (e.g., "1") to indicate a R-TWT1 membership request. TWT Setup Command subfield in the Request type field in the modified broadcast parameter set field of R-TWT1 is set to "Request TWT", "Suggest TWT" or "Demand TWT" to indicate that STA1 requests R-TWT1 membership with a suggested set of TWT parameters in the modified broadcast parameter set field for R-TWT1.

Broadcast TWT recommendation subfield in the Request type field in the modified broadcast parameter set field of R-TWT1 is set to "4" to indicate the request is for R-TWT. The Target Wake Time field in the modified broadcast parameter set field of R-TWT1 is set to a TSF time on Link1 at which STA1 suggests starting the first R-TWT1 SP for SCS2. The non-AP STA can set it to zero and allow the AP to make the decision. The TWT Wake Interval Mantissa and TWT Wake Interval Exponent fields in the modified broadcast parameter set field of R-TWT1 are set to the Interval between R-TWT1 SPs that is suggested by STA1. The non-AP STA can set it to zero and let the AP make the decision.

The nominal minimum TWT wake duration field in the modified broadcast parameter set field of R-TWT1 is set to one R-TWT1 SP time that is suggested by STA1. The non-AP STA can set it to zero and let the AP make the decision. The Link ID subfield in the modified broadcast parameter set field is set to Link1.

When AP1 receives the SCS request frame from STA1, it can decide whether to accept the request. In this example, AP1 accepts the SCS request and schedules R-TWT1 for the transmission of the SCS2 traffic stream. AP1 sends a SCS response frame 280 back to STA1. The format of the SCS response frame can be similar to that shown in FIG. 14 whereby the SCS status List field in the frame carries the modified SCS status field (as shown in FIG. 27) of SCS2. A modified TWT element carrying a broadcast parameter set field of R-TWT1 can be included in the modified SCS status field of SCS2 to indicate the R-TWT1 is scheduled to transmit the SCS1 traffic stream. An example of the parameter setting in the modified TWT element can be as described below.

The Negotiation Type subfield in the Control field of the TWT element is set to "3" to indicate it is for membership management.

A modified broadcast parameter set field can be used in the modified TWT element whereby the broadcast TWT ID field in the broadcast TWT info field in the modified broadcast parameter set field is set to the TWT ID of R-TWT1 to indicate that the modified broadcast parameter set field is for R-TWT1.

The request subfield in the Request type field in the modified broadcast parameter set field of R-TWT1 is set to a second state (e.g., "0") to indicate the modified broadcast parameter set field is to respond to a R-TWT1 membership request.

TWT Setup Command subfield in the Request type field in the modified broadcast parameter set field of R-TWT1 is set to "Accept TWT" to indicate that AP1 accepts the R-TWT1 membership request.

TWT broadcast TWT recommendation subfield in the Request type field in the modified broadcast parameter set field of R-TWT1 is set to indicate the response is for R-TWT. The Target Wake Time field in the modified broadcast parameter set field of R-TWT1 is set to a TSF time on Link1 at which the first R-TWT1 SP for SCS2 starts. The TWT Wake Interval Mantissa and TWT Wake Interval Exponent fields in the modified broadcast parameter set field of R-TWT1 is set to an Interval between R-TWT1 SPs.

The nominal minimum TWT wake duration field in the modified broadcast parameter set field of R-TWT1 is set to one R-TWT1 SP time. The Link ID subfield of the modified broadcast parameter set field of R-TWT1 is set to Link1. The figure shows an example of a trigger-enabled R-TWT1 SP 282. AP1 can obtain channel access for R-TWT1 SP 284 and commence sending DL PPDUs 288 and 292 carrying the SCS2 traffic stream to STA1 during the R-TWT1 SP, and receiving acknowledgements (e.g., Block Ack (BA)) 290 and 294.

In some instances, the R-TWT SP time should not be greater than the transmission time required by the SCS traffic streams scheduled to transmit during the R-TWT SP. For example, in this case, if STA1 is the only member of R-TWT1 SP to transmit a SCS2 traffic stream, then the R-TWT1 SP time should be equal to the transmission time required by the SCS2 traffic stream. For example, the R-TWT1 SP time per second should be equal to the medium time indicated in the RTA-TSPEC element during the SCS2 setup.

If one and only one R-TWT is scheduled for the traffic transmission of an SCS, then the interval of a R-TWT 286 (interval between two consecutive SPs of the same R-TWT) should be between the minimum service interval and maximum service interval (indicated in the RTA-TSPEC element during the SCS setup) of that SCS. For example, the interval=(the minimum service interval+the maximum service interval)/2. As shown in the figure, the interval of R-TWT1 (the interval between R-TWT1 SPs) should be between the minimum service interval and maximum service interval of SCS2. The figure depicts this interval 286 between R-TWT1 SP 284 and a subsequent R-TWT1 SP 296.

Figure 30:
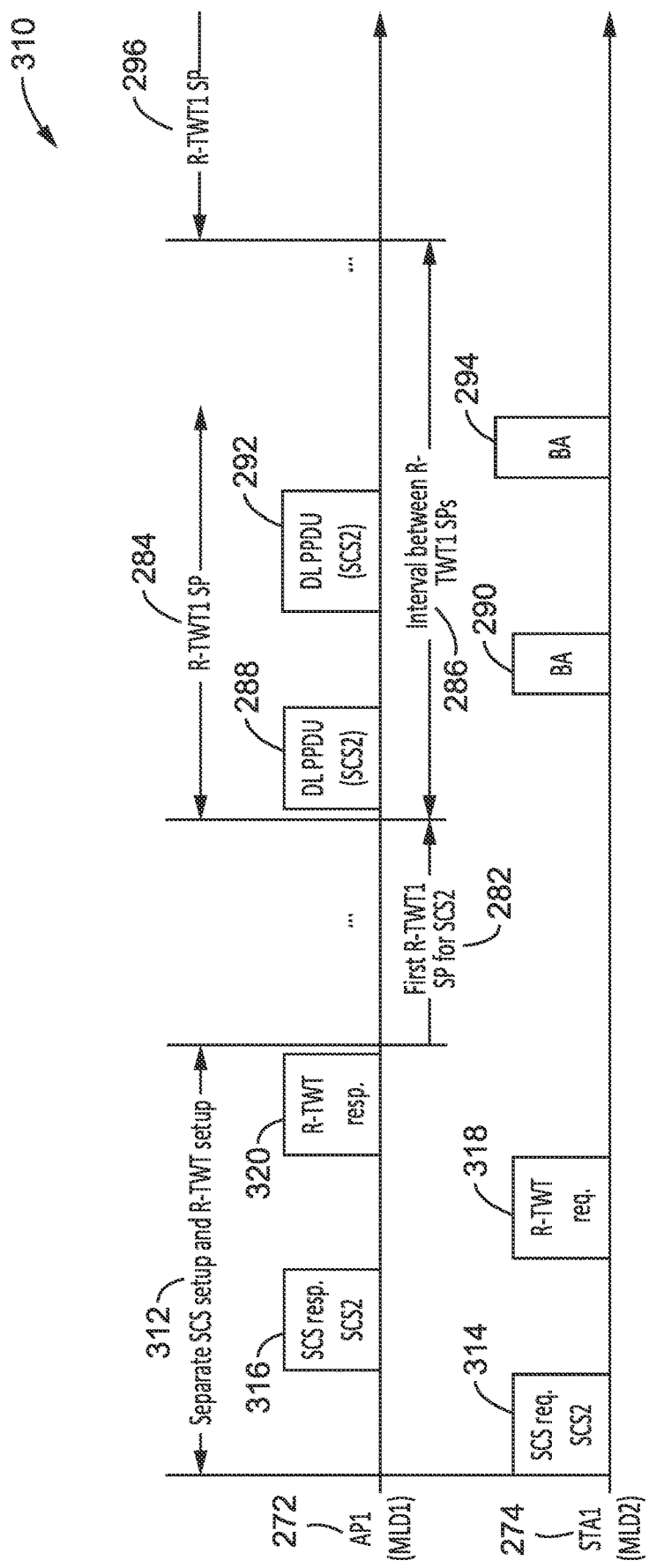
FIG. 30 is a communications diagram of not scheduling R-TWT for an SCS traffic stream during the set procedure of SCS according to at least one embodiment of the present disclosure.

FIG. 30 illustrates an example embodiment 310 showing a case of not scheduling R-TWT for a SCS traffic stream during the setup procedure of that SCS. The figure depicts communications between AP1 272 of MLD1 and STA1 274 of MLD2.

The figure illustrates use of separate SCS setup and R-TWT setup 312. STA1 sends a SCS request frame 314 to AP1 to establish SCS2. The format of the SCS request frame can be similar to that shown in FIG. 12 whereby the SCS Descriptor element for SCS2 in the frame can be as shown in FIG. 23.

STA1 can set the R-TWT request field to "optional" or "not required" in the TS Info field of the RTA-TSPEC element of the modified SCS Descriptor element of SCS2 in the SCS request frame. If STA1 sets the R-TWT request field to "optional", then STA1 can include a modified TWT element in the modified SCS Descriptor element of SCS2 to indicate its R-TWT membership request for R-TWT1 or other R-TWTs.

In some cases, STA1 may not include a modified TWT element in the modified SCS Descriptor element of SCS2. It should be noted that if the R-TWT request field is set to "not required", then the modified TWT element is not included in the SCS Descriptor element. If the R-TWT request field is set to "optional" and a modified TWT element is included in the SCS Descriptor element of SCS2, the parameters in the modified TWT element can be set as described below.

The Negotiation Type subfield in the Control field of the TWT element is set to "3" to indicate it is for membership management.

A modified broadcast parameter set field could be in the modified TWT element whereby the broadcast TWT ID field in the broadcast TWT info field in the modified broadcast parameter set field is set to the TWT ID of R-TWT1 to indicate that the modified broadcast parameter set field is for R-TWT1.

The request subfield in the Request type field in the modified broadcast parameter set field of R-TWT1 is set to a second state (e.g., "0") to indicate the modified broadcast parameter set field is to respond a R-TWT1 membership request.

TWT Setup Command subfield in the Request type field in the modified broadcast parameter set field of R-TWT1 is set to "Accept TWT" to indicate that AP1 accepts the R-TWT1 membership request. TWT broadcast TWT recommendation subfield in the Request type field in the modified broadcast parameter set field of R-TWT1 is set to indicate the response is for R-TWT. The Target Wake Time field in the modified broadcast parameter set field of R-TWT1 is set to a TSF time on Link1 at which the first R-TWT1 SP for SCS2 starts. The TWT Wake Interval Mantissa and TWT Wake Interval Exponent fields in the modified broadcast parameter set field of R-TWT1 is set to the interval between R-TWT1 SPs. The nominal minimum TWT wake duration field in the modified broadcast parameter set field of R-TWT1 is set to one R-TWT1 SP time. The Link ID subfield of the modified broadcast parameter set field of R-TWT1 is set to Link1

When AP1 receives the SCS request frame from STA1, it determines whether to accept the request and send a SCS response frame back. The format of the SCS response frame 316 can be similar to that shown in FIG. 14 whereby the SCS status List field in the frame carries the modified SCS status field of SCS2 as shown in FIG. 27. A modified TWT element can be included in the SCS status field for SCS2 to indicate the R-TWT setup result for the SCS1 traffic stream if STA1 request to set up R-TWT for SCS2.

In this example, AP1 accepts the SCS request, but does not schedule R-TWT for the transmission of the SCS2 traffic stream at that time; such as exemplified in the following scenario.

STA1 requests membership of a R-TWT other than R-TWT1 but AP1 does not accept that membership request. Instead, AP1 sends a SCS response frame including a TWT element back to STA1 to suggest AP1 to request membership for R-TWT1. The parameter setting in the modified TWT element can be as described below.

The Negotiation Type subfield in the Control field of the TWT element is set to "3" to indicate it is directed for membership management. A modified broadcast parameter set field can be in the modified TWT element whereby the broadcast TWT ID field in the broadcast TWT info field in the broadcast parameter set field is set to the TWT ID of R-TWT1 to indicate that the broadcast parameter set field is for R-TWT1. The request subfield in the Request type field in the modified broadcast parameter set field of R-TWT1 is set to "0" to respond a R-TWT1 membership request for SCS2. TWT Setup Command subfield in the Request type field in the modified broadcast parameter set field of R-TWT1 is set to "Dictate TWT" to indicate that AP1 does not accept the R-TWT1 membership request for SCS2, but the parameters in the modified broadcast parameter set field contain the suggested parameters for re-sending the R-TWT setup request. The TWT broadcast TWT recommendation subfield in the Request type field in the modified broadcast parameter set field of R-TWT1 is set to indicate that R-TWT1 is R-TWT. The Target Wake Time field in the broadcast parameter set field of R-TWT1 is set to a TSF time on Link1 at which the first R-TWT1 SP for SCS2 starts. The TWT Wake Interval Mantissa and TWT Wake Interval Exponent fields in the broadcast parameter set field of R-TWT1 is set to Interval between R-TWT1 SPs. The nominal minimum TWT wake duration field in the broadcast parameter set field of R-TWT1 is set to one R-TWT1 SP time.

After SCS2 is established successfully, STA1 can send a TWT setup frame to request 318 membership of an R-TWT, such as R-TWT1. Then, AP1 can decide to accept or reject the request as defined in the IEEE 802.11ax. The format of the TWT setup frame can be the same as shown in FIG. 16 whereby the format of the TWT element in the frame can be as shown in FIG. 28. It should be recognized that the R-TWT setup (R-TWT request 318 and R-TWT response 320) can be performed independently at any time.

The figure shows an example of a trigger-enabled R-TWT1 SP. AP1 is shown obtaining channel access for the first R-TWT1 SP for SCS2 282 and starting R-TWT1 SP 284 with sending DL PPDUs 288 and 292 carrying the SCS2 traffic stream to STA1 during the R-TWT1 SP, and receiving BAs 290 and 294 from STA1.

An interval 286 between R-TWT SPs is shown between a first R-TWT SP 284 and a second R-TWT SP 296. It at least some cases the R-TWT SP time should not be greater than the transmission time required by the SCS traffic streams scheduled to transmit during the R-TWT SP. For example, in this case, if STA1 is the only member of R-TWT1 SP to transmit SCS2 traffic stream, then the R-TWT1 SP time should be equal to the transmission time required by the SCS2 traffic stream. For example, the R-TWT1 SP time per second should be equal to the medium time indicated in the RTA-TSPEC element during the SCS2 setup.

If one and only one R-TWT is scheduled for the traffic transmission of an SCS, then in at least some cases the interval of a R-TWT (interval between two consecutive SPs of the same R-TWT) should be limited to being between the minimum service interval and maximum service interval (indicated in the RTA-TSPEC element during the SCS setup) of that SCS. For example, the interval=(the minimum service interval+the maximum service interval)/2. As shown in the figure, the interval of R-TWT1 should be between the minimum service interval and maximum service interval of SCS2.

Figure 31:
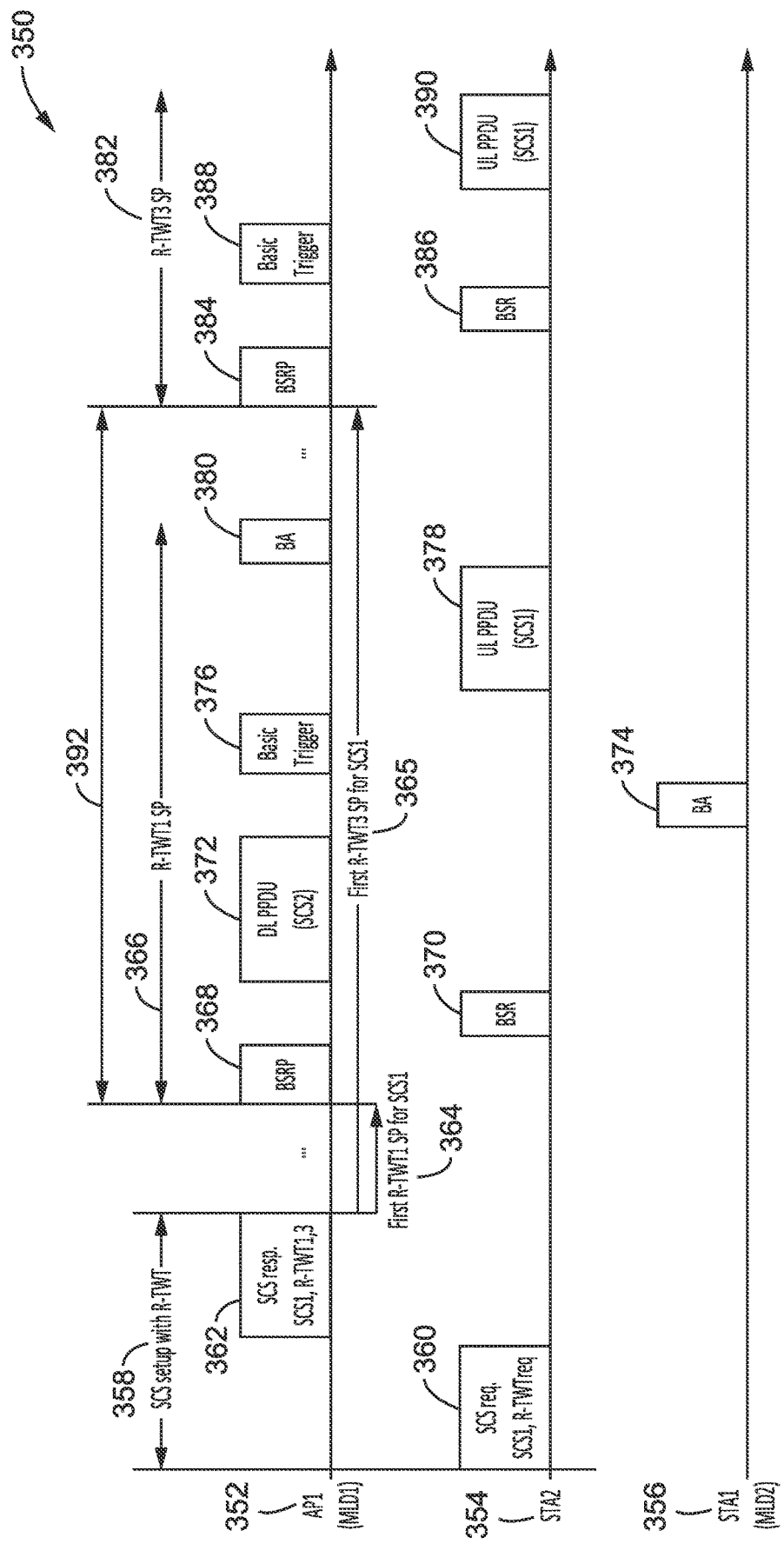
FIG. 31 is a communications diagram of scheduling multiple R-TWTs for one SCS traffic stream according to at least one embodiment of the present disclosure.

FIG. 31 illustrates an example embodiment 350 of scheduling multiple R-TWTs for one SCS traffic stream during the setup procedure of that SCS. The figure depicts communications between AP1 352 of MLD1, STA2 354 and STA1 356 of MLD2.

As shown in the figure, a SCS setup with R-TWT 358 is performed in which STA2 sends a SCS request frame 360 to AP1 to establish SCS1. The format of the SCS request frame could be similar to that shown in FIG. 12 whereby the SCS Descriptor List field in the frame can carry the modified SCS Descriptor element of SCS1 as shown in FIG. 23.

STA2 can set the R-TWT request field to "required" or "optional" in the TS Info field of the RTA-TSPEC element of the modified SCS Descriptor element of SCS1 in the SCS request frame. Then, STA2 can include a modified TWT element with multiple broadcast TWT parameter set fields (one field for R-TWT1 and the other field for R-TWT3) in the modified SCS Descriptor element of SCS1 to indicate its R-TWT membership request for R-TWT1 and R-TWT3. In certain cases, STA2 may not include any modified TWT elements in the modified SCS Descriptor element of SCS1.

When AP1 receives the SCS request frame from STA2, it can determine whether or not to accept the request. In this example, AP1 accepts the SCS request and schedules R-TWT1 and R-TWT3 for the transmission of the SCS1 traffic stream. AP1 sends a SCS response frame 362 back to STA2. The format of the SCS response frame can be similar to that shown in FIG. 14 in which the SCS Status list field in the frame carries the modified SCS status field of SCS1 as shown in FIG. 27. A modified TWT element with multiple modified broadcast TWT parameter set fields (one field for R-TWT1 and the other field for R-TWT3) can be included in the modified SCS status field of SCS1 to indicate the R-TWT1 and R-TWT3 are scheduled to transmit the SCS1 traffic stream.

The figure shows an example of a trigger-enabled R-TWT1 SP 364. In this example, STA2 and STA1 are the members of R-TWT1 and the traffic transmission of SCS1 and SCS2 are scheduled to transmit during R-TWT1 SP. AP1 obtains channel access and sends a Buffer Status Report Poll (BSRP) frame 368 to STA2 to request the buffer status of STA2. STA2 sends a Buffer Status Report (BSR) frame 370 back to report its buffer status. Then AP1 sends DL PPDU 372 carrying the SCS2 traffic stream to STA1 during the R-TWT1 SP first. This may arise because the UP of SCS2 is higher priority than the UP of SCS1. STA1 responds with a Block Acknowledgement 374. Then, AP1 sends a trigger frame 376 to STA2 to trigger UL transmission 378 for SCS1 traffic stream according to the buffer status of SCS1 traffic stream, and AP1 responds with a BA 380, which ends the first R-TWT3 SP for SCS1 365.

Similarly, when R-TWT3 SP 382 starts, AP1 schedules the UL transmission of SCS1 traffic stream during the R-TWT3 SP. The figure shows AP1 sending BSRP 384 and receiving back from STA2 a BSR 386, after which AP1 generates a basic trigger 388 which triggers STA2 to afterward transmit UL PPDU 390.

In many instances, the R-TWT SP time should not be greater than the transmission time required by the SCS traffic streams scheduled to transmit during the R-TWT SP. For example, in this case, if STA1 and STA2 are the members of R-TWT1 SP to transmit SCS2 and SCS1 traffic streams, then the R-TWT1 SP time should be equal to the transmission time required by SCS2 and SCS1 traffic streams. For example, the R-TWT1 SP time per second should be equal to the summation of the medium times indicated in the RTA-TSPEC elements during the SCS2 and SCS1 setups.

If multiple R-TWTs are scheduled for the traffic transmission of an SCS, then an R-TWT SP should be scheduled for an interval of time set between the minimum service interval and maximum service interval (indicated in the RTA-TSPEC element during the SCS setup) of that SCS. As shown in the figure, the interval 392 between two consecutive R-TWT SPs (even if the two SPs are from different R-TWTs), depicted here as R-TWT1 and R-TWT3, should be between the minimum service interval and maximum service interval of SCS1. For example, the interval of R-TWT1=The interval of R-TWT3=(the minimum service interval of SCS1+the maximum service interval of SCS1). The interval between a R-TWT1 SP and its neighboring R-TWT3 SP is between the minimum service interval and maximum service interval of SCS1, such as (the minimum service interval of SCS1+the maximum service interval of SCS1)/2. It should be noted that SCS2 has been established as shown in FIG. 29 or FIG. 30.

Figure 32:
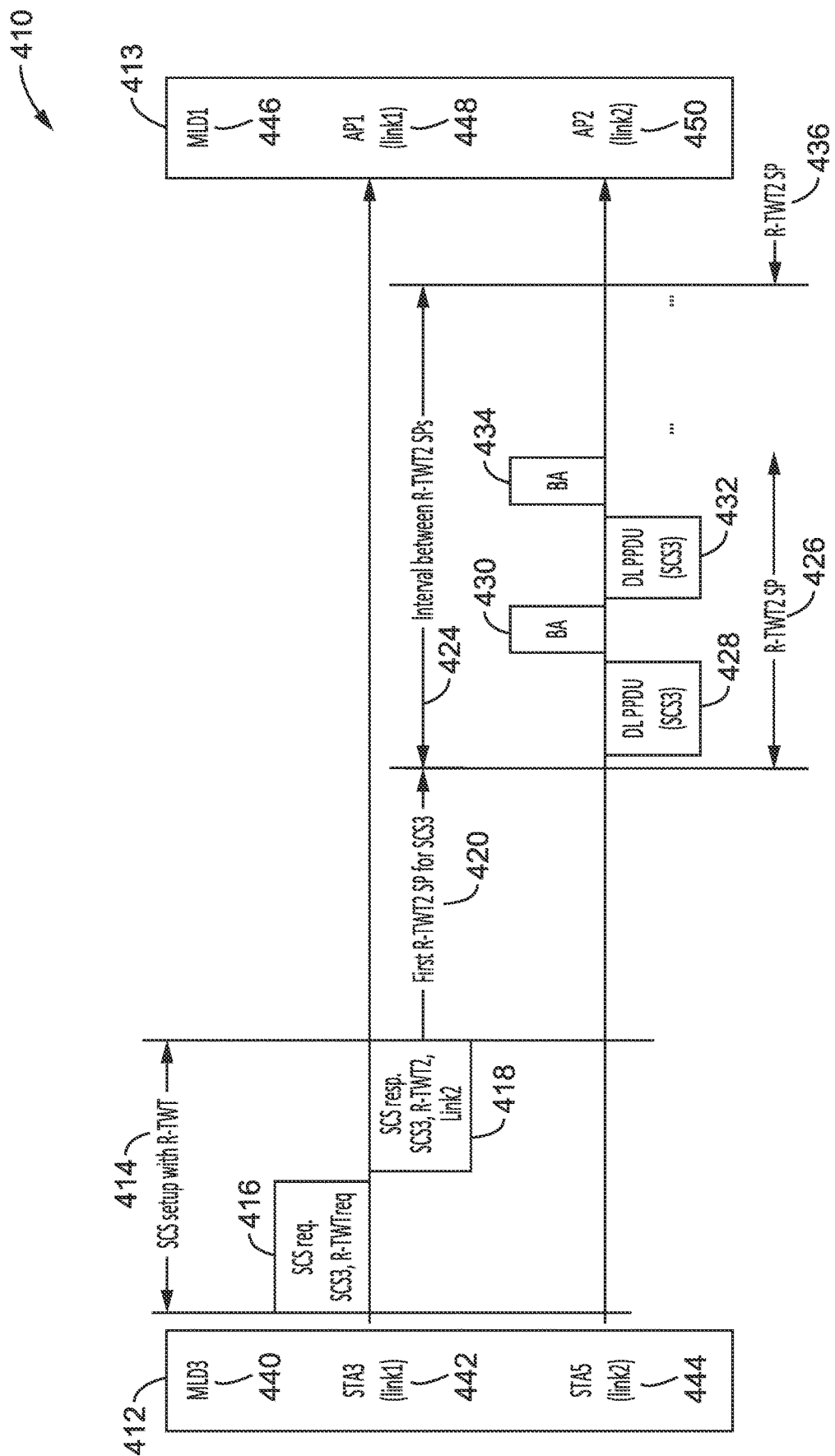
FIG. 32 is a communications diagram of SCS setup with R-TWT for other links according to at least one embodiment of the present disclosure.

FIG. 32 illustrates an example embodiment 410 of a SCS setup procedure during which R-TWT on other links is set up for the transmission of the SCS traffic stream. The figure depicts both sides 412, 413 of communication between STA3 442 and AP1 448 on Link1, and between STA5 444 and AP2 450 on Link2. STA3 and STA5 are part of MLD3 440, while AP1 and AP2 are part of MLD1 446.

As shown in the figure, STA3 sends a SCS request frame 416 to AP1 448 to establish SCS3 in an SCS+R-TWT setup process 414. The format of the SCS request frame can be similar to that shown in FIG. 12 whereby the SCS Descriptor List field in the frame carries the SCS Descriptor element of SCS3 as shown in FIG. 23.

STA3 can set the R-TWT request field to "required" or "optional" in the TS Info field of the RTA-TSPEC element of the modified SCS Descriptor element of SCS3 in the SCS request frame. Then, STA3 can include a modified TWT element in the modified SCS Descriptor element of SCS3 to indicate its R-TWT membership request for R-TWT2 on Link2. In at least one embodiment/mode/case STA3 does not include a TWT element in the modified SCS Descriptor element of SCS2. If a modified TWT element is included, an example of the parameter settings in the modified TWT element for R-TWT2 setup request can be as shown below.

The Negotiation Type subfield in the Control field of the modified TWT element is set to "3" to indicate it is for membership management. A modified broadcast parameter set field can be in the TWT element whereby the broadcast TWT ID field in the broadcast TWT info field in the modified broadcast parameter set field is set to the TWT ID of R-TWT2 to indicate that the modified broadcast parameter set field is for R-TWT2.

The request subfield in the Request type field in the modified broadcast parameter set field of R-TWT2 is set to a first state (e.g., "1") to indicate a R-TWT2 membership request. A TWT Setup Command subfield in the Request type field in the modified broadcast parameter set field of R-TWT2 is set to "Request TWT", "Suggest TWT" or "Demand TWT" to indicate that MLD3 requests the R-TWT2 membership with a suggested set of TWT parameters in the modified broadcast parameter set field for R-TWT2. TWT broadcast TWT recommendation subfield in the Request type field in the modified broadcast parameter set field of R-TWT2 is set to "4" to indicate the request is for R-TWT. The Target Wake Time field in the modified broadcast parameter set field of R-TWT2 is set to a TSF time on Link2 at which STA5 suggests starting the first R-TWT2 SP for SCS3. The non-AP STA can set it to zero and allow the AP to make decision.

The TWT Wake Interval Mantissa and TWT Wake Interval Exponent fields in the modified broadcast parameter set field of R-TWT2 is set to the Interval between R-TWT2 SPs that is suggested by MLD3. The non-AP STA can also set it to zero and allows the AP to make the determination of interval.

The nominal minimum TWT wake duration field in the modified broadcast parameter set field of R-TWT2 is set to one R-TWT2 SP time that is suggested by MLD3. The non-AP STA can set it to zero and let the AP to make decision. The Link ID subfield in the modified broadcast parameter set field is set to Link2.

When AP1 receives the SCS request frame from STA3, it can determine whether to accept the request. In this example, AP1 accepts the SCS request and schedules R-TWT2 for the transmission of the SCS3 traffic stream. AP1 sends a SCS response frame 418 back to STA3 for SCS3, R-TWT2 on Link2. The format of the SCS response frame can be similar to that shown in FIG. 14 whereby the SCS status list field in the frame carries the modified SCS status field of SCS3 as shown in FIG. 27. A modified TWT element carrying the modified broadcast parameter set field of R-TWT2 can be included in the modified SCS status field of SCS3 to indicate the R-TWT2 is scheduled to transmit the SCS3 traffic stream. An example of the parameter setting in the modified TWT element can be as described below.

The Negotiation Type subfield in the Control field of the TWT element is set to "3" to indicate it is for membership management. A modified broadcast parameter set field is in the modified TWT element whereby the broadcast TWT ID field in the broadcast TWT info field in the modified broadcast parameter set field is set to the TWT ID of R-TWT2 to indicate that the modified broadcast parameter set field is for R-TWT2.

The request subfield in the Request type field in the modified broadcast parameter set field of R-TWT2 is set to a second state (e.g., "0") to indicate the modified broadcast parameter set field is to respond with a R-TWT2 membership request. TWT Setup Command subfield in the Request type field in the modified broadcast parameter set field of R-TWT2 is set to "Accept TWT" to indicate that MLD1 accepts the R-TWT2 membership request. TWT broadcast TWT recommendation subfield in the Request type field in the modified broadcast parameter set field of R-TWT2 is set to indicate the response is for R-TWT.

The Target Wake Time field in the modified broadcast parameter set field of R-TWT2 is set to a TSF time on Link2 at which time the first R-TWT2 SP for SCS3 starts. The TWT Wake Interval Mantissa and TWT Wake Interval Exponent fields in the modified broadcast parameter set field of R-TWT2 is set to the Interval between R-TWT2 SPs. The nominal minimum TWT wake duration field in the modified broadcast parameter set field of R-TWT2 is set to one R-TWT2 SP time. The Link ID subfield of the modified broadcast parameter set field of R-TWT2 is set to Link2.

The figure shows an example of a trigger-enabled R-TWT2 SP 420. AP2 450 can obtain channel access in an interval between R-TWT2 SPs 424 and starts to send DL PPDUs 428, 432 carrying the SCS3 traffic stream to STA5 during the R-TWT2 SP 426. STA5 responds back to the PPDUs with BAs 430 and 434.

Another R-TWT2 SP 436 is seen commencing after the interval between R-TWT2 SPs.

FIG. 33 illustrates an example embodiment 470 of a R-TWT setup procedure 484 using the modified TWT element on one link to set up an R-TWT on multiple links. The figure depicts communications between STA3 476 and AP1 480 on Link1, and between STA5 478 and AP2 482 on Link2. STA3 and STA5 are part of MLD3 472, while AP1 and AP2 are part of MLD1 474.

As shown in the figure, STA3 sends a R-TWT request (setup) frame 486 on Link1 to AP1 to request membership of R-TWT4. R-TWT4 is a R-TWT whose SPs are scheduled over multiple different links. The format of the TWT request frames can be similar to that shown in FIG. 16 whereby the TWT element in the frame can be as shown in FIG. 28.

The R-TWT request frame 486 can carry multiple modified broadcast TWT parameter set fields of R-TWT4 in the TWT parameter information field in one TWT element to indicate this is a membership request for R-TWT4 whose SPs are scheduled on multiple different links. The link ID field in a modified broadcast TWT parameter set field of R-TWT4 indicates the link on which the R-TWT4 scheduling indicated in the modified broadcast TWT parameter set field is suggested to be scheduled. The target wake time field in a modified broadcast TWT parameter set field of R-TWT4 is preferable set based on the TSF on the link indicated in the link ID field of the same modified broadcast TWT parameter set field of R-TWT4. The TWT Wake interval and nominal minimum TWT wake duration can be set to the same in all the modified broadcast TWT parameter set fields. Also, the TWT setup command field in the request type field of all the broadcast TWT parameter set fields of R-TWT4 are set to the same value.

When AP1 receives the R-TWT request frame from STA3, it determines whether to accept the request. In this example, AP1 accepts the R-TWT4 request. In response, AP1 sends a R-TWT response frame 488 back to STA3. The format of the R-TWT setup (response) frame can be similar to that shown in FIG. 16 whereby the TWT element in the frame can be as that shown in FIG. 28. Multiple modified broadcast TWT parameter set fields of R-TWT4 can be included in the TWT parameter information field in one TWT element to indicate this is a membership response of R-TWT4. The target wake time field in a modified broadcast TWT parameter set fields is preferably set based on the TSF on the link indicated in the Link ID field of the same target wake time field in a modified broadcast TWT parameter set fields. For example, as shown in the figure, the target wake time field in the modified broadcast TWT parameter set field 490 of R-TWT4 on Link1 should be set to the TSF time of Link1 when the first R-TWT4 SP on Link1 starts. The target wake time field in the modified broadcast TWT parameter set field 492 of R-TWT4 on Link2 is preferably set to the TSF time of Link2 when the first R-TWT4 SP on Link2 starts. The TWT Wake interval and nominal minimum TWT wake duration is preferably set the same on all the modified broadcast TWT parameter set fields of R-TWT4. Also, the TWT setup command field in the request type field of all the modified broadcast TWT parameter set fields of R-TWT4 are set to the same value.

The figure shows an example of a trigger-enabled R-TWT4 SP. AP1 and AP2 can obtain channel access in an R-TWT4 SP 496, as exemplified in the figure, and start to send DL PPDUs 498, 500, 506 and 508 to STA3 and STA5 during the R-TWT4 SPs on both Link1 and Link2 at the same time, and respond back to the APs with BAs 502, 504, 510 and 512.

The figure also depicts an interval 494 between R-TWT4 SPs, and showing where the next R-TWT4 SP 514 would commence.

Figure 34:
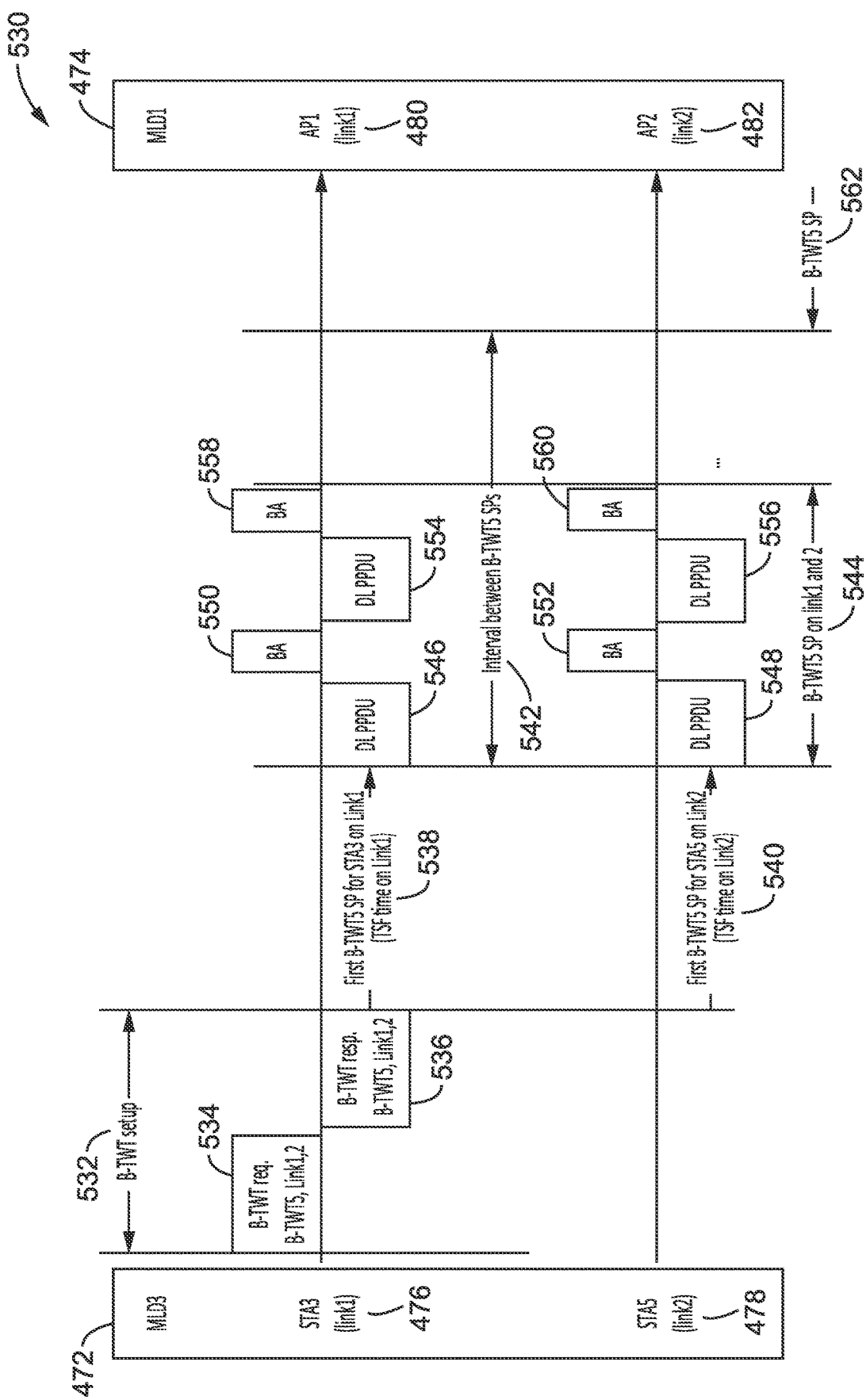
FIG. 34 is a communications diagram of a broadcast TWT setup using the modified TWT element according to at least one embodiment of the present disclosure.

FIG. 34 illustrates an example embodiment 530 of a Broadcast TWT setup procedure using the modified TWT element on one link to set up a broadcast TWT on multiple links. The figure depicts communications between STA3 476 and AP1 480 on Link1, and between STA5 478 and AP2 482 on Link2. STA3 and STA5 are part of MLD3 472, while AP1 and AP2 are part of MLD1 474.

As shown in the figure, during B-TWT setup 532, STA3 sends a B-TWT request (setup) frame 534 on Link1 to AP1 to request membership of B-TWT5. B-TWT5 is a broadcast TWT whose SPs are scheduled over multiple different links. The format of the TWT request frames can be similar to that shown in FIG. 16 whereby the TWT element in the frame can be as that shown in FIG. 28.

The B-TWT request frame 534 can incorporate multiple modified broadcast TWT parameter set fields of B-TWT5 in the TWT parameter information field in one TWT element to indicate this is a membership request for B-TWT5 whose SPs are scheduled on multiple different links. The link ID field in a modified broadcast TWT parameter set field of B-TWT5 indicates the link on which the B-TWT5 scheduling is indicated in the modified broadcast TWT parameter set field as suggested to be scheduled. The target wake time field in a modified broadcast TWT parameter set field of B-TWT5 can be set based on the TSF on the link indicated in the link ID field of the same modified broadcast TWT parameter set field of B-TWT5. The TWT Wake interval and nominal minimum TWT wake duration can be set to the same in all the modified broadcast TWT parameter set fields of B-TWT5. Also, the TWT setup command field in the request type field of all the broadcast TWT parameter set fields of B-TWT5 are set to the same value.

When AP1 receives the B-TWT request frame from STA3, it can determine whether to accept the request. In this example, AP1 accepts the B-TWT5 request and sends a B-TWT response frame 536 back to STA3. The format of the B-TWT setup (response) frame can be similar to that shown in FIG. 16 whereby the TWT element in the frame can be as that shown in FIG. 28.

Multiple modified broadcast TWT parameter set fields of B-TWT5 can be in the TWT parameter information field in one TWT element to indicate this is a membership response of B-TWT5. The target wake time field in a modified broadcast TWT parameter set field is preferably set based on the Timing Synchronization Function (TSF) 538 and 540 on the link indicated in the Link ID field of the same target wake time field in a modified broadcast TWT parameter set fields. The TWT Wake interval and nominal minimum TWT wake duration can be set to the same value on all the modified broadcast TWT parameter set fields of B-TWT5. Also, the TWT setup command field in the request type field of all the modified broadcast TWT parameter set fields of B-TWT5 are set to the same value.

The figure shows an example of a B-TWT5 SP 542, 544 in which AP1 and AP2 are shown obtaining channel access, and sending DL PPDUs 546, 548, 554 and 556 to STA3 and STA5 during the B-TWT5 SPs on both Link1 and Link2 at the same time.

The figure also depicts an interval 542 between B-TWT4 SPs, and showing where the next B-TWT4 SP 562 would commence.

Figure 35:
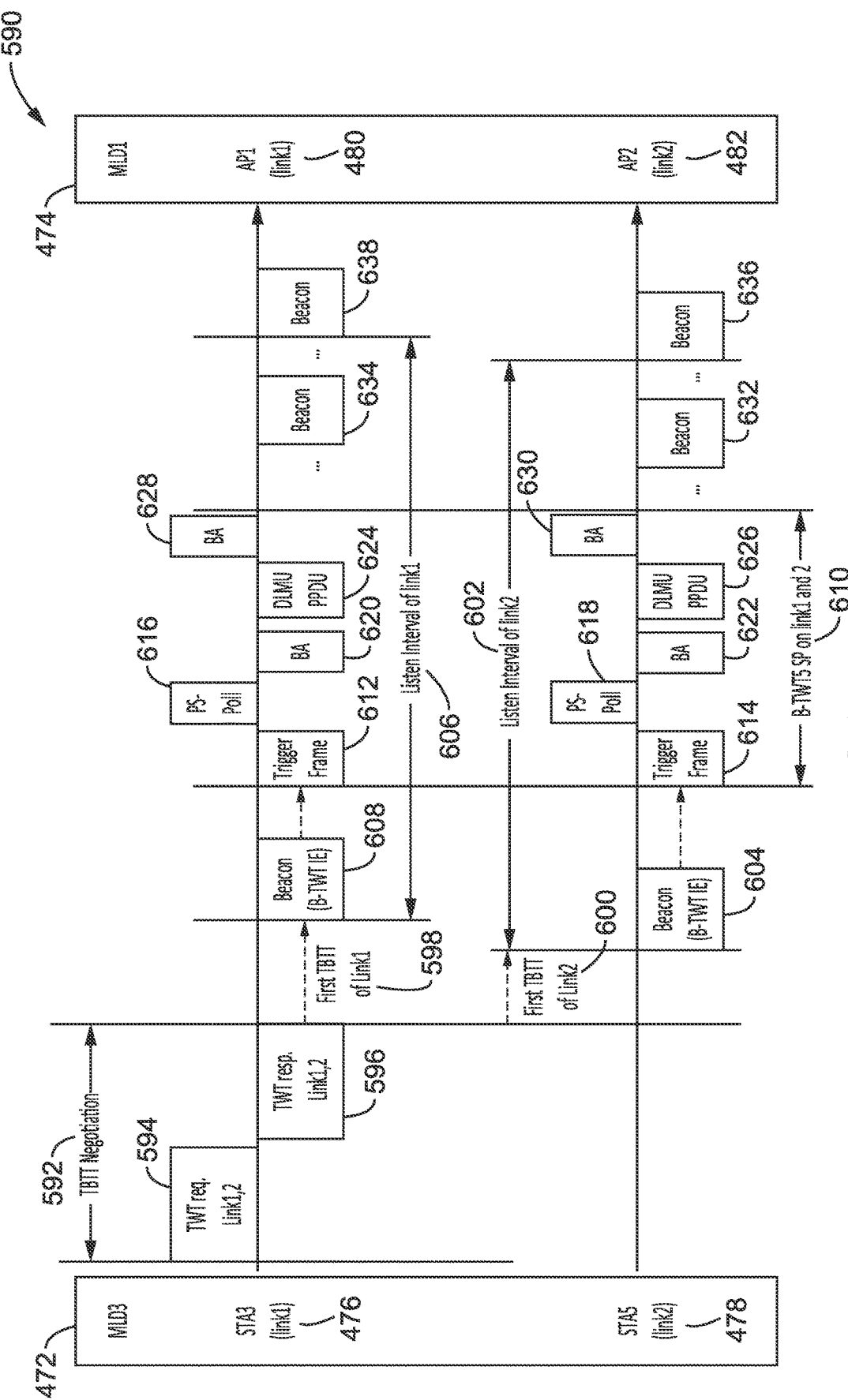
FIG. 35 is a communications diagram of wake TBTT negotiation using the modified TWT element according to at least one embodiment of the present disclosure.

FIG. 35 illustrates an example embodiment 590 of a negotiation of wake TBTT and wake interval using the modified TWT element. The figure depicts communications between STA3 476 and AP1 480 on Link1, and between STA5 478 and AP2 482 on Link2. STA3 and STA5 are part of MLD3 472, while AP1 and AP2 are part of MLD1 474.

As shown in the figure, during a TBTT negotiation 592, STA3 sends a TWT request (setup) frame 594 to AP1 on Link1 to request a negotiation of wake TBTT and wake interval on Link1 and Link2. The format of the TWT request frames can be similar to that shown in FIG. 16 whereby the modified TWT element in the frame can be as shown in FIG. 27 except that the broadcast TWT parameter set field in FIG. 28 is replaced by the individual TWT parameter set field as defined in IEEE 802.11ax. The negotiation type field of the control field of the modified TWT element is set to a first state (e.g., "1") to indicate it is a negotiation of wake TBTT and wake interval.

The TWT request frame 594 can carry multiple modified individual TWT parameter set fields (one modified individual TWT parameter set field carries one individual TWT parameter set field as defined in IEEE 802.11ax and one Link ID field) in the modified TWT parameter information field in the TWT element to indicate a negotiation of wake TBTT and wake interval on multiple links. The link ID field in each modified individual TWT parameter set field indicates the link on which the parameters in the same modified individual TWT parameter set field that the non-AP suggests being set. The target wake time field in a modified individual TWT parameter set field is set based on the TSF on the link indicated in the link ID field of the same modified individual TWT parameter set field.

When AP1 receives the TWT request (setup) frame from STA3, it determines whether or not to accept the request. In this example, AP1 accepts the negotiation request and sends a TWT response (setup) frame 596 back to STA3. The format of the TWT response frame can be similar to that shown in FIG. 16 whereby the TWT element in the frame can be similar to FIG. 28 except that the broadcast TWT parameter set field in FIG. 28 is replaced by the individual TWT parameter set field as defined in IEEE 802.11ax. The negotiation type field in the control field of the modified TWT element is set to a first state (e.g., "1") to indicate it is a negotiation of wake TBTT and wake interval. The TWT response frame can carry multiple modified individual TWT parameter set fields (one modified individual TWT parameter set field carries one individual TWT parameter set field as defined in IEEE 802.11ax and one Link ID field) in the TWT parameter information field in the modified TWT element to indicate a negotiation of wake TBTT and wake interval on multiple links. The link ID field in each modified individual TWT parameter set field indicates the link on which the parameters in the same modified individual TWT parameter set field the AP sets, and which the non-AP STA is directed to adhere to (follow). The target wake time field in a modified individual TWT parameter set field is set based on the TSF on the link indicated in the link ID field of the same modified individual TWT parameter set field.

The first TBTT on Link1 598 which is set in the Target Wake Time (TWT) indicates the time STA3 needs (has requested) to wake for receiving a beacon frame 608 from AP1 to determine the start time of B-TWT5 SP on Link1. This is set in the target wake time field in a modified individual TWT parameter set field with Link ID field set to Link1. The target wake time field can be set to the TSF time on Link1 (i.e., the TSF time of STA3 and AP1). It will be seen that after TBTT 598 a listening interval 606 commences for beacon (B-TWT IE) 608.

The first TBTT on Link2 600 which is set in the Target Wake Time indicates the time STA5 needs (has requested) to wake for receiving a beacon frame 604 from AP2 to determine the start time of B-TWT5 SP on Link2. This is set in the target wake time field in a modified individual TWT parameter set field with Link ID field set to Link2. The target wake time field can be set to the TSF time on Link2 (i.e., the TSF time of STA5 and AP2). It will be seen that after TBTT 608 a listening interval 602 commences for beacon (B-TWT IE) 604.

The figure shows an example of a trigger-enabled B-TWT4 SP 610, in which AP1 and AP2 can obtain channel access and send a trigger frame 612 and 614 (e.g., basic trigger frame or UAPSD trigger) to STA3 and STA5, respectively. STA3 and STA5 then send PS-Poll frames 616 and 618 back to indicate they are awake and ready to receive traffic. Then AP1 and AP2 send BA (Multi-user BA or Ack) 620 and 622 for the acknowledgement and commence to send DL MU PPDUs 624, 626 to STA3 and STA5 during the R-TWT2 SP, respectively, and receive acknowledgements (BA) 628 and 630 from the APs.

It should be noted that during the channel time between beacons (B-TWT IE) and Trigger frame on a link, the STA on that link can go to sleep, with beacons 632, 634, 636 and 638 shown by way of example.

Figure 36:
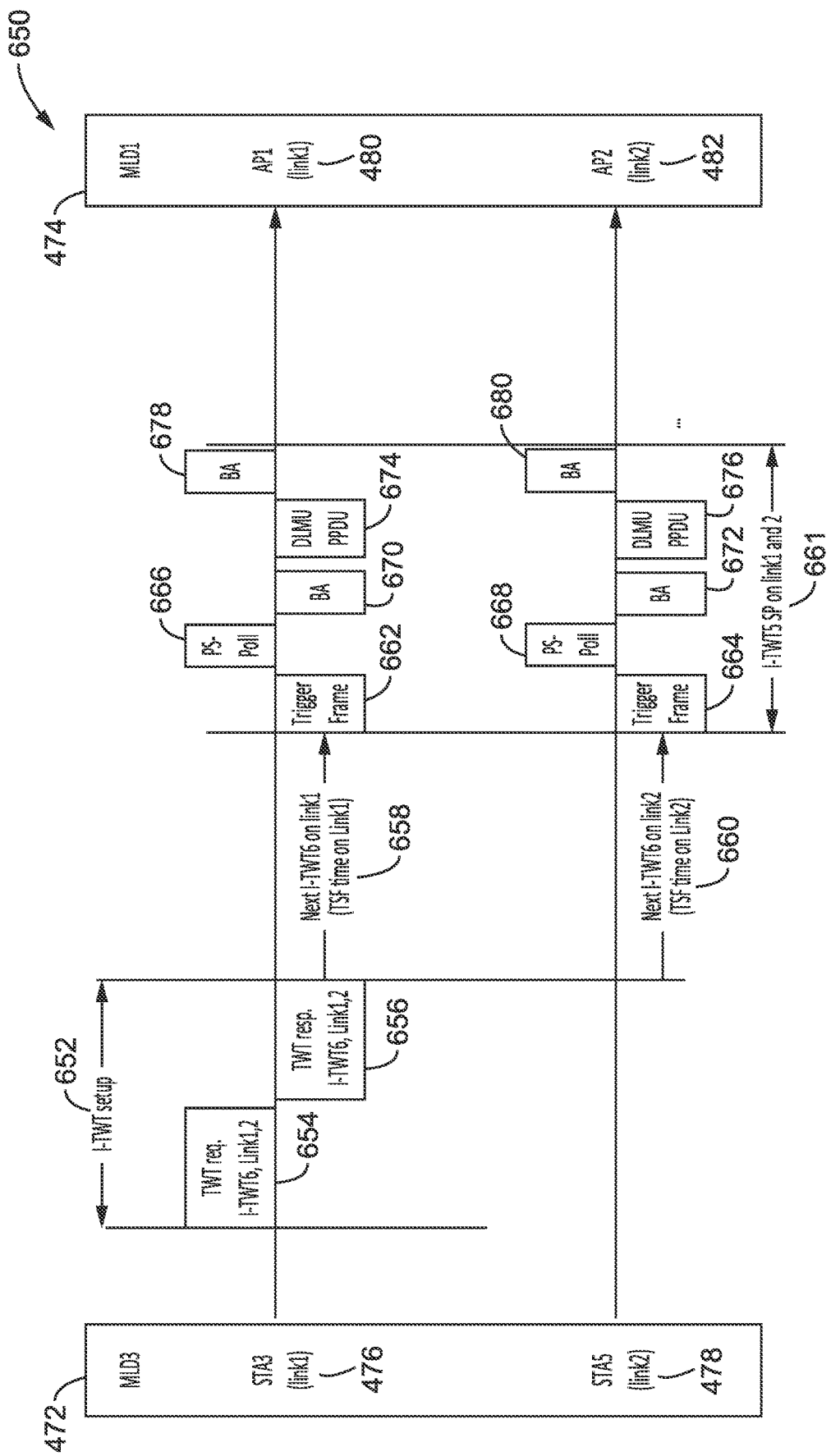
FIG. 36 is a communications diagram of Individual negotiation using modified TWT element according to at least one embodiment of the present disclosure.

FIG. 36 illustrates an example embodiment 650 of an individual TWT setup using the modified TWT element. The figure depicts communications between STA3 476 and AP1 480 on Link1, and between STA5 478 and AP2 482 on Link2. STA3 and STA5 are part of MLD3 472, while AP1 and AP2 are part of MLD1 474.

As shown in the figure, during I-TWT setup 652, STA3 sends a TWT request (setup) frame 654 to AP1 on Link1 to request an individual TWT setup on Link1 and Link2. The format of the TWT request frames can be similar to that shown in FIG. 16 whereby the modified TWT element in the frame can be as shown in FIG. 28 except that the broadcast TWT parameter set field in FIG. 28 is replaced by the individual TWT parameter set field as defined in IEEE 802.11ax. The negotiation type field in the control field of the modified TWT element is set to a second state (e.g., "0") to indicate it is a negotiation of individual TWT setup.

The TWT request frame is capable of carrying multiple modified individual TWT parameter set fields (one modified individual TWT parameter set field carries one individual TWT parameter set field as defined in IEEE 802.11ax and one Link ID field) in the modified TWT parameter information field in the TWT element to indicate a negotiation of individual TWT, denoted by I-TWT6, on multiple links. The link ID field in each modified individual TWT parameter set field indicates the link on which the parameters in the same modified individual TWT parameter set field as the non-AP suggested. The target wake time field in a modified individual TWT parameter set field is set based on the TSF on the link indicated in the link ID field of the same modified individual TWT parameter set field.

When AP1 receives the TWT request frame from STA3, it can decide whether or not to accept the request. In this example, AP1 accepts the negotiation request and sends a TWT response frame 656 back to STA3. The format of the TWT response frame can for example be similar to that shown in FIG. 16, whereby the TWT element in the frame can be similar to FIG. 28 except that the broadcast TWT parameter set field in FIG. 28 is replaced by the individual TWT parameter set field as defined in IEEE 802.11ax. The negotiation type field in the control field of the modified TWT element is set to a first state (e.g., "1") to indicate it is a negotiation of an individual TWT setup. The TWT response frame can also carry multiple modified individual TWT parameter set fields (one modified individual TWT parameter set field carries one individual TWT parameter set field as defined in IEEE 802.11ax and one Link ID field) in the TWT parameter information field in the modified TWT element to indicate a negotiation of individual TWT setup on multiple links. The link ID field in each modified individual TWT parameter set field indicates the link on which the parameters in the same modified individual TWT parameter set field that the AP sets, and the non-AP STA has to follow. The target wake time field in a modified individual TWT parameter set field is set based on the TSF on the link indicated in the link ID field of the same modified individual TWT parameter set field.

The first TBTT on Link1 which is set in the Target Wake Time indicates the time STA3 needs (has requested) to wake for the start of the first I-TWT6 SP on Link1 658. This is set in the target wake time field in a modified individual TWT parameter set field with Link ID field set to Link1. The target wake time field can be set to the TSF time on Link1 (i.e., the TSF time of STA3 and AP1).

The first TBTT on Link2 which is set in the Target Wake Time indicates the time that STA5 needs (has requested) to wake for the start of the first I-TWT6 SP 660 on Link2. This is set in the target wake time field in a modified individual TWT parameter set field with Link ID field set to Link2. The target wake time field can be set to the TSF time on Link2 (i.e., the TSF time of STA5 and AP2).

The figure shows an example of a I-TWT6 SP 661 in which AP1 and AP2 can obtain channel access, as exemplified, to send trigger frames 662 and 664 (e.g., basic trigger frame or U-APSD trigger) to STA3 and STA5, respectively. STA3 and STA5 then send PS-Poll frames 666 and 668 back to indicate they are awake and ready to receive traffic. Then AP1 and AP2 send BA 670 and 672 for an acknowledgement and start to send DL PPDUs 674 and 676 to STA3 and STA5 during the R-TWT2 SP, respectively, after which acknowledgements (e.g., BA) 678 and 680 are received.

3.4. Alternative SCS Setup Procedure for R-TWT Membership

This section introduces an alternative SCS setup procedure for R-TWT membership, which is different from Section 3.3.

This section considers the scenario that a SCS setup involves Multi-Link (ML) operations while the R-TWT setup is a link level operation. Thus, the setup procedure (i.e., SCS setup frame exchange) of a SCS can occur over any number of links, while the setup procedure (i.e., R-TWT setup frame exchange) of a R-TWT can only occur over the link where that R-TWT is scheduled.

3.4.1. Operation of Alternative SCS Setup Procedure

Figure 37:
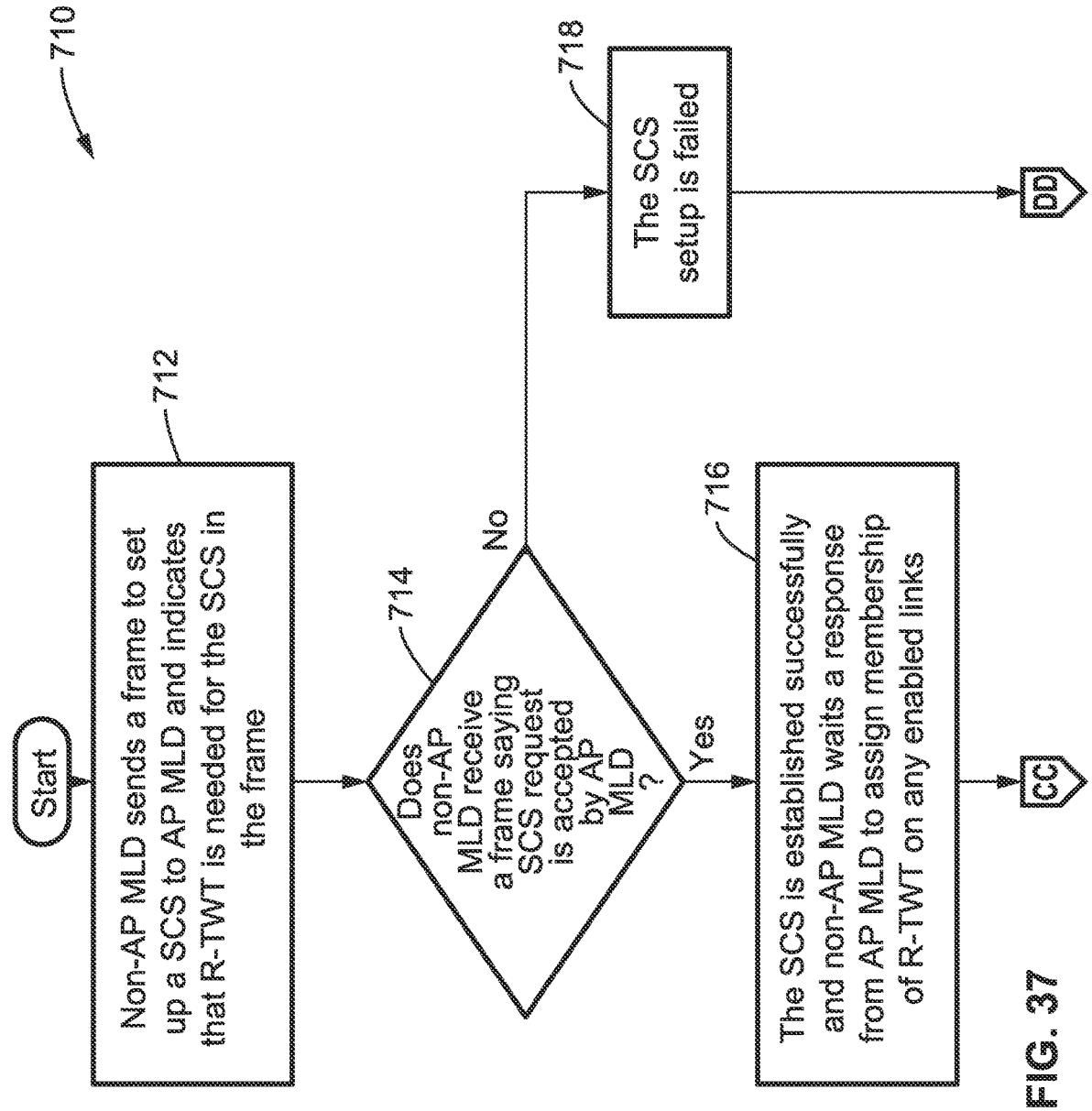
FIG. 37 and FIG. 38 is a flow diagram of a non-AP MLD initiating a SCS setup procedure that requests R-TWT scheduling for the SCS according to at least one embodiment of the present disclosure.
Figure 38:
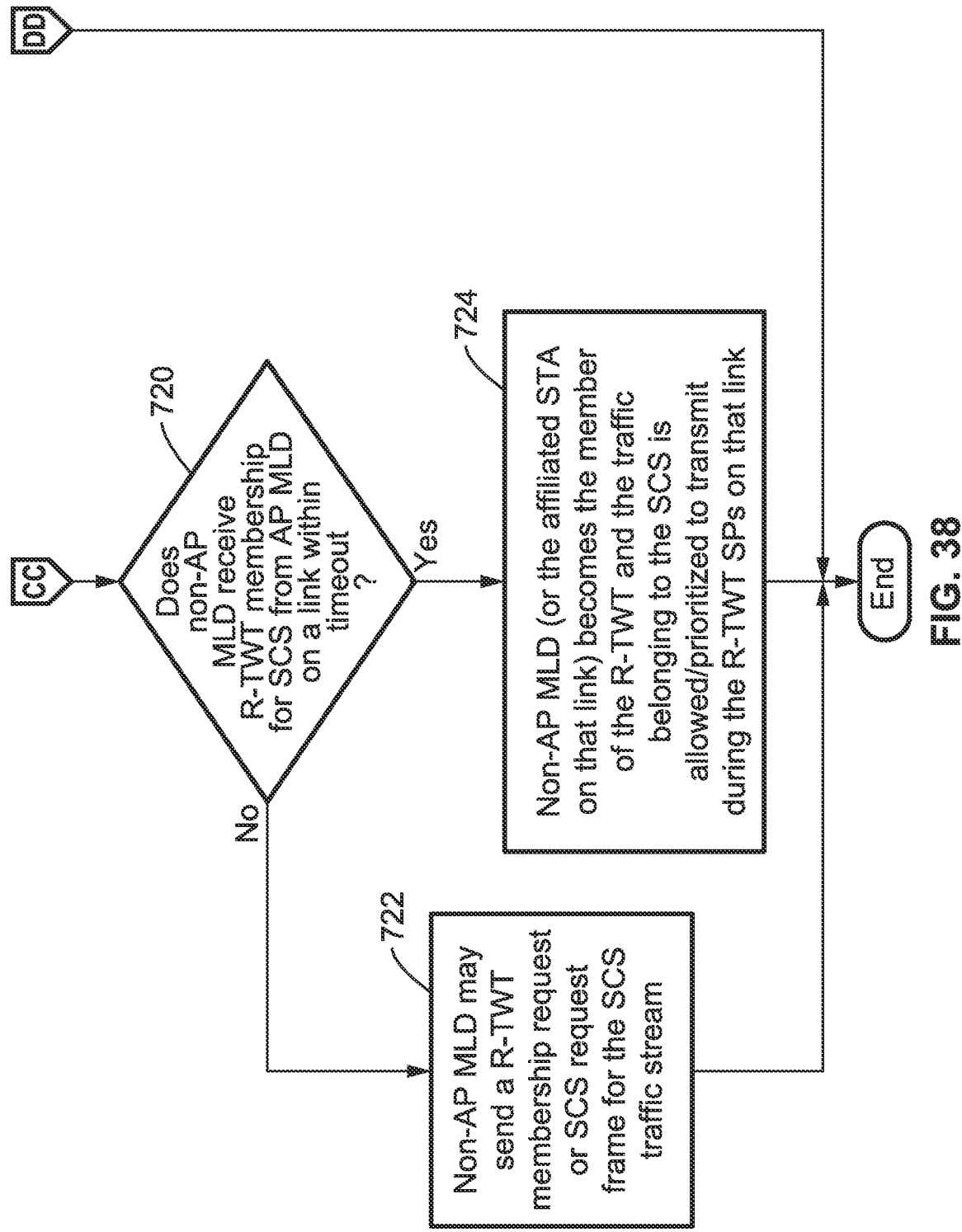

FIG. 37 and FIG. 38 illustrate an example embodiment 710 of a non-AP MLD sending a SCS request frame and indicating that R-TWT scheduling is needed (requested) for the SCS in the frame.

In FIG. 37 the non-AP MLD sends 712 a frame to set up a SCS to AP MLD and indicates that R-TWT scheduling is needed (requested) for the SCS in the frame.

Then in block 714 it is determined if the non-AP MLD has received a frame indicating that the AP MLD accepts the SCS request. If the SCS request has not been accepted, then at block 718 SCS setup has failed, and this process ends.

Otherwise, if the SCS setup has been accepted, then at block 716 the SCS is established successfully, and the non-AP MLD waits for a response from the AP MLD to assign membership of R-TWT on any enabled links (the links that the non-AP MLD has associated with AP MLD). It should be noted that when the non-AP MLD waits for the response for the R-TWT membership of the SCS, it does not send a R-TWT request frame for the SCS on any links.

Then at check 720 in FIG. 38 a determination is made if a STA affiliated with the non-AP MLD has received a frame indicating that the AP MLD accepts the membership of a R-TWT.

If the condition is not met, then at block 722 the non-AP MLD may send a R-TWT membership request frame, or another SCS request frame (with R-TWT request), for the SCS traffic stream. Thus, if the AP MLD accepts the SCS request but the non-AP MLD does not receive a frame that assigns a membership of R-TWT before timeout, then the non-AP MLD may send a R-TWT membership request for the SCS or resend SCS request frame for the SCS traffic stream. It should be noted that it in some cases the non-AP MLD may resend SCS request frame over a different link. Also, if the non-AP MLD does not receive a frame indicating that the AP MLD accepts the SCS request (within timeout), then the SCS setup has failed. The non-AP MLD may resend SCS request frame for the SCS traffic stream according to the current SCS setup rule.

Otherwise, if the R-TWT membership is accepted as determined in block 720, then that STA becomes 724 a member STA of that R-TWT and the frames from the SCS traffic streams will be allowed to transmit, or prioritized to transmit, during the SPs of that R-TWT. It should be noted that in at least one embodiment/mode/case the AP MLD assigns the membership of multiple R-TWTs for the same SCS traffic stream. In at least one embodiment/mode/case multiple R-TWTs for the same SCS traffic stream can be scheduled on different links.

It will also be noted that In at least one embodiment/mode/case the frame exchange of SCS setup procedure is transmitted over, for example Link1, while the frames that assign R-TWT membership are transmitted over links other than Link1, such as on Link2, Link3, and so forth.

Figure 39:
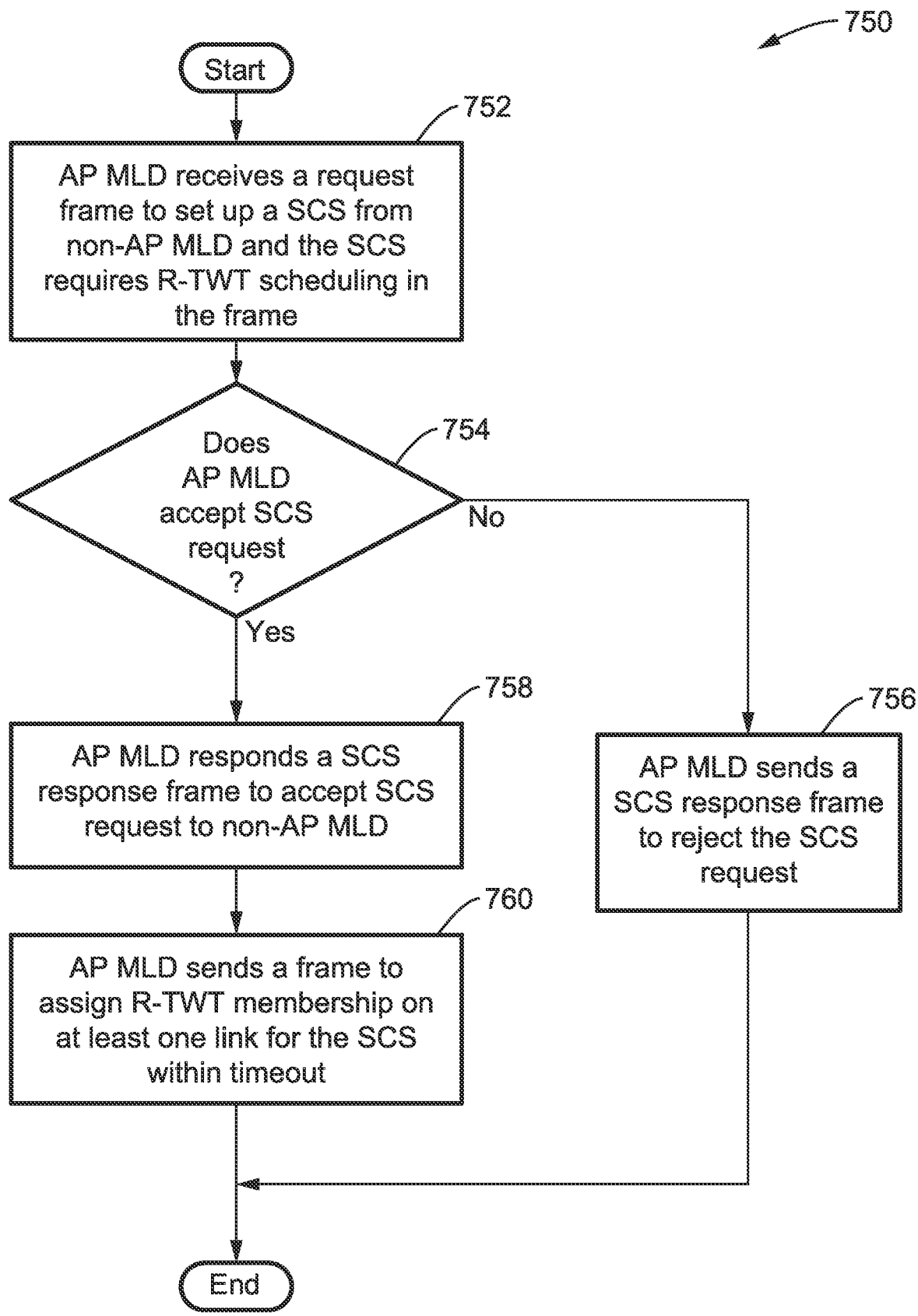
FIG. 39 is a flow diagram of an AP MLD sending a SCS response frame and assigning membership for the SCS according to at least one embodiment of the present disclosure.

FIG. 39 illustrates an example embodiment 750 of an AP MLD sending a SCS response frame and assigning membership for the SCS.

The AP MLD receives 752 a request frame to set up a SCS traffic stream from the non-AP MLD. In the frame, it requests to schedule R-TWT for the SCS traffic stream.

At check 754 it is determined if the AP MLD has accepted the SCS request. If the AP MLD does not accept the SCS request, then at block 756 the AP MLD generates a SCS response frame to reject the SCS request. It will be noted that one reason that the AP MLD may reject SCS could be that the AP MLD cannot schedule R-TWT SPs on any links for the SCS traffic stream. The AP MLD may indicate the reason for the rejection in the SCS response frame. For example, this reason can be indicated in the status field as shown in FIG. 14.

Figure 41:
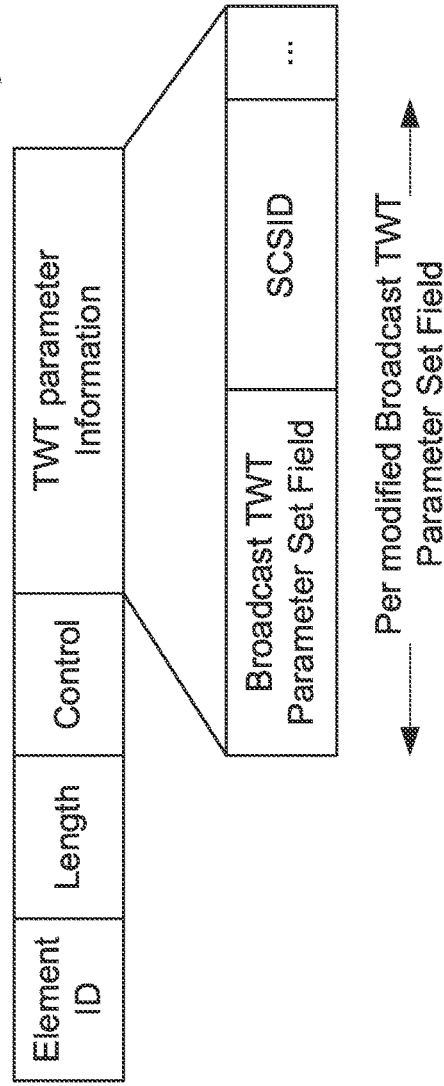
FIG. 41 is a data field diagram of a modified Broadcast TWT Parameter set field with SCSID subfield according to at least one embodiment of the present disclosure.

Otherwise, if the condition in check 754 is satisfied, then AP MLD responds 758 with a SCS response frame to accept the SCS request to the non-AP MLD. Then, the AP MLD sends 760 a frame to assign R-TWT membership on at least one link for the SCS traffic stream within a timeout interval. In at least one embodiment/mode/case the frame format of assigning R-TWT membership can be the same as in IEEE 802.11be (as shown in FIG. 16), whereby the TWT element can be replaced by using the modified format as shown in FIG. 41. It will be noted that in certain instances the AP MLD may assign the membership of multiple R-TWTs for the same SCS traffic stream. It is also allowable in certain instances that multiple R-TWTs for the same SCS traffic stream are scheduled on different links.

3.4.2. SCS descriptor with R-TWT Frame Format

Figure 40:
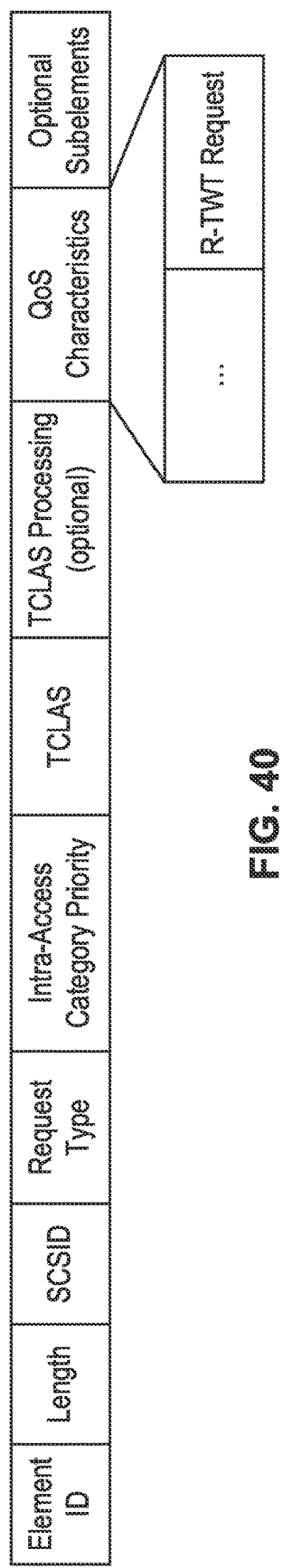
FIG. 40 is a data field diagram of an SCS Descriptor element with R-TWT request field in QoS Characteristics element according to at least one embodiment of the present disclosure.

FIG. 40 illustrates an example embodiment 770 of an SCS descriptor element with R-TWT request field in QoS Characteristics element. The fields in the SCS Descriptor element can be identical to those in IEEE 802.11be [P802.11be_D1.31] except that it has one field, such as the R-TWT request field, to indicate whether R-TWT is required for the SCS traffic stream.

A QoS Characteristics element field may be the same as it is defined in IEEE 802.11be except that at least a new R-TWT request field is added in this element. The R-TWT request field can be in the control info field of the QoS Characteristics element.

An R-TWT request field is set by a non-AP MLD to indicate whether the R-TWT scheduling is needed (required) for the transmission of the frames from the SCS traffic stream. This field may comprise a one bit indication. If this field is set to a first state (e.g., "1"), then the non-AP MLD requests to schedule R-TWT SPs for the transmission of the SCS traffic stream. If the AP MLD which receives this field accepts the SCS request, then it transmits an unsolicited TWT response frame(s) to the non-AP MLD to assign R-TWT membership for the transmission of the SCS traffic stream on at least one link within the timeout period, which aims to satisfy the QoS requirement of the SCS traffic stream. It should be noted that the timeout can be predetermined or negotiated by the AP and non-AP MLDs. Otherwise, this field is set to a second state (e.g., "0"), then the AP MLD does not have to schedule R-TWT SP for the SCS traffic stream. If the non-AP MLD needs (determines) to schedule R-TWT SPs for the SCS traffic stream, it initiates R-TWT membership negotiation with the AP MLD over a link.

FIG. 41 illustrates an example embodiment 790 is a data field diagram of the modified TWT element seen in FIG. 40. All the fields in the modified TWT element can be identical to those in the TWT element as shown in FIG. 5 except that a SCSID field is added in each (modified) broadcast TWT parameter set field. The AP sets this field to indicate that the R-TWT scheduling indicated in the modified Broadcast TWT Parameter Set field is for the transmission of the SCS traffic stream indicated in the SCSID field. If the AP sets the modified broadcast TWT parameter set field to accept a membership of a non-AP STA, then the SCS traffic stream indicated in the SCSID field of the non-AP STA is given a higher priority to transmit during the R-TWT SPs indicated in the modified Broadcast TWT Parameter Set field.

3.4.3. Examples of SCS Setup Requesting R-TWT Scheduling

This section illustrates several examples of SCS setup procedure with requesting R-TWT scheduling.

Figure 42:
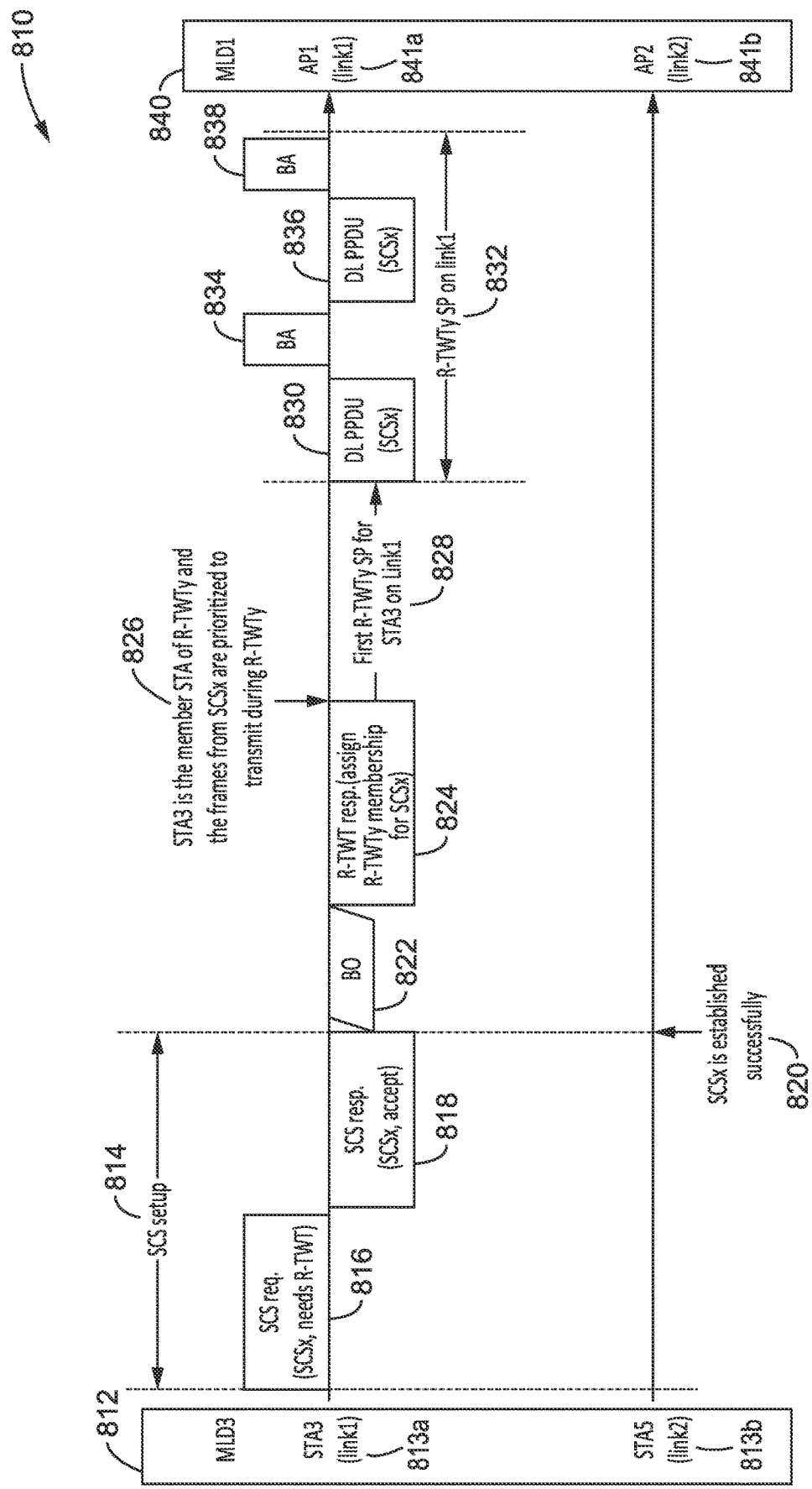
FIG. 42 is a communications diagram of AP1 scheduling R-TWT SPs for SCSx traffic stream on Link1 according to at least one embodiment of the present disclosure.

FIG. 42 illustrates an example embodiment 810 of SCS setup procedure with requesting R-TWT scheduling in an example of AP1 scheduling R-TWT SPs for SCSx traffic stream on Link1. The figure depicts communications between STA3 813a and AP1 841a on Link1, and between STA5 813b and AP2 841b on Link2. STA3 and STA5 are part of MLD3 812, while AP1 and AP2 are part of MLD1 840.

MLD3 is to set up a SCS traffic stream, denoted by SCSx, with MLD1. In this example, SCSx is a DL traffic stream. STA3 affiliated with MLD3 obtains channel access and initiates an SCS setup procedure 814 with AP1 that is affiliated with MLD1. STA3 transmits a SCS request frame 816 to AP1 to set up SCSx traffic stream. The format of SCS request frame can be as shown in FIG. 11 whose SCS Descriptor List field carries a SCS Descriptor element as shown in FIG. 40. The SCS Descriptor element includes an indication that R-TWT is needed (requested) for the transmission of the SCSx traffic stream.

After AP1 receives the SCS request frame for SCSx, it decides (determines) to respond with a SCS response frame 818 to accept the SCSx traffic stream. The SCSx traffic stream is established successfully 820 and MLD3 starts to count down its backoff (BO) timer 822 and waits for a R-TWT response frame from MLD1 to assign R-TWT membership for SCSx traffic stream before timeout.

In this example, MLD1 decides to assign the membership of a R-TWT, denoted by R-TWTy, on Link1 for the SCSx traffic stream. Then, AP1 affiliated with MLD1 transmits an unsolicited TWT response frame (i.e., TWT setup frame) 824 to assign/accept the R-TWTy membership of STA3. The frame format of TWT response frame can be as shown in FIG. 16 which carries the modified TWT element as shown in FIG. 41. The SCSID subfield in the modified Broadcast TWT Parameter set field of accepting membership of R-TWTy should be set to the SCS ID of SCSx to indicate that this R-TWTy membership is for SCSx.

Then, STA3 becomes a member 826 STA of R-TWTy and awaits 828 first R-TWTy SP 832, in which the frames of the SCSx traffic stream are allowed to be transmitted or have higher priority to transmit. As shown in the figure, AP1 transmits PPDUs 830, 836 of SCSx traffic stream during the R-TWTy SP on Link1, and STA3 responds with acknowledgements (BAs) 834 and 838.

Figure 43:
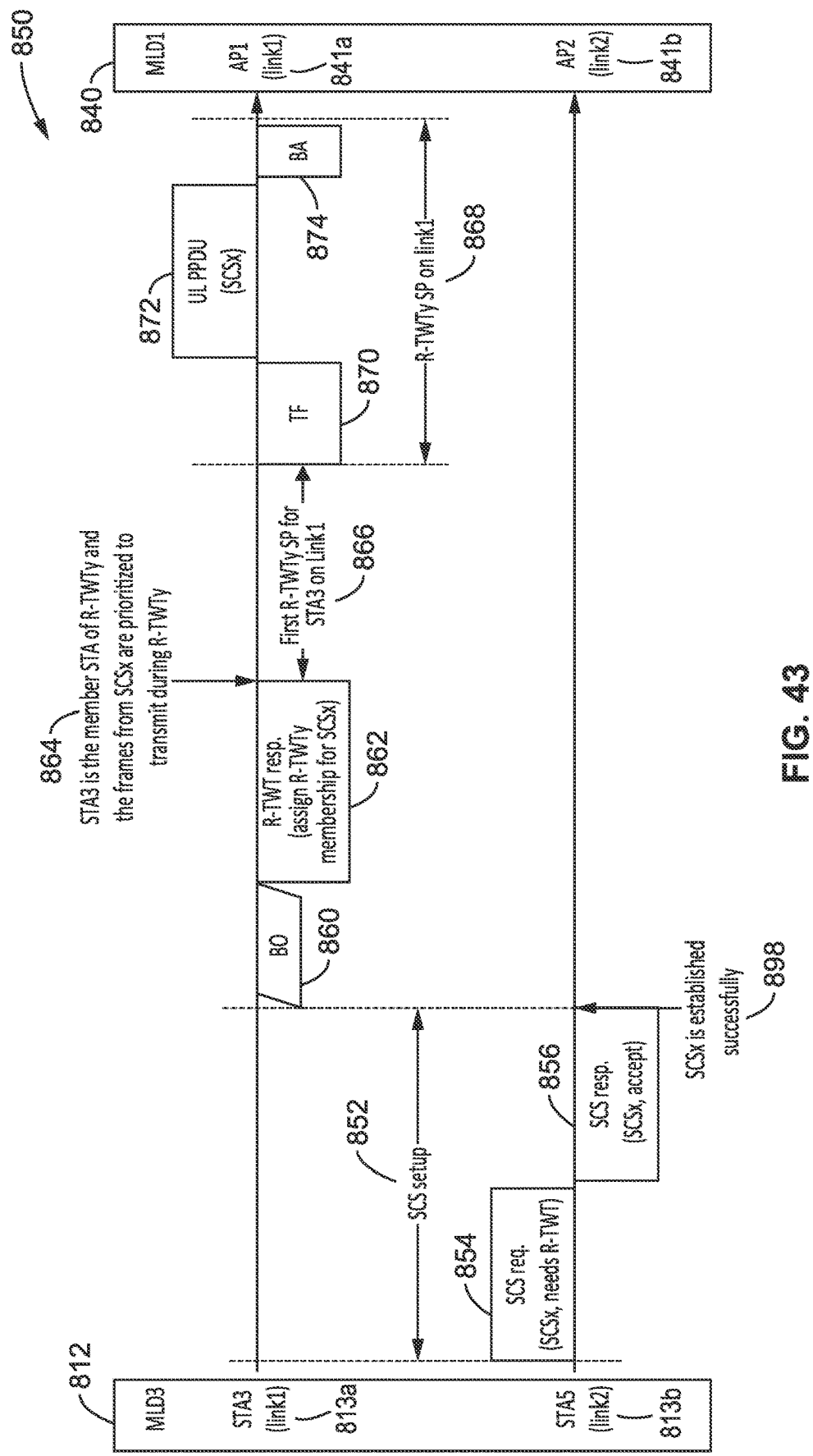
FIG. 43 is a communications diagram of AP1 scheduling R-TWT SPs for SCSx traffic stream on a different link according to at least one embodiment of the present disclosure.

FIG. 43 illustrates an example embodiment 850 of scheduling R-TWT SPs for SCSx traffic stream on a different link. The figure depicts communications between STA3 813a and AP1 841a on Link1, and between STA5 813b and AP2 841b on Link2. STA3 and STA5 are part of MLD3 812, while AP1 and AP2 are part of MLD1 840.

Compared with FIG. 42, in this example, the SCSx traffic stream is a UL traffic stream and the SCS setup procedure of SCSx occurs on Link2 while AP membership assignment of R-TWTy occurs on Link1.

MLD3 is to set up a SCS traffic stream, denoted by SCSx, with MLD1. In this example, SCSx is a UL traffic stream. STA5 affiliated with MLD3 obtains channel access and initiates the SCS setup procedure 852 with AP2 affiliated with MLD1 on Link2. STA5 transmits a SCS request frame 854 to AP2 to set up a SCSx traffic stream. The format of SCS request frame can be as shown in FIG. 11 whose SCS Descriptor List field carries a SCS Descriptor element as shown in FIG. 40. In the SCS Descriptor element is an indication that R-TWT is needed (requested) for the transmission of the SCSx traffic stream.

After AP2 receives the SCS request frame for SCSx, it determines to respond with a SCS response frame 856 to accept the SCSx traffic stream. The SCSx traffic stream is established successfully 858 and MLD3 starts to wait for a R-TWT response frame 862 from MLD1 to assign R-TWT membership for SCSx traffic stream before timeout.

In this example, MLD1 decides to assign the membership of a R-TWT, denoted by R-TWTy, on Link1 for the SCSx traffic stream. Then, AP1 affiliated with MLD1 contends 860 for the channel and transmits an unsolicited TWT response frame (i.e., TWT setup frame) 862 to assign/accept the R-TWTy membership of STA3. The frame format of TWT response frame can be as shown in FIG. 16 which carries the modified TWT element as shown in FIG. 41. The SCSID subfield in the modified Broadcast TWT Parameter set field for accepting membership of R-TWTy should be set to the SCS ID of SCSx to indicate that this R-TWTy membership is for SCSx.

Then, STA3 becomes 864 a member STA of R-TWTy and awaits 866 R-TWTy SP 868 in which transmission of frames of the SCSx traffic stream are allowed or given higher priority to transmit. As shown in the figure AP1 triggers 870 the transmissions of the PPDUs 872 of SCSx traffic stream during the R-TWTy SP on Link1.

Figure 44:
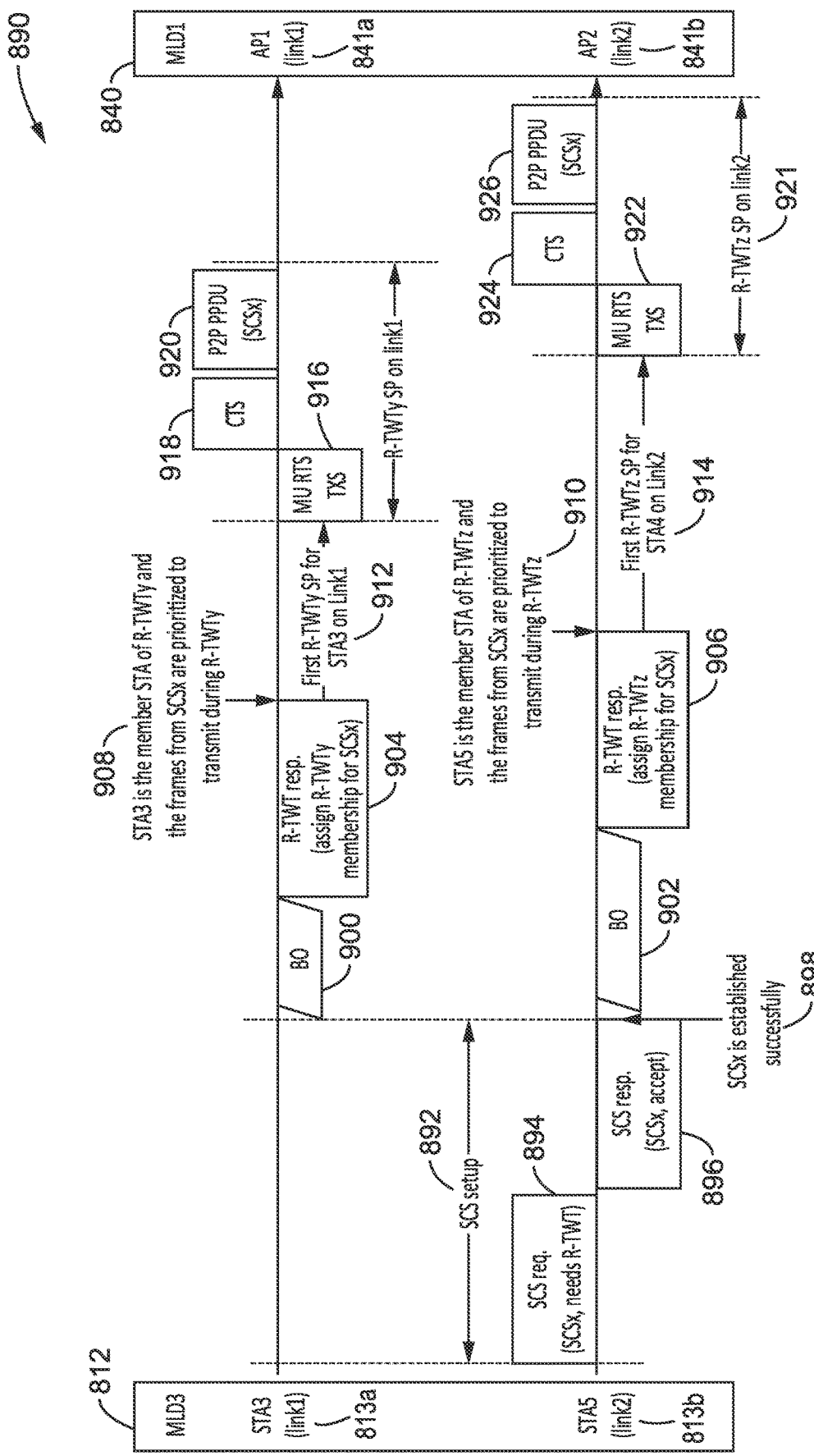
FIG. 44 is a communications diagram of MLD1 scheduling R-TWT SPs for SCSx traffic stream on multiple links according to at least one embodiment of the present disclosure.

FIG. 44 illustrates an example embodiment 890 of MLD1 scheduling R-TWT SPs for SCSx traffic stream on multiple links. The figure depicts communications between STA3 813*a* and AP1 841*a* on Link1, and between STA5 813*b* and AP2 841*b* on Link2. STA3 and STA5 are part of MLD3 812, while AP1 and AP2 are part of MLD1 840.

Compared with FIG. 43, in this example, the SCSx traffic stream is a P2P traffic stream and the SCS setup procedure of SCSx occurs on Link2 while the AP assigns membership of R-TWTy and R-TWTz on Link1 and Link2, respectively.

MLD3 is to set up a SCS traffic stream 892, denoted by SCSx, with MLD1. In this example, SCSx is a P2P traffic stream. STA5 affiliated with MLD3 obtains channel access and initiates the SCS setup procedure with AP2 affiliated with MLD1 on Link2. Specifically, STA5 transmits a SCS request frame 894 to AP2 to set up SCSx traffic stream. The format of SCS request frame can be as shown in FIG. 11 whose SCS Descriptor List field carries a SCS Descriptor element as shown in FIG. 40. In the SCS Descriptor element there is an indication that R-TWT is needed (requested) for the transmission of the SCSx traffic stream.

After AP2 receives the SCS request frame for SCSx, it determines to respond with a SCS response frame 896 to accept the SCSx traffic stream. The SCSx traffic stream is established successfully 898 and starts to wait for a R-TWT response frame from MLD1 to assign R-TWT membership for SCSx traffic stream before timeout.

In this example, MLD1 decides to assign the membership of two R-TWTs, denoted by R-TWTy and R-TWTz, on Link1 and Link2 respectively for the SCSx traffic stream. Then, AP1 affiliated with MLD1 starts to count down backoff timer 900 and transmits an unsolicited TWT response frame (i.e., TWT setup frame) to assign/accept the R-TWTy membership 904 of STA3 over Link1. Meanwhile, AP2 affiliated with MLD1 counts down backoff timers 902 and transmits an unsolicited TWT response frame (i.e., TWT setup frame) 906 to assign/accept the R-TWTy membership of STA5 over Link2.

The frame format of TWT response frame can be as that shown in FIG. 16 which carries the modified TWT element as shown in FIG. 41. The SCSID subfield in the modified Broadcast TWT Parameter set field for accepting membership of R-TWTy (or R-TWTz) should be set to the SCS ID of SCSx to indicate that this R-TWTy (or R-TWTz, respectively) membership is for SCSx.

Then, STA3 becomes a member STA of R-TWTy 908 on Link1. During the R-TWTy SPs, the frames of the SCSx traffic stream will be allowed to transmit or have higher priority to transmit. As shown in the figure, after interval 912, AP1 sends a MU-RTS TXS trigger frame (as defined in IEEE 802.11be) 916 to share TXOP with STA3, and STA3 starts the transmissions of the PPDUs 920 of SCSx traffic stream after responding CTS 918 during the R-TWTy SP on Link1.

STA5 becomes a member STA of R-TWTz 910 on Link2. During the R-TWTz SPs, after period 914, the frames of the SCSx traffic stream will be allowed to transmit or have higher priority to transmit. As shown in the figure, AP2 sends a MU-RTS TXS trigger frame 922 to share TXOP with STA5, and STA5 starts the transmissions of the PPDUs 926 of SCSx traffic stream after responding CTS 922 during the R-TWTz SP on Link1.

It should be noted that the P2P (or DL/UL) SCS traffic stream may indicate that the SCS traffic stream can only be transmitted over certain links due to Link ID field (or link bitmap field) in the control info field of QoS characteristics element of the SCS traffic stream (or TID-to-Link mapping). If SCS traffic stream is P2P, it can only be transmitted over its tunneled direct-link setup (TDLS) links. Then, the AP MLD can only schedule R-TWT SPs for the transmission of the SCS traffic stream over those certain links.

Figure 45:
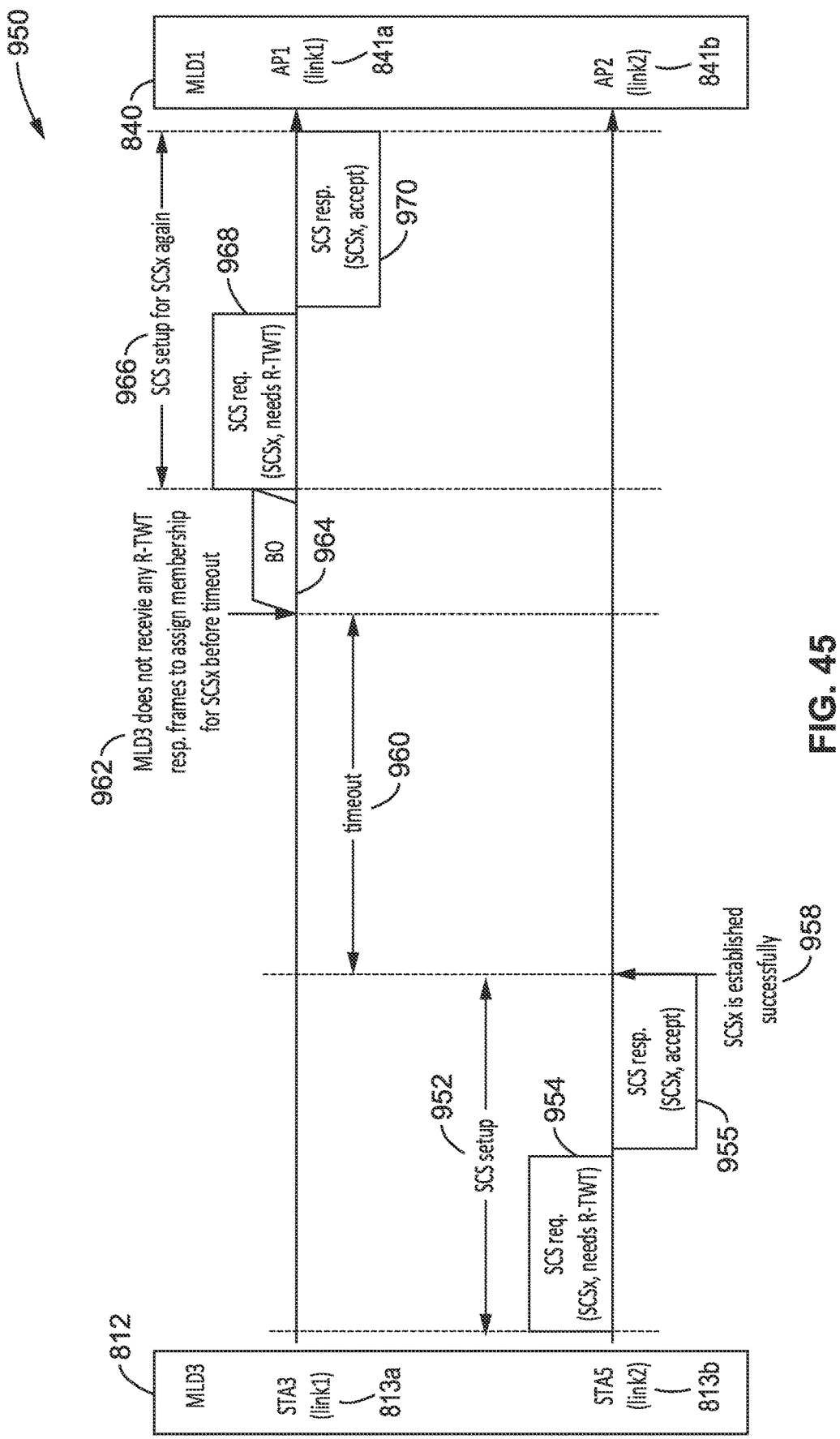
FIG. 45 is a communications diagram of MLD3 not receiving R-TWT membership for SCSx before timeout according to at least one embodiment of the present disclosure.

FIG. 45 illustrates an example embodiment 950 of MLD3 not receiving R-TWT membership for SCSx before timeout. The figure depicts communications between STA3 813*a* and AP1 841*a* on Link1, and between STA5 813*b* and AP2 841*b* on Link2. STA3 and STA5 are part of MLD3 812, while AP1 and AP2 are part of MLD1 840.

MLD3 is to set up a SCS traffic stream, denoted by SCSx, with MLD1. In this example, SCSx is a UL traffic stream. STA5 affiliated with MLD3 obtains channel access and initiates the SCS setup procedure 952 with AP2 affiliated with MLD1 on Link2. STA5 transmits a SCS request frame 954 to AP2 to set up a SCSx traffic stream. The format of SCS request frame can be as shown in FIG. 11 whose SCS Descriptor List field carries a SCS Descriptor element as shown in FIG. 40. The SCS Descriptor element includes an indication that R-TWT is needed (requested) for the transmission of the SCSx traffic stream.

After AP2 receives the SCS request frame for SCSx, it determines to respond and sends an SCS response frame 955 to accept the SCSx traffic stream. The SCSx traffic stream is established successfully 956, and it awaits 958 an R-TWT response frame from MLD1 to assign R-TWT membership for SCSx. The R-TWT response is not received 960 by MLD3 within the set timeout period 958.

After timeout 958, MLD3 starts to count down its BO timer 962 and re-initiates the SCS setup procedure for SCSx traffic stream. The re-initiation can be performed on any link. In this example, the re-initiation occurs on Link1 with another SCS setup process 964, with STA3 sending an SCS request 966 for which is received an SCS response 968.

4. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit, as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN); (b) a processor coupled to said wireless communication circuit for operating on the WLAN; (c) a non-transitory memory storing instructions executable by the processor for communicating with other STAs; and (d) wherein said instructions, when executed by the processor, perform steps of a wireless communications protocol for said wireless communication circuit, comprising: (d)(i) sending a stream classification service (SCS) request frame by a STA operating as a non-AP STA, to an AP station, to initiate a SCS setup in addition to scheduling a reserved restricted target wait time (R-TWT); wherein said SCS request frame comprises a traffic specification (TSPEC) element or QoS characteristics element; (d)(ii) receiving said SCS request frame from the non-AP STA, upon which the AP determines whether or not to accept the request; (d)(iii) sending a SCS response frame by the AP to the non-AP STA indicating a decision on the request; and (d)(iv) scheduling SCS traffic to be transmitted with an increased priority, by the AP and non-AP STA, during R-TWT service periods (SPs) if the request is accepted; wherein said SCS traffic is selected from the group of communication traffic consisting of downlink (DL), uplink (UL), and peer-to-peer (P2P).

An apparatus for wireless communication in a network, the apparatus comprising: (a) a wireless communication circuit, as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN); (b) a processor coupled to said wireless communication circuit for operating on the WLAN; (c) a non-transitory memory storing instructions executable by the processor for communicating with other STAs; and (d) wherein said instructions, when executed by the processor, perform steps of a wireless communications protocol for said wireless communication circuit, comprising: (d)(i) utilizing a target wait time (TWT) parameter set field which incorporates a link identification (ID) field in the TWT element to indicate the link on which this modified TWT parameter set field is set; (d)(ii) the non-AP STA sending a TWT setup frame to the AP, in the modified TWT parameter set field in the TWT element on one link for initiating a TWT setup process on multiple links by the AP; (d)(iii) the AP sending a TWT response frame using the modified TWT parameter set field in the TWT element on one link to indicate its decision to the request; and (d)(iv) the non-AP STA receiving the decision from the AP on the TWT setup frame and performs TWT scheduling for frame exchange with the AP, as directed by the AP.

An apparatus for wireless communication in a network, the apparatus comprising: (a) a wireless communication circuit, as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN); (b) a processor coupled to said wireless communication circuit for operating on the WLAN; (c) a non-transitory memory storing instructions executable by the processor for communicating with other STAs; and (d) wherein said instructions, when executed by the processor, perform steps of a wireless communications protocol for said wireless communication circuit, comprising: (d)(i)

sending a stream classification service (SCS) request frame which includes a QoS Characteristics element, by a non-AP STA, to an AP station, to initiate a SCS setup in addition to scheduling a restricted target wait time (R-TWT) for the SCS; (d)(ii) receiving said SCS request frame from the non-AP STA, upon which the AP determines whether or not to accept the request; (d)(iii) sending a SCS response frame by the AP to the non-AP STA indicating a decision on the request; (d)(iv) sending a TWT response frame by the AP to assign the R-TWT membership for scheduling the transmission of SCS traffic during the corresponding R-TWT service periods (SPs) if the SCS response frame accepts the SCS request; and (d)(v) scheduling SCS traffic to be transmitted with an increased priority by the AP and non-AP STA during the corresponding R-TWT SPs if the request is accepted.

An apparatus for wireless communication in a network, the apparatus comprising: (a) a wireless communication circuit, as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN); (b) a processor coupled to said wireless communication circuit for operating on the WLAN; (c) a non-transitory memory storing instructions executable by the processor for communicating with other STAs; and (d) wherein said instructions, when executed by the processor, perform steps of a wireless communications protocol for said wireless communication circuit, comprising: (d)(i) sending a stream classification service (SCS) request frame which includes a QoS Characteristics element, by a non-AP STA, to an AP station, to initiate a SCS setup in addition to scheduling transmissions for the SCS; (d)(ii) receiving said SCS request frame from the non-AP STA, upon which the AP determines whether or not to accept the request; (d)(iii) sending a SCS response frame by the AP to the non-AP STA indicating a decision on the request; and (d)(iv) scheduling SCS traffic to be transmitted by the AP and non-AP STA if the SCS request is accepted.

Wireless communication apparatus/method for performing transmission of packets, where CSMA/CA is applied in the system/apparatus, comprising: (a) non-AP STA sends SCS request frame to initiate SCS setup and R-TWT setup with AP; (b) AP sends SCS response frame to indicate its decision to the request; and (c) the traffic of the SCS is scheduled to transmit during the R-TWT SPs of the request is accepted.

The apparatus or method of any preceding implementation, wherein said R-TWT SP is trigger-enabled.

The apparatus or method of any preceding implementation, wherein said non-AP sends the SCS request frame comprising a TWT element to request R-TWT setup for the SCS.

The apparatus or method of any preceding implementation, wherein the AP sends a SCS response frame including TWT element to indicate the results of the R-TWT setup for the SCS.

The apparatus or method of any preceding implementation, wherein the total R-TWT SP time per second scheduled by the AP is not allowed to exceed what is required by the traffic to be transmitted or prioritized during the R-TWT SPs.

The apparatus or method of any preceding implementation, wherein the AP scheduling R-TWT can set the interval between two consecutive R-TWT SPs for a SCS traffic stream between the minimum service interval and the maximum service interval of the SCS traffic stream.

The apparatus or method of any preceding implementation, wherein parameters of the modified TWT parameter set are set based on a timing synchronization function (TSF) time value on a link indicated in the link identification (ID) field.

The apparatus or method of any preceding implementation, wherein the TWT setup frame is carries a TWT element whereby multiple modified TWT parameter set fields in the TWT element have the same TWT ID but different link IDs to indicate a TWT whose SPs are scheduled on different links.

The apparatus or method of any preceding implementation, wherein the TWT setup frame carries multiple TWT elements, whereby a parameter in the modified TWT parameter set fields for a same TWT and a link in different TWT elements represents a range of parameters for that TWT on that link.

The apparatus or method of any preceding implementation, wherein the TWT response frame could be transmitted by AP MLD on any link where the R-TWT SP is scheduled for the SCS traffic stream.

The apparatus or method of any preceding implementation, wherein the TWT response frame could be transmitted by AP MLD within timeout.

The apparatus or method of any preceding implementation, wherein the non-AP MLD should not transmit TWT request frame for the SCS traffic stream within timeout since the SCS traffic stream that request R-TWT scheduling is established successfully.

The apparatus or method of any preceding implementation, wherein the non-AP MLD retransmits SCS request frame if it does not receive TWT response frame for the SCS traffic stream within timeout since the SCS traffic stream that request R-TWT scheduling is established successfully.

The apparatus or method of any preceding implementation, wherein the non-AP MLD transmits TWT request frame for the SCS traffic stream if it does not receive TWT response frame for the SCS traffic stream within timeout since the SCS traffic stream that request R-TWT scheduling is established successfully.

The apparatus or method of any preceding implementation, wherein the AP MLD schedule R-TWT SPs for transmitting SCS traffic streams.

The apparatus or method of any preceding implementation, wherein the AP MLD triggers transmission of an uplink (UL) or peer-to-peer (P2P) SCS traffic stream at a time interval whose length is set between a minimum service interval and the maximum service interval of the SCS traffic stream.

The apparatus or method of any preceding implementation, wherein the non-AP requesting SCS setup could set all the fields of TSPEC element in the frame to request SCS.

The apparatus or method of any preceding implementation, wherein the non-AP requesting SCS setup for UL traffic could set the surplus bandwidth allowance field of TSPEC element in the frame to request SCS.

The apparatus or method of any preceding implementation, wherein non-AP requesting SCS setup for DL traffic could reserve the surplus bandwidth allowance field of TSPEC element in the frame to request SCS.

The apparatus or method of any preceding implementation, wherein the AP requesting SCS setup could reserve the medium time field of TSPEC element in the frame to request SCS.

The apparatus or method of any preceding implementation, wherein the AP could set the medium time field of TSPEC element in the frame to accepting SCS.

The apparatus or method of any preceding implementation, wherein the non-AP could send SCS request frame including TWT element to request R-TWT setup for the SCS.

The apparatus or method of any preceding implementation, wherein the non-AP could send SCS response frame including TWT element to indicate the results of the R-TWT setup for the SCS.

The apparatus or method of any preceding implementation, wherein the AP scheduling R-TWT could schedule additional R-TWT SP time if a new SCS is established.

The apparatus or method of any preceding implementation, wherein the AP scheduling R-TWT could reduce R-TWT SP time if an existing SCS is removed.

The apparatus or method of any preceding implementation, wherein the AP scheduling R-TWT could update R-TWT SP time if an existing SCS is changed.

The apparatus or method of any preceding implementation, wherein the where the total R-TWT SP time per second scheduled by AP could not exceed an upper limit.

The apparatus or method of any preceding implementation, wherein the AP scheduling R-TWT could set the interval between two consecutive R-TWT SPs longer than the maximum value of all the minimum SI fields of the TSPECs of SCSs whose traffic are scheduled to transmit during the R-TWT SPs.

The system/apparatus as recited in claim 1, where AP scheduling R-TWT could set the interval between two consecutive R-TWT SPs shorter than the minimum value of all the maximum SI fields of the TSPECs of SCSs whose traffic are scheduled to transmit during the R-TWT SPs.

The apparatus or method of any preceding implementation, wherein the AP scheduling R-TWT could set the interval between two consecutive R-TWT SPs as a submultiple of the beacon interval.

The apparatus or method of any preceding implementation, wherein the AP scheduling R-TWT could set R-TWT ID a unique value at MLD level if AP is affiliated with a MLD.

The apparatus or method of any preceding implementation, wherein the AP scheduling R-TWT could set R-TWT ID to a unique value at STA level and use a tuple <R-TWT ID, Link ID> to identify a R-TWT at MLD level.

The apparatus or method of any preceding implementation, wherein the AP scheduling R-TWT could set the interval between two consecutive R-TWT SPs between the maximum SI fields and the minimum SI field of the TSPEC of a SCS whose traffic is scheduled to transmit during the R-TWT SPs.

Each and every implementation of the technology described herein, as well as any aspect, component, or element of any embodiment described herein, and any combination of aspects, components or elements of any embodiment described herein.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Example of SCSs at a R-TWT scheduling AP

| | SCSID | Non-AP | AP | direction | TID | UP | <TWT ID, Link ID> |
|---|---|---|---|---|---|---|---|
| SCS1 | 1 | STA2 | AP1 or MLD1 | Uplink | 8 | 5 | <1, 1>, <3, 1> |
| SCS2 | 2 | MLD2 | MLD1 | Downlink | 9 | 6 | <1, 1> |
| SCS3 | 3 | MLD3 | MLD1 | Downlink | 10 | 3 | <2, 2> |

TABLE 2

Example of other TWTs

| | TWT ID | Non-AP | AP | links |
|---|---|---|---|---|
| R-TWT4 | 4 | MLD3 | MLD1 | Link1, 2 |
| B-TWT5 | 5 | MLD3 | MLD1 | Link1, 2 |
| I-TWT6 | 6 | MLD3 | MLD1 | Link1, 2 |

What is claimed is:

1. An apparatus for wireless communication in a network, the apparatus comprising:
   (a) a wireless communication circuit, as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN);
   (b) a processor coupled to said wireless communication circuit for operating on the WLAN;
   (c) a non-transitory memory storing instructions executable by the processor for communicating with other STAs; and
   (d) wherein said instructions, when executed by the processor, perform steps of a wireless communications protocol for said wireless communication circuit, comprising:
      (i) sending a stream classification service (SCS) request frame by a STA operating as a non-AP STA, to an AP station, to initiate a SCS setup in addition to scheduling a reserved restricted target wait time (R-TWT); wherein said SCS request frame comprises a traffic specification (TSPEC) element or QoS characteristics element;
      receiving said SCS request frame from the non-AP STA, upon which the AP determines whether or not to accept the request;
      (iii) sending a SCS response frame by the AP to the non-AP STA indicating a decision on the request; and
      (iv) scheduling SCS traffic to be transmitted with a transmission priority which exceeds that of non-SCS traffic, by the AP and non-AP STA, during R-TWT service periods (SPs) if the request is accepted; wherein said SCS traffic is selected from the group of communication traffic consisting of downlink (DL), uplink (UL), and peer-to-peer (P2P).

2. The apparatus of claim 1, wherein said R-TWT SP is trigger-enabled.

3. The apparatus of claim 1, wherein said non-AP sends the SCS request frame comprising a TWT element to request R-TWT setup for the SCS.

4. The apparatus of claim 1, wherein the AP sends a SCS response frame including TWT element to indicate the results of the R-TWT setup for the SCS.

5. The apparatus of claim 1, wherein the total R-TWT SP time per second scheduled by the AP is not allowed to exceed what is required by the traffic to be transmitted or prioritized during the R-TWT SPs.

6. The apparatus of claim 1, wherein the AP scheduling R-TWT can set the interval between two consecutive R-TWT SPs for a SCS traffic stream between the minimum service interval and the maximum service interval of the SCS traffic stream.

7. An apparatus for wireless communication in a network, the apparatus comprising:
  (a) a wireless communication circuit, as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN);
  (b) a processor coupled to said wireless communication circuit for operating on the WLAN;
  (c) a non-transitory memory storing instructions executable by the processor for communicating with other STAs; and
  (d) wherein said instructions, when executed by the processor, perform steps of a wireless communications protocol for said wireless communication circuit, comprising:
    (i) sending a stream classification service (SCS) request frame which includes a QoS Characteristics element, by a non-AP STA, to an AP station, to initiate a SCS setup in addition to scheduling a restricted target wait time (R-TWT) for the SCS;
    (ii) receiving said SCS request frame from the non-AP STA, upon which the AP determines whether or not to accept the request;
    (iii) sending a SCS response frame by the AP to the non-AP STA indicating a decision on the request;
    (iv) sending a TWT response frame by the AP to assign the R-TWT membership for scheduling the transmission of SCS traffic during the corresponding R-TWT service periods (SPs) if the SCS response frame accepts the SCS request; and
    (v) scheduling SCS traffic to be transmitted with an increased a transmission priority which exceeds that of non-SCS traffic, by the AP and non-AP STA during the corresponding R-TWT SPs if the request is accepted.

8. The apparatus of claim 7, wherein the TWT response frame could be transmitted by AP MLD on any link where the R-TWT SP is scheduled for the SCS traffic stream.

9. The apparatus of claim 7, wherein the TWT response frame could be transmitted by AP MLD within timeout.

10. The apparatus of claim 7, wherein the non-AP MLD should not transmit TWT request frame for the SCS traffic stream within timeout since the SCS traffic stream that request R-TWT scheduling is established successfully.

11. The apparatus of claim 7, wherein the non-AP MLD retransmits SCS request frame if it does not receive TWT response frame for the SCS traffic stream within timeout since the SCS traffic stream that request R-TWT scheduling is established successfully.

12. The apparatus of claim 7, wherein the non-AP MLD transmits TWT request frame for the SCS traffic stream if it does not receive TWT response frame for the SCS traffic stream within timeout since the SCS traffic stream that request R-TWT scheduling is established successfully.

* * * * *